(12) United States Patent
Shareef

(10) Patent No.: US 9,987,772 B1
(45) Date of Patent: Jun. 5, 2018

(54) SYSTEM AND METHOD TO MANUFACTURE COMPOSITE STRUCTURES

(76) Inventor: Mahmood Shareef, Keller, TX (US)

( * ) Notice: Subject to any disclaimer, the term of this patent is extended or adjusted under 35 U.S.C. 154(b) by 0 days. days.

(21) Appl. No.: 13/403,561

(22) Filed: Feb. 23, 2012

(51) Int. Cl.
*B29C 39/42* (2006.01)
*B29C 70/56* (2006.01)

(52) U.S. Cl.
CPC .............. *B29C 39/42* (2013.01); *B29C 70/56* (2013.01)

(58) Field of Classification Search
CPC ....................................................... B29C 70/56
See application file for complete search history.

(56) References Cited

U.S. PATENT DOCUMENTS

| | | | |
|---|---|---|---|
| 6,739,861 B2 * | 5/2004 | Cournoyer et al. | 425/520 |
| 2006/0179742 A1 * | 8/2006 | Mathews | E04C 5/122 52/223.13 |
| 2006/0272265 A1 * | 12/2006 | Pryor | E04C 3/005 52/645 |
| 2007/0175583 A1 * | 8/2007 | Mosallam | B29C 70/088 156/307.1 |
| 2008/0099597 A1 * | 5/2008 | Pham et al. | 242/615.4 |
| 2009/0224103 A1 * | 9/2009 | Neumann et al. | 244/131 |

FOREIGN PATENT DOCUMENTS

JP 2000-318984 A * 11/2000 .............. E04G 21/12

OTHER PUBLICATIONS

Mechanical jacks tksimplex (as general information/evidentiary).*

* cited by examiner

*Primary Examiner* — Matthew Daniels
*Assistant Examiner* — Kimberly A Stewart
(74) *Attorney, Agent, or Firm* — Law Office of Jeff Williams; J. Oliver Williams

(57) ABSTRACT

A method of building a Pre-stressed composite part is described herein. The method includes: fabricating a Pre-stressed composite part with a Prepreg (Pre-impregnated—already Resin coated fabric or tape) ply layup on tool or mandrel; laying conduits at desired locations and to be embedded with chopped fiber (metal or composite); inserting a steel cable into the conduit center and a calculated tension applied to the cable and held by jacks; filling the conduit with a special resin with hardener and allowing the resin to set until the cable is locked in the resin with the applied tension in the cable; removing jacks and leaving permanent anchors at both ends of conduit; applied cable tension creates compression in the part to take more tension for the loads and hence cable tension gives extra strength to the part.

8 Claims, 101 Drawing Sheets ystem and Method to Manufacture Composite Structures

BRIEF DESCRIPTION OF THE DRAWINGS

For a more complete understanding of the present invention, including its features and advantages, reference is now made to the detailed description of the invention taken in conjunction with the accompanying drawing in which.

DETAILED DESCRIPTION OF THE INVENTION

Figure 1:
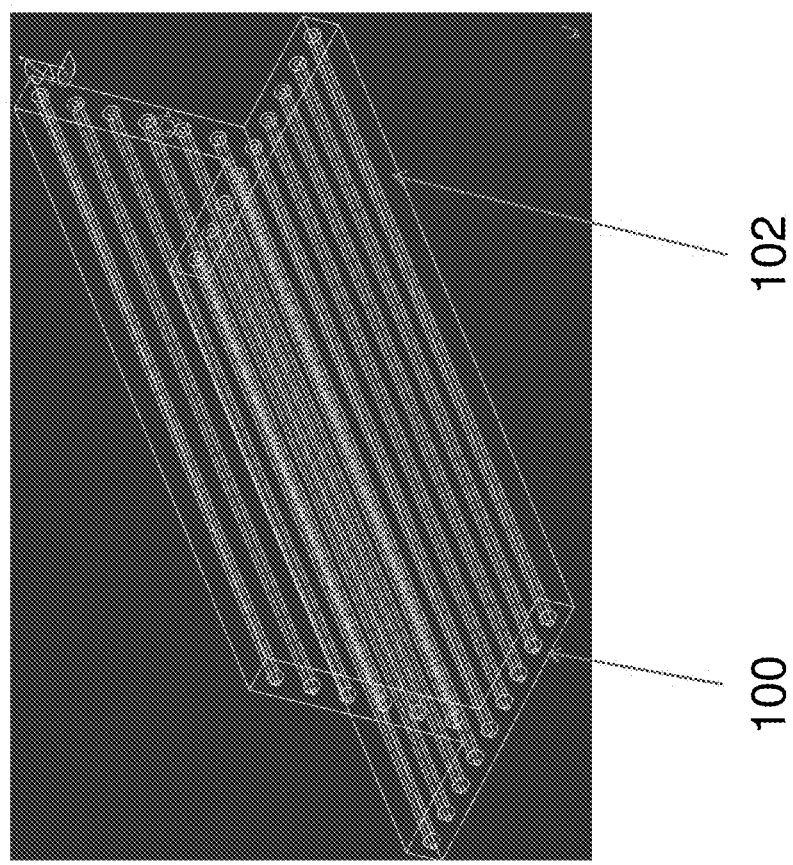
FIGS. 1-4 illustrate an embodiment of a Pre-Stressed Composite T-Rib Beam.

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

Although the present invention is new and novel, the idea is similar to reinforced concrete and Pre-Stressed concrete. However, there is enormous difference in strength between the two materials. Similarly there is a huge difference between ordinary Composite and Pre-Stressed Composite. The present invention is termed "Pre-Stressed Composites."

The use of composite material in many industries, especially in aerospace, has become routine. Indeed, the new aircrafts such as Boeing 787 and Airbus 380 have used Composite parts extensively. But still, composite structures and parts used in aerospace lack strength in critical areas. With the introduction of this new and very innovative concept of Pre-Stressed Composites, many industries will benefit (especially aerospace). This new Pre-Stressed Composites idea may revolutionize the Aerospace as well as many more industries including Automobile.

The term "Composite Material" is defined as a material consisting of small diameter, high strength, and high modulus (stiffness) fibers embedded in an essentially homogeneous matrix resin. This results in a material that is Anisotropic and it has mechanical and physical properties that vary with the direction of fibers. The fibers and resin material interact and redistribute the applied loads. The effectiveness of such transference, however, depends largely upon the quality of the bond between fibers and the resin material. While the unique balance of properties of Composite Materials are based on the combination of resin (matrix) and fibers (reinforcement), it is the Fiber system that is primarily responsible for such structural properties as Strength and Stiffness, and the Shear properties are Resin dominated. An advantage of using the Composite Material is the weight savings. The density of Composite Material is about half to two third of Aluminum. The Density of Aluminum is 0.1 lb/inch cube. But the biggest advantages of Composite Material is realized by using Pre-Stressed Composite to make a Composite Part strong in all applications in the Aerospace, Automobile and other industries.

The application of Pre-Stressed Composite Parts is enormous, especially in Aerospace and Automobile industry. The fundamental problem of Elastic behavior in metallic aircraft, during pressurization and depressurization of cabin operations, is duplicated by Pre-Stressed Composites and not by ordinary Composites. Basically the aircraft fuselage expands during flight due to pressurization of cabin and the fuselage if elastic comes back to original position at landing. The use of Pre-Stressed Composites in aircraft Frames, Bulkheads and Skin will make Composite fuselage Elastic in behavior similar to metallic aircraft. Similarly, in the Auto industry, a very light Car can be produced which can run on small engines and have greater miles per gallon and thus also helps save fuel. The Pre-Stressed Composite will have a huge impact on almost all industries. Even a Space Shuttle can be built utilizing Pre-Stressed Composite material.

Currently, there are two types of Composites used in the Aerospace and other industries. The most commonly used type is "Thermoset Composite" and the other type is "Thermoplastic Composite." At present, Thermoset Composites are mostly used in aircraft primary structures. But because of the advances in high performance materials, Thermoplastic Composites are on the way for aircraft primary structures. In fact Thermoplastics are much tougher than Thermosets, therefore they have higher inter laminar Strength, higher Failure Strain and better Impact Resistance making them more suitable for highly used parts.

The basic materials used in fabrication of Pre-Stressed Composite parts are Fiber (fabric or tape) and Resin (Matrix). The Fiber types are same for both Thermosets and Thermoplastics, but the Resins are different for Thermosets and Thermoplastics. The primary Fiber (fabric or tape) material used for Thermosets and Thermoplastics is Graphite (Carbon). The most common Thermosets Resins (matrix) are Epoxy, Bismaleimide, and Polyimide. The Resins (matrix) for Thermoplastics are PEEK (upto 120 deg C.) and PEK (upto 145 deg C.). A new Liquid Monomer Thermoplastic Resin which is stronger and easier to use has been developed.

Pre-Stressed Composites also use Conduits made from Metal (steel or titanium) Or Composite (glass fiber or Graphite) and Cables (steel). The size of these Cables can be as small as a piano wire or thick multi-strand braded Cables depending on the size of the Pres-Stressed Composite Part.

The first step in the fabrication of a Pre-Stressed Composite Part is to build the tooling required to fabricate the part. The tooling depends on the shape of the part. For curved parts, a metallic Mandrel having the same curvature as the part is required to start ply layup. For other shapes, tooling can be built out of glass fiber or Graphite. For critical Aerospace Graphite Fiber parts, the tooling should be made from Graphite so that the thermal expansion of part and tooling is the same.

The Process to fabricate a Pre-Stressed Composite part starts with a Prepreg Ply (Pre-impregnated—already Resin coated fabric or tape) Or Wet Layup Ply (Wet Resin on Dry fabric or tape). The most commonly used Composite material is Prepreg Fiber (fabric or tape) which needs to be kept in frozen condition before use. Because of high viscosity of Thermoplastic Resin, it is significantly more difficult to impregnate a Fiber with Resin. Thermoplastics Composites are therefore supplied in variety of different ready to use intermediate forms.

After all the Prepreg or Wet Layup plies are laid up, the Pre-Stressed Composite Part is covered in a nylon bag and sealed so that a consolidating pressure can be applied during Autoclave Pressure Curing. The Autoclave is basically a large internally heated Pressure Vessel. The Prepreg or Wet Layup plies can also be laid up on a metallic or composite Mandrel and Autoclave Pressure Cured. The Mandrel is removed after the Part is Cured. The Autoclaves for processing Thermosets Composites and Thermoplastics Composites have different temperature range.

The Pre-Stressed Composite Part can also be fabricated using Filament Winding Process. The Filament Winding is a Composite material manufacturing process that enables continuous Fiber reinforcement to be laid down at high speed and precision in predefined paths. The process basically involves winding of continuous Fibers impregnated with Resin over a rotating or stationary Mandrel which is removed after the curing. Thermosetting Resins are most commonly used in Filament Winding where consolidation of the material takes place after the winding has been completed. Wet winding uses Dry Fibers that are impregnated with a low viscosity Resin during the winding process. The advantage of using a Thermoplastic Composite in the Filament Winding process is that in-situ consolidation can be effected without lengthy cure cycle required for Thermoset Composites.

In the case of Thermoset Composite, the Prepreg Fiber or Wet Layup Fiber plies are laid on the Tooling according to the design requirement. The Conduits, which can be Metallic or Glass fiber, are embedded in the Fiber plies at designed locations. The Part is vacuum bagged and Autoclave Pressure Cured with Conduits embedded in the Fiber (fabric or tape) plies or Filament Winding. The majority of aerospace parts with Thermosets Composites are Cured at elevated temperatures to ensure safety at high service temperatures.

In the case of Thermoplastic Composites, the Prepreg Fiber (fabric or tape) plies are laid on the Tooling according to the design requirement. The Conduits, which can be Metallic or Glass fiber, are embedded in the Fiber plies at designed locations. The Part is vacuum bagged and Autoclave Pressure Cured with Conduits embedded in the Fiber (fabric or tape) plies or Filament Winding. The Autoclave processing for Thermoplastic is different because of stiffer Prepreg. The high viscosity of Thermoplastic Resin falls with increasing temperature until the Resin begins to become Gel to impregnate the Fiber (fabric or tape) plies.

After the Pre-Stressed Composite Part is fully Autoclave Pressure Cured, it is then placed in some tool fixture holding the Part. The Cable (steel) is then inserted in the Conduit and placed in the center of the Conduit. A required and calculated Tension is then applied to the Cable and tension is held with the help of jacks. The Conduit is then filled by injecting a special Resin with hardener and it is allowed to set until the Cable is locked in the Resin. The Part is then released from jacks after cure, leaving permanent anchors to maintain the Cable tension at both ends of Conduit.

The Pre-Stressed Composite part then achieves very high strength because of the Cable tension in the part. The applied Cable tension has induced compression in the surrounding areas of the Cable where tension in the part normally will occur with the application of external applied loads. Hence with the applied Cable tension, compression is created in Pre-Stressed Composite part to take more tension for the applied load.

Pre-Stressed Composites Application Examples

The following descriptions of Conduit and Cable locations shown in the examples of Pre-Stressed Composite applications are not based on specific calculations but are good examples to help explain how to build these Parts. There can be many more application examples, but it is just to give basic concept to build Pre-Stressed Composite Part. There are few examples given here where composite material is not involved, but the principle of Pre-Stressed Cable tension is explained.

Now turning to the Figures, FIG. 1 illustrates a wire-frame view of a Pre-Stressed Composite T-Rib Beam. As illustrated, a conduit and cable 100 are included in the composite layup 102 of the T-Rib beam.

Figure 2:
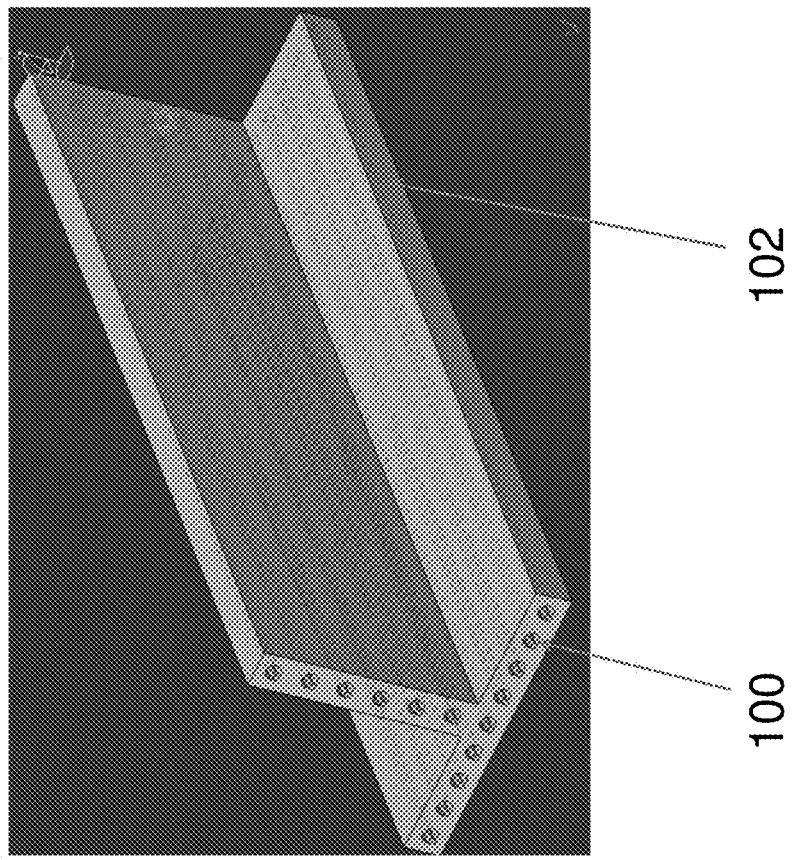

FIG. 2 illustrates a shaded view of the Pre-Stressed Composite T-Rib Beam. In this figure, the same conduit and cable 100 are included in the composite layup 102 of the T-Rib beam.

Figure 3:
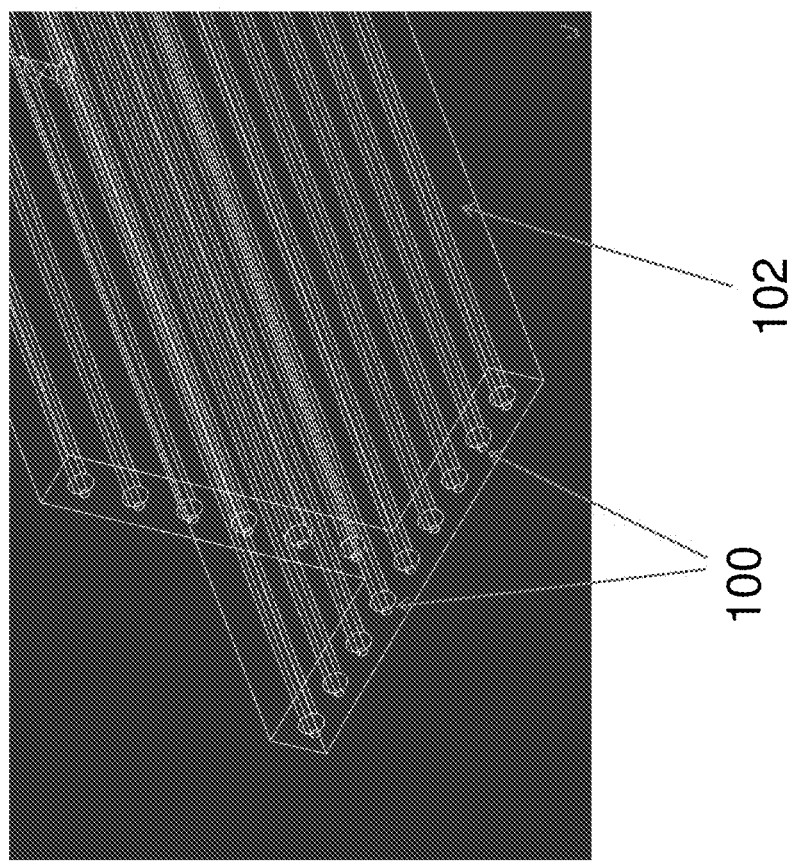

FIG. 3 illustrates a detailed wire-frame view of a Pre-Stressed Composite T-Rib Beam. As illustrated, a conduit and cable 100 are included in the composite layup 102 of the T-Rib beam.

Figure 4:
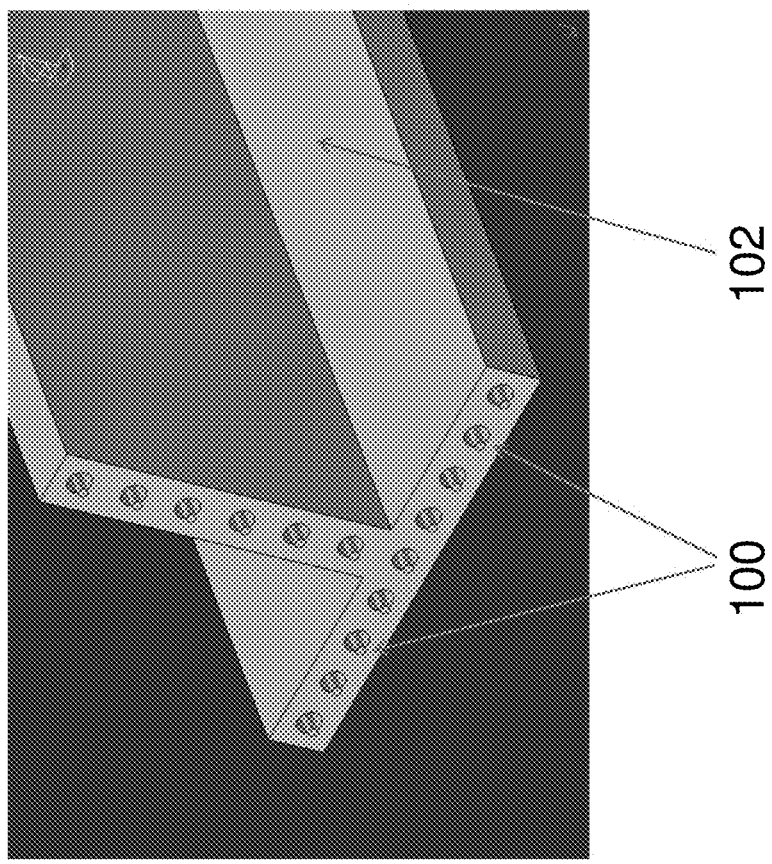

FIG. 4 illustrates a detailed shaded view of the Pre-Stressed Composite T-Rib Beam. In this figure, the same conduit and cable 100 are included in the composite layup 102 of the T-Rib beam.

The T-Rib Beam 102 can be built in Thermoset or Thermoplastic Composite layups. The Conduits are laid at predetermined positions after ply layups to form the T-Rib shape using the Prepreg Fiber or the Wet Layup process. The conduits are part of composite layup and embedded in Fiber (fabric or tape). The T-Rib beam with Conduits are autoclave pressure cured.

The T-Rib Beam can also be built using conduit embedded with composite or aluminum Chopped Fiber and metallic outer Skin. The conduits can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. Hence with the applied cable tension, compression is created in Pre-Stressed Composite part to take more tension for the applied load.

Figure 5:
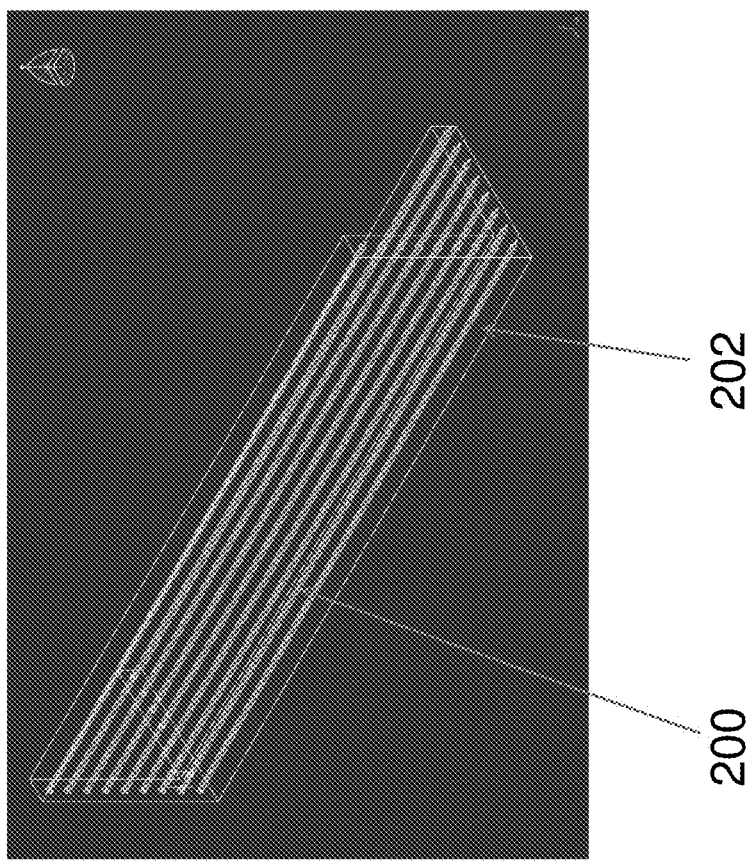
FIGS. 5-8 illustrate an embodiment of a Pre-Stressed Composite Angle Spar Beam.

FIG. 5 illustrates a wire-frame view of a Pre-Stressed Composite Angle Spar Beam. In this figure, a conduit and cable 200 are included in the composite layup 202 of the Angle Spar beam.

Figure 6:
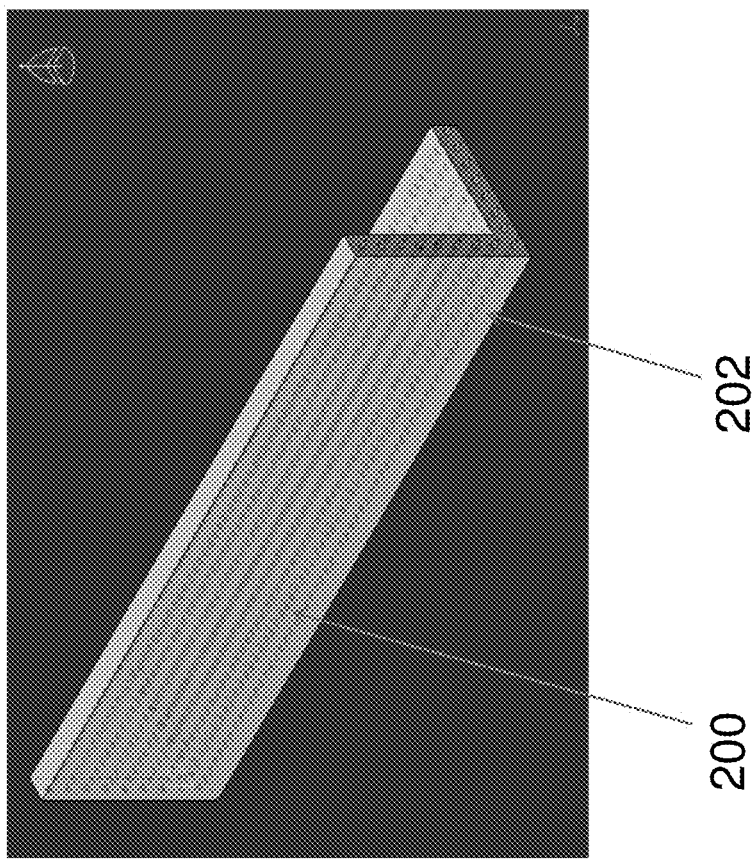

FIG. 6 illustrates a shaded view of the Pre-Stressed Composite Angle Spar Beam. In this figure, the same conduit and cable 200 are included in the composite layup 202 of the Angle Spar beam.

Figure 7:
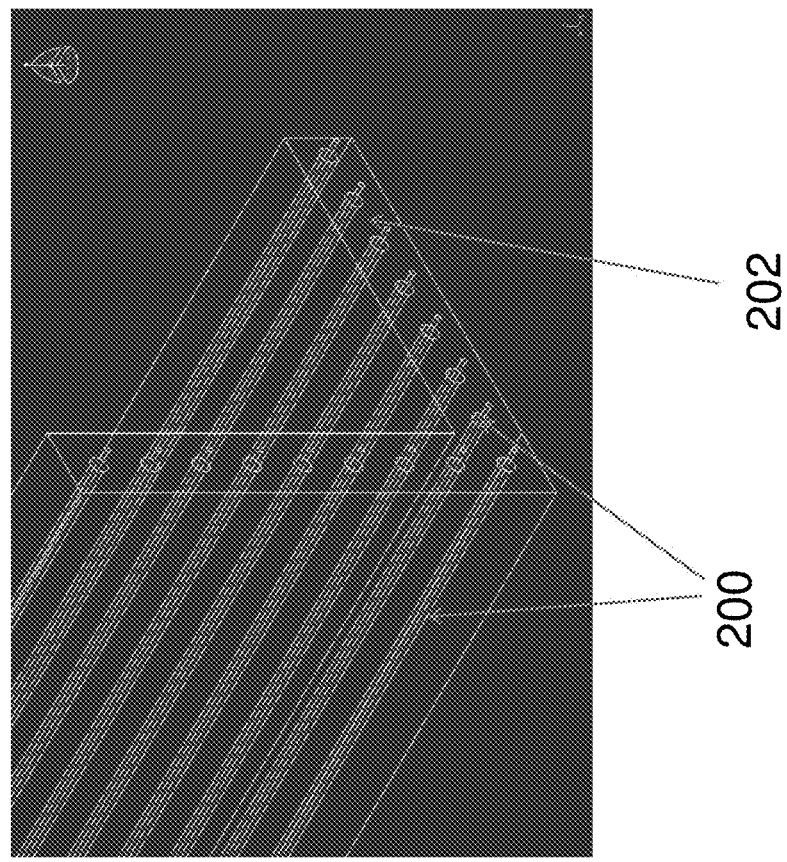

FIG. 7 illustrates a detailed wire-frame view of a Pre-Stressed Composite Angle Spar Beam. In this figure, a conduit and cable 200 are included in the composite layup 202 of the Angle Spar beam.

Figure 8:
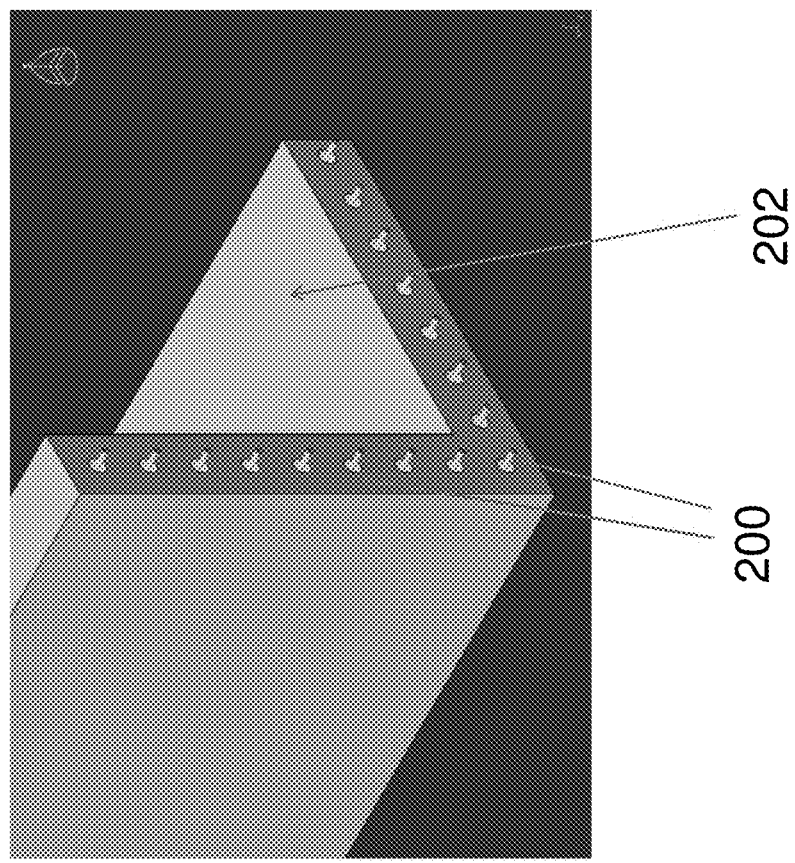

FIG. 8 illustrates a detailed shaded view of the Pre-Stressed Composite Angle Spar Beam. In this figure, the same conduit and cable 200 are included in the composite layup 202 of the Angle Spar beam.

The Angle Spar Beam 202 can be built in Thermoset or Thermoplastic Composite layups. The Conduits are laid at predetermined positions after ply layups to form the Angle Spar shape using the Prepreg Fiber or the Wet Layup process. The conduits are part of composite layup and embedded in Fiber (fabric or tape). The Angle Spar beam with conduits are autoclave pressure cured.

The Angle Spar Beam can also be built using Conduit embedded with composite or aluminum Chopped Fiber and metallic outer Skin. The conduits can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. Hence with the applied cable tension, compression is created in Pre-Stressed Composite part to take more tension for the applied load.

Figure 9:
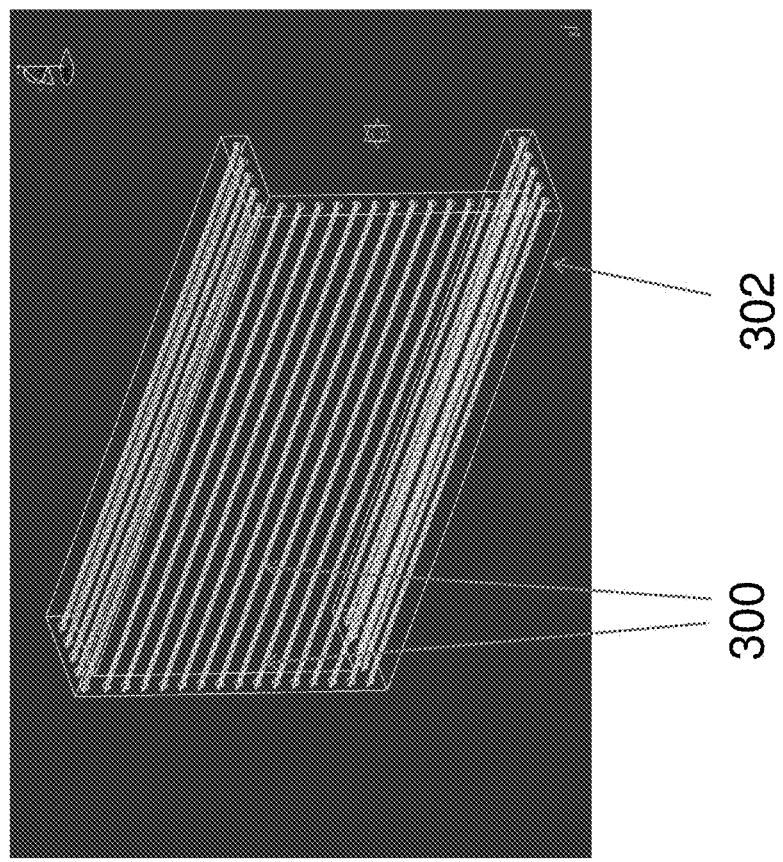
FIGS. 9-12 illustrate an embodiment of a Pre-Stressed Composite Channel Beam.

FIG. 9 illustrates a wire-frame view of a Pre-Stressed Composite Channel Beam. In this figure, a conduit and cable 300 are included in the composite layup 302 of the Channel beam.

Figure 10:
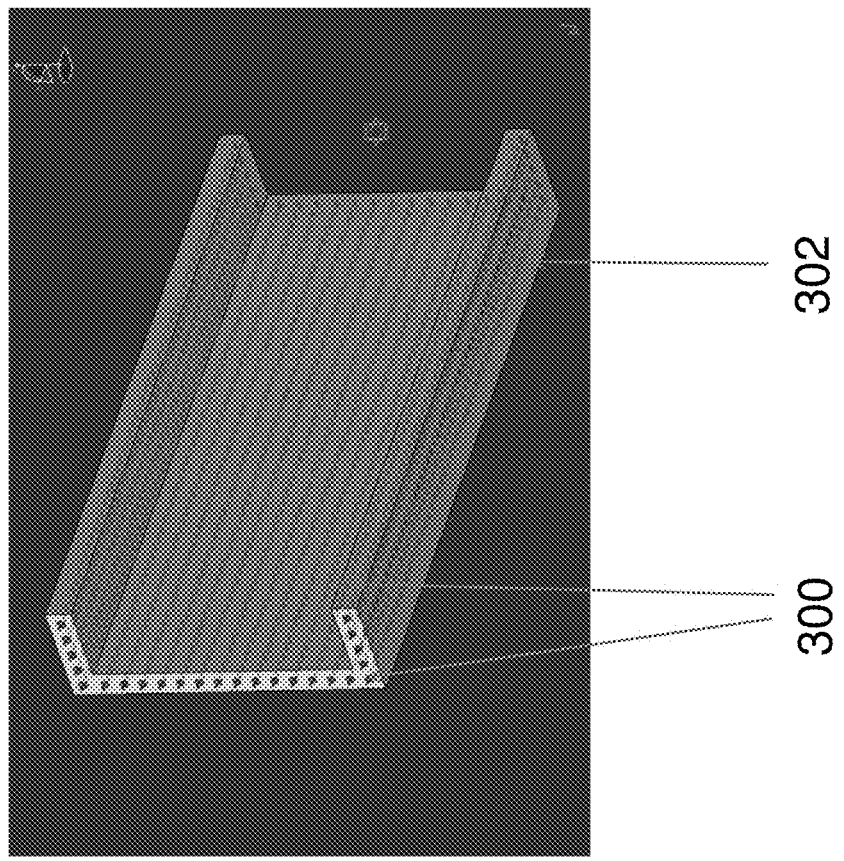

FIG. 10 illustrates a shaded view of the Pre-Stressed Composite Channel Beam. In this figure, the same conduit and cable 300 are included in the composite layup 302 of the Channel beam.

Figure 11:
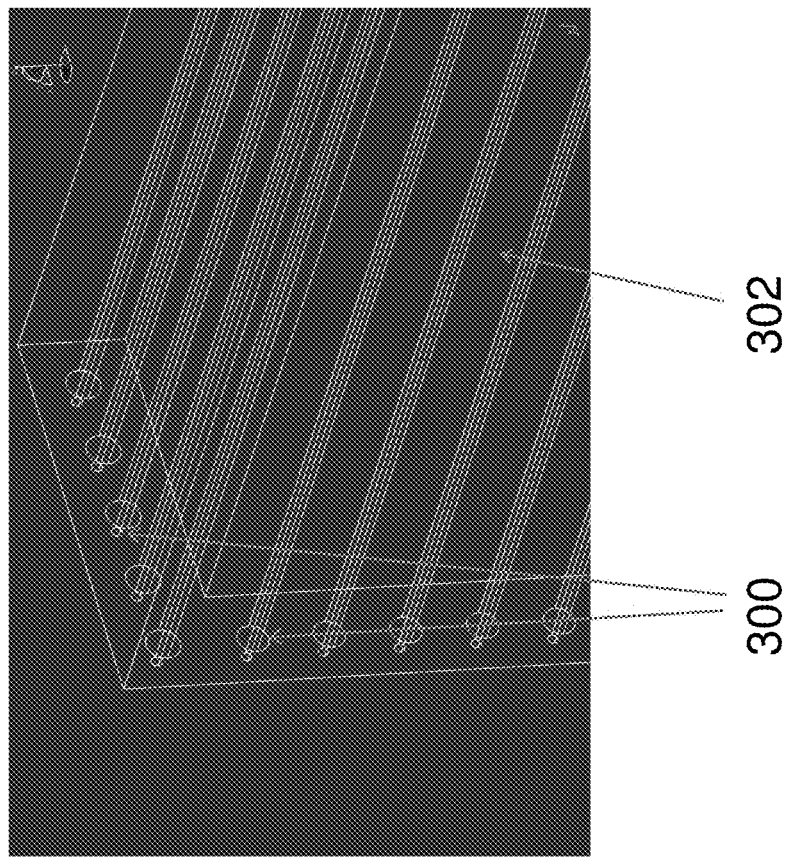

FIG. 11 illustrates a detailed wire-frame view of a Pre-Stressed Composite Channel Beam. In this figure, a conduit and cable 300 are included in the composite layup 302 of the Channel beam.

Figure 12:
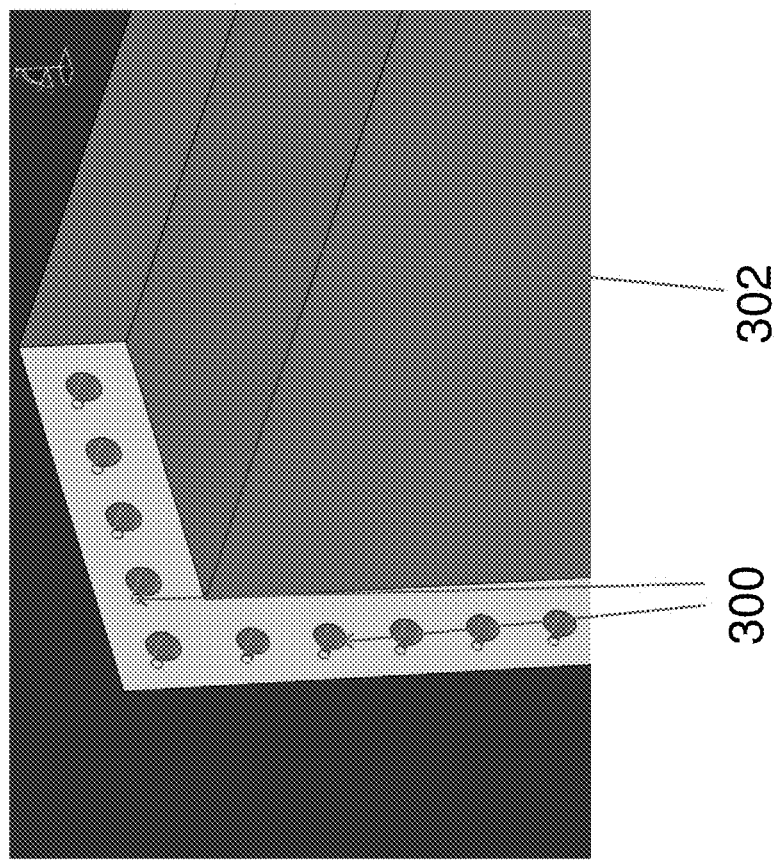

FIG. 12 illustrates a detailed shaded view of the Pre-Stressed Composite Channel Beam. In this figure, the same conduit and cable 300 are included in the composite layup 302 of the Channel beam.

The Channel Beam 302 can be built in Thermoset or Thermoplastic Composite layups. The Conduits are laid at predetermined positions after ply layups to form the Channel shape using the Prepreg Fiber or the Wet Layup process. The conduits are part of composite layup and embedded in Fiber (fabric or tape). The Channel beam with conduits are autoclave pressure cured.

The Channel Beam can also be built using Conduits embedded with composite or aluminum Chopped Fiber and metallic outer Skin. The conduits can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. Hence with the applied cable tension, compression is created in Pre-Stressed Composite part to take more tension for the applied load.

Figure 13:
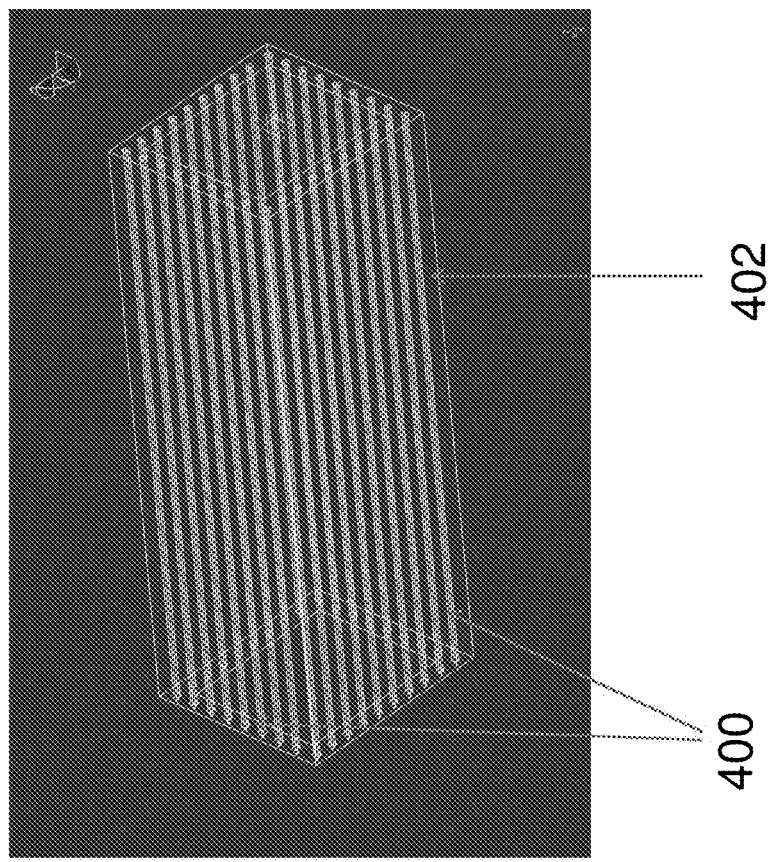
FIGS. 13-16 illustrate an embodiment of a Pre-Stressed Composite Box Beam.

FIG. 13 illustrates a wire-frame view of a Pre-Stressed Composite Box Beam. In this figure, a conduit and cable 400 are included in the composite layup 402 of the Box beam.

Figure 14:
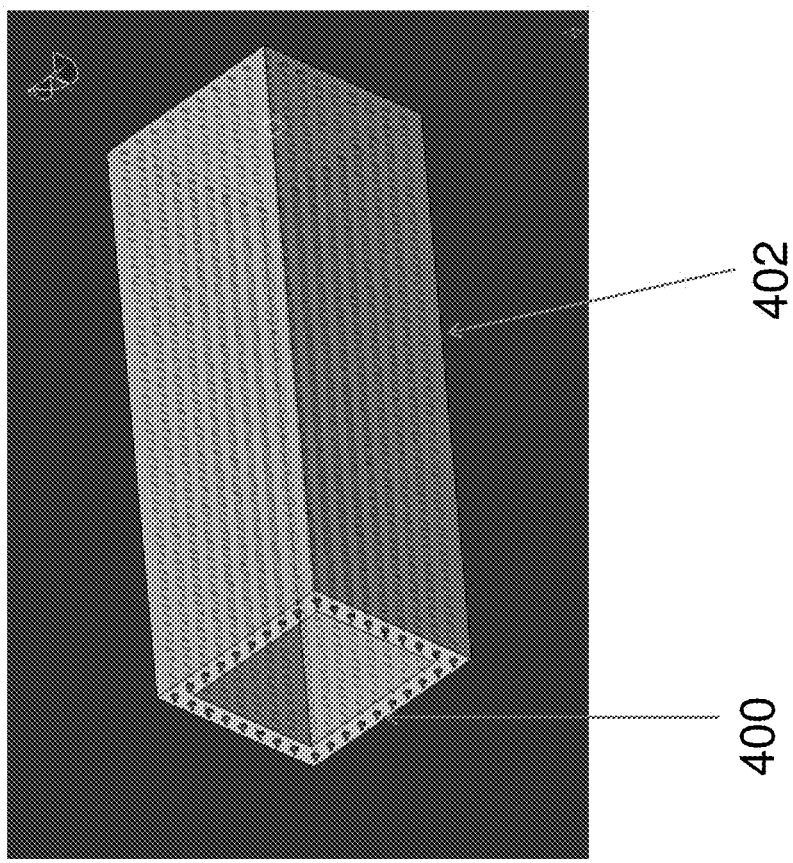

FIG. 14 illustrates a shaded view of the Pre-Stressed Composite Box Beam. In this figure, the same conduit and cable 400 are included in the composite layup 402 of the Box beam.

Figure 15:
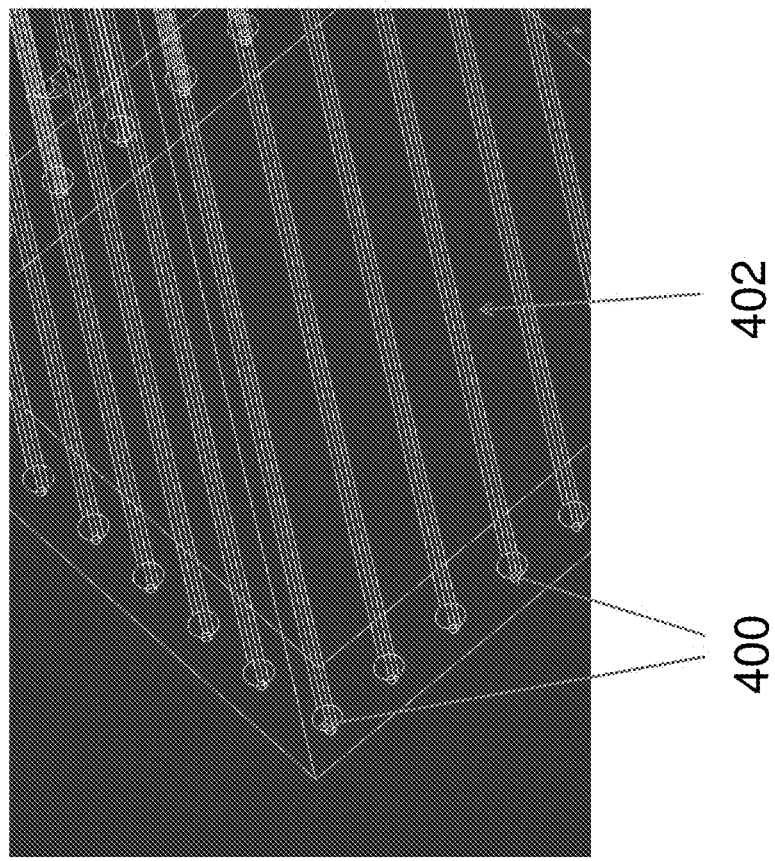

FIG. 15 illustrates a detailed wire-frame view of a Pre-Stressed Composite Box Beam. In this figure, a conduit and cable 400 are included in the composite layup 402 of the Box beam.

Figure 16:
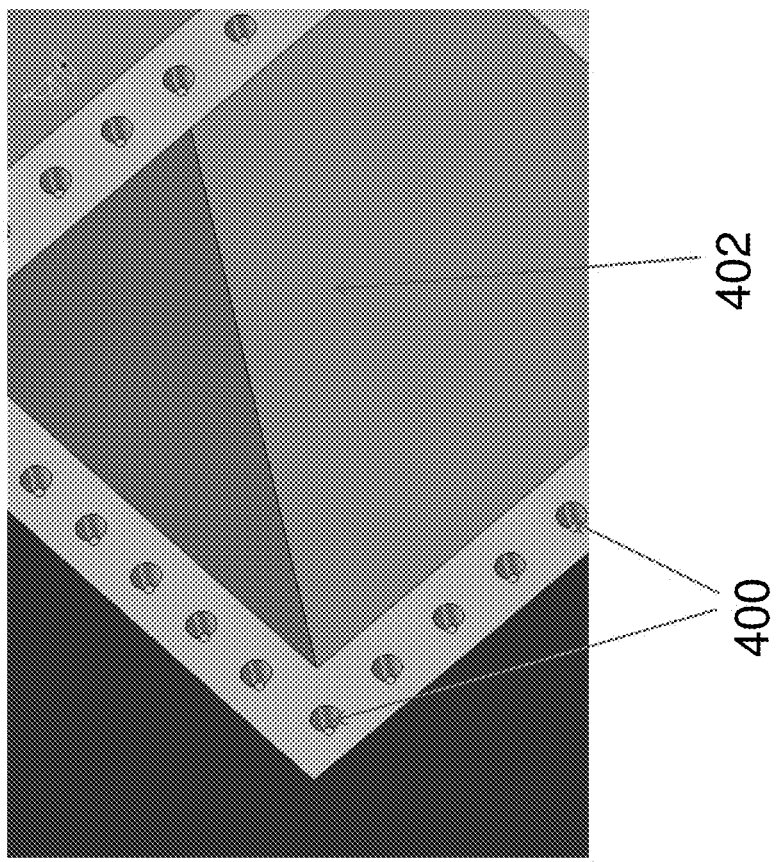

FIG. 16 illustrates a detailed shaded view of the Pre-Stressed Composite Box Beam. In this figure, the same conduit and cable 400 are included in the composite layup 402 of the Box beam.

The Box Beam 402 can be built in Thermoset or Thermoplastic Composite layups. The Conduits are laid at predetermined positions after ply layups to form the Box shape using the Prepreg Fiber or the Wet Layup process. The conduits are part of composite layup and embedded in Fiber (fabric or tape). The Box beam with conduits are autoclave pressure cured.

The Box Beam can also be built using Conduit embedded with composite or aluminum Chopped Fiber and metallic outer Skin. The conduits can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. Hence with the applied cable tension, compression is created in Pre-Stressed Composite part to take more tension for the applied load.

Figure 17:
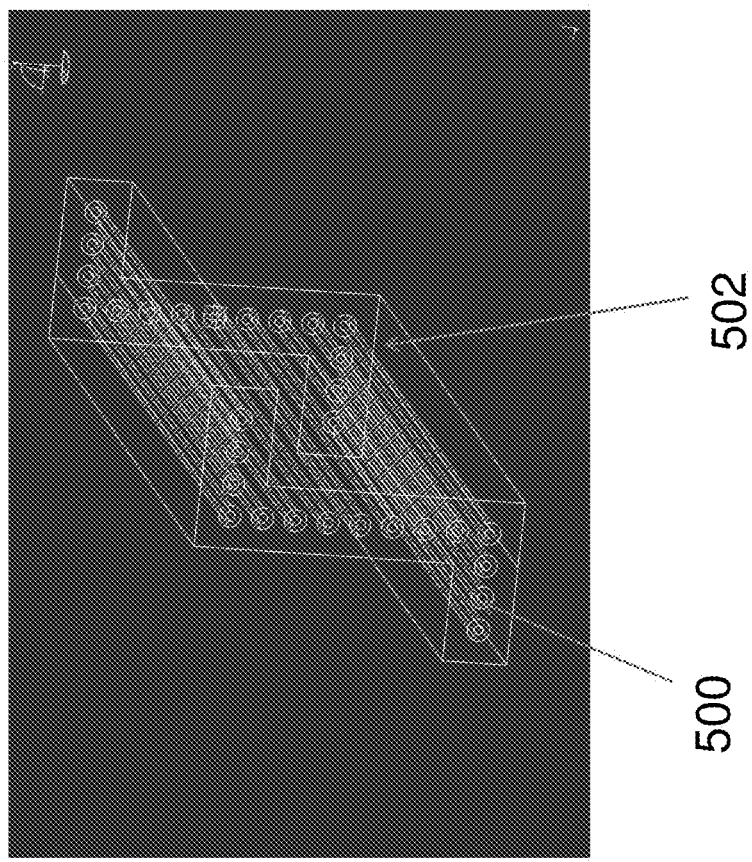
FIGS. 17-20 illustrate an embodiment of a Pre-Stressed Composite Stringer Beam.

FIG. 17 illustrates a wire-frame view of a Pre-Stressed Composite Stringer Beam. In this figure, a conduit and cable 500 are included in the composite layup 502 of the Stringer beam.

Figure 18:
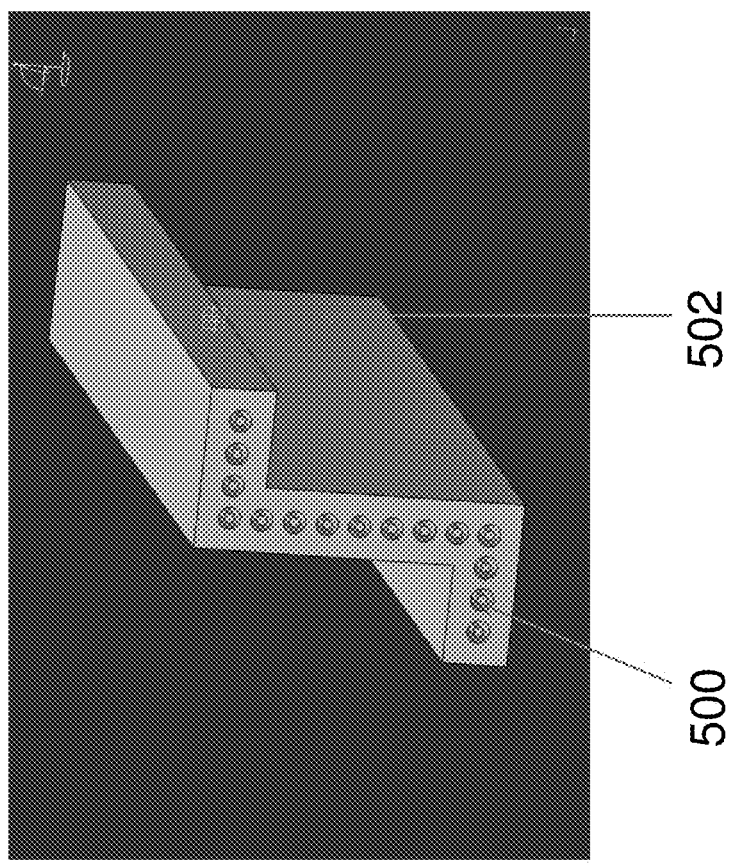

FIG. 18 illustrates a shaded view of the Pre-Stressed Composite Stringer Beam. In this figure, the same conduit and cable 500 are included in the composite layup 502 of the Stringer Beam.

Figure 19:
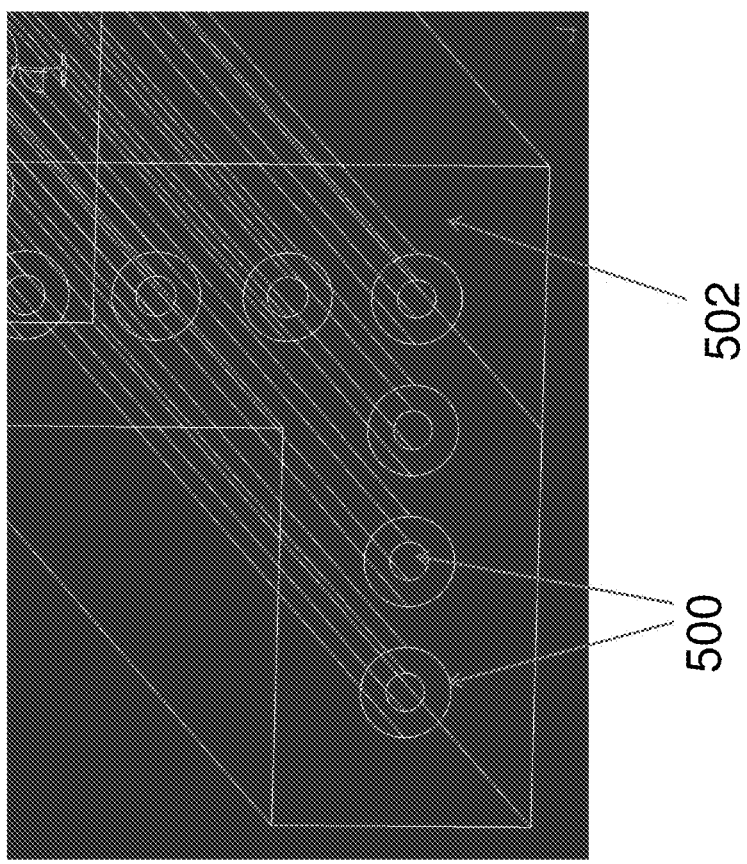

FIG. 19 illustrates a detailed wire-frame view of a Pre-Stressed Composite Stringer Beam. In this figure, a conduit and cable 500 are included in the composite layup 502 of the Stringer Beam.

Figure 20:
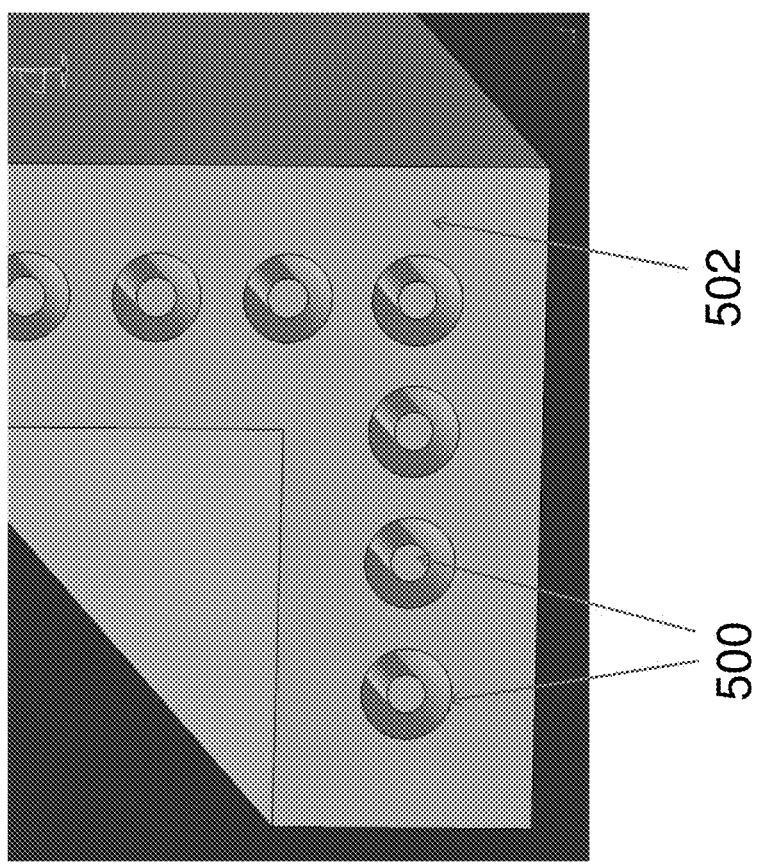

FIG. 20 illustrates a detailed shaded view of the Pre-Stressed Composite Stringer Beam. In this figure, the same conduit and cable 500 are included in the composite layup 502 of the Stringer Beam.

The Stringer Beam 502 can be built in Thermoset or Thermoplastic Composite layups. The Conduits are laid at predetermined positions after ply layups to form the Stringer shape using the Prepreg Fiber or the Wet Layup process. The conduits are part of composite layup and embedded in Fiber (fabric or tape). The Stringer beam with conduits are autoclave pressure cured.

The Stringer Beam can also be built using Conduit embedded with composite or aluminum Chopped Fiber and metallic outer Skin. The conduits can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. Hence with the applied cable tension, compression is created in Pre-Stressed Composite part to take more tension for the applied load.

Figure 21:
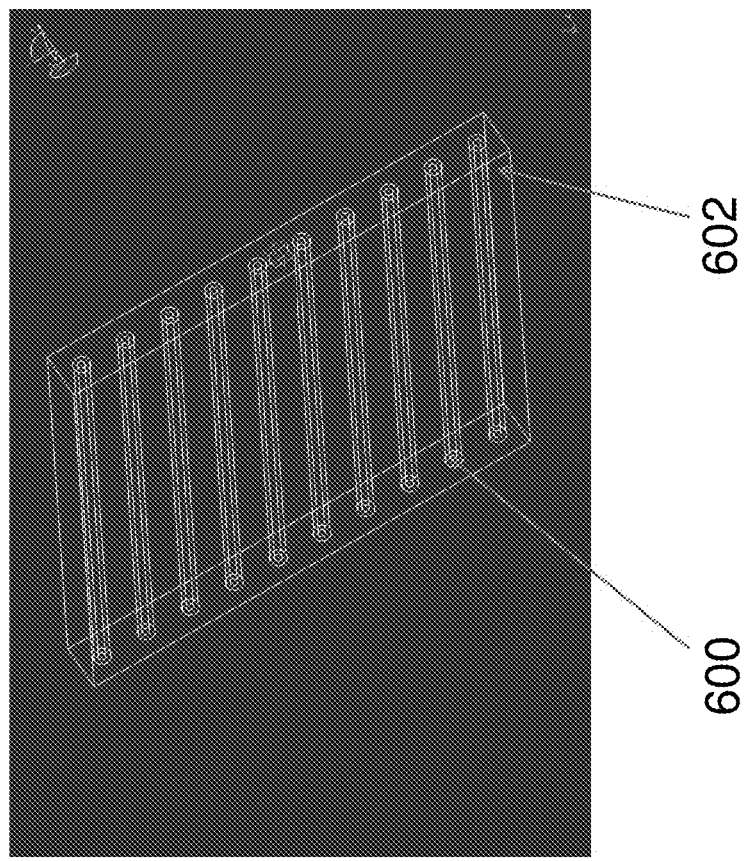
FIGS. 21-24 illustrate an embodiment of a Pre-Stressed Composite Flat Plate.

FIG. 21 illustrates a wire-frame view of a Pre-Stressed Composite Flat Plate. In this figure, a conduit and cable 600 are included in the composite layup 602 of the Flat Plate.

Figure 22:
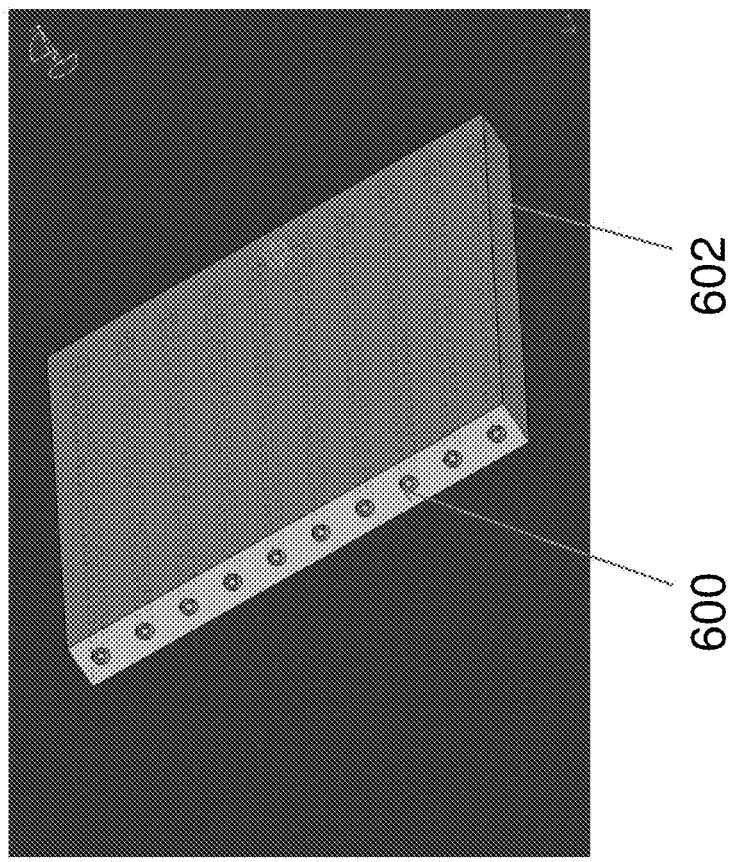

FIG. 22 illustrates a shaded view of the Pre-Stressed Composite Flat Plate. In this figure, the same conduit and cable 600 are included in the composite layup 602 of the Flat Plate.

Figure 23:
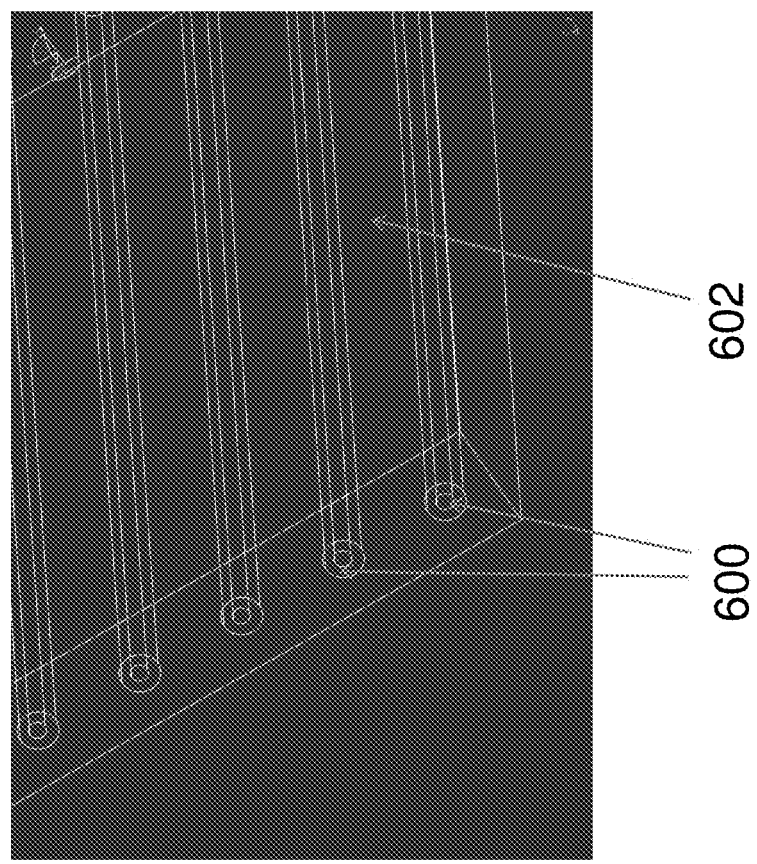

FIG. 23 illustrates a detailed wire-frame view of a Pre-Stressed Composite Flat Plate. In this figure, a conduit and cable 600 are included in the composite layup 602 of the Flat Plate.

Figure 24:
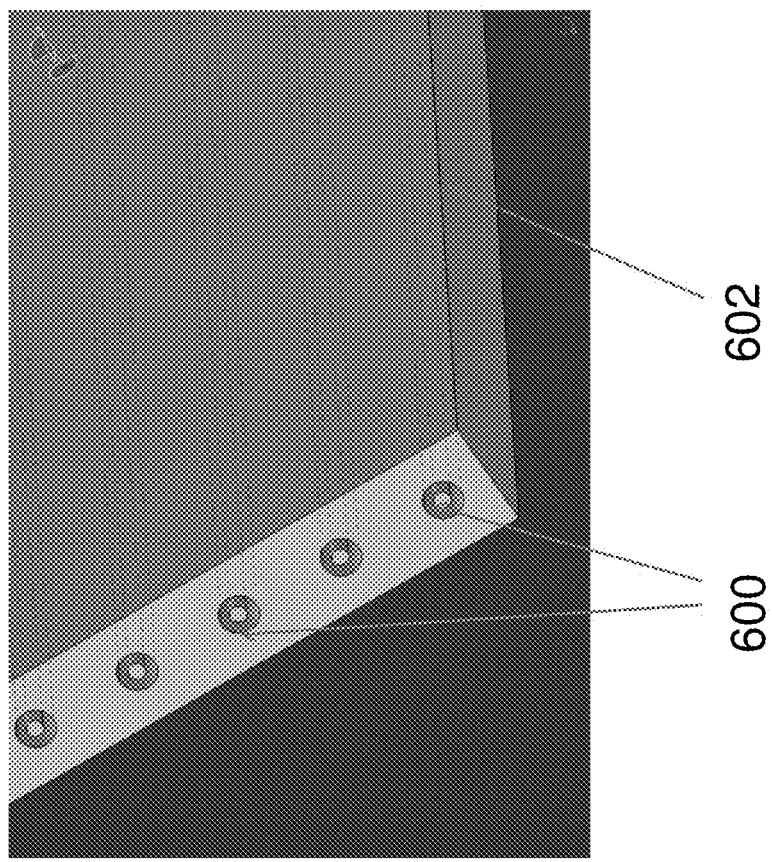

FIG. 24 illustrates a detailed shaded view of the Pre-Stressed Composite Flat Plate. In this figure, the same conduit and cable 600 are included in the composite layup 602 of the Flat Plate.

The Flat Plate 602 can be built in Thermoset or Thermoplastic Composite layups. The Conduits are laid at predetermined positions after ply layups to form the Flat Plate shape using the Prepreg Fiber or the Wet Layup process. The Conduits are part of Composite layup and embedded in Fiber (fabric or tape). The Flat Plate with Conduits are autoclave pressure cured.

The Flat Plate can also be built using conduit embedded with composite or aluminum Chopped Fiber and metallic outer Skin. The Conduits can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. Hence with the applied cable tension, compression is created in Pre-Stressed Composite part to take more tension for the applied load.

Figure 25:
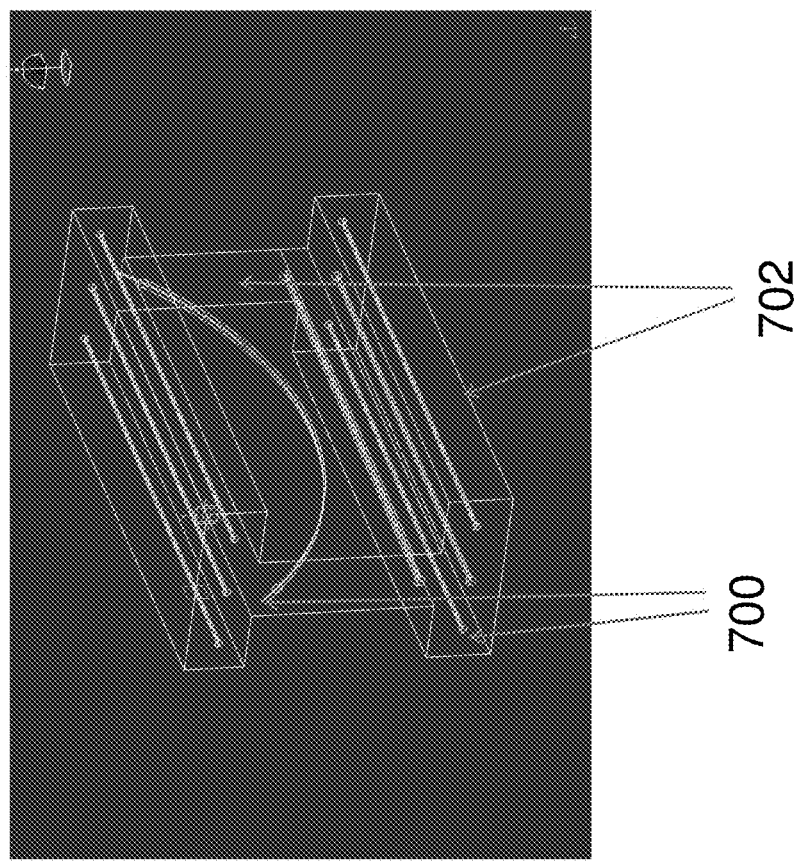
FIGS. 25-28 illustrate an embodiment of a Pre-Stressed Composite I-Beam for Flat Pressure Bulkhead Grillage.

FIG. 25 illustrates a wire-frame view of a Pre-Stressed Composite I-Beam for Flat Pressure Bulkhead Grillage. As illustrated, a conduit and cable 700 are included in the composite layup 702 of the I-Beam to be used for flat pressure bulkhead grillage.

Figure 26:
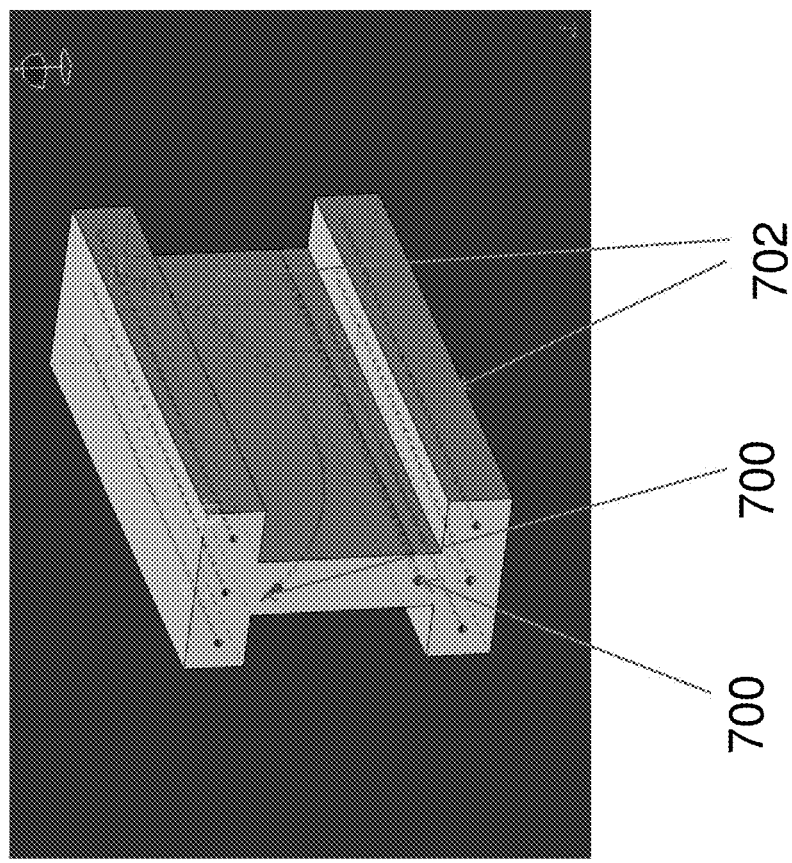

FIG. 26 illustrates a shaded view of the Pre-Stressed Composite I-Beam for Flat Pressure Bulkhead Grillage. In this figure, the same conduit and cable 700 are included in the composite layup 702 of the I-Beam to be used for flat pressure bulkhead grillage.

Figure 27:
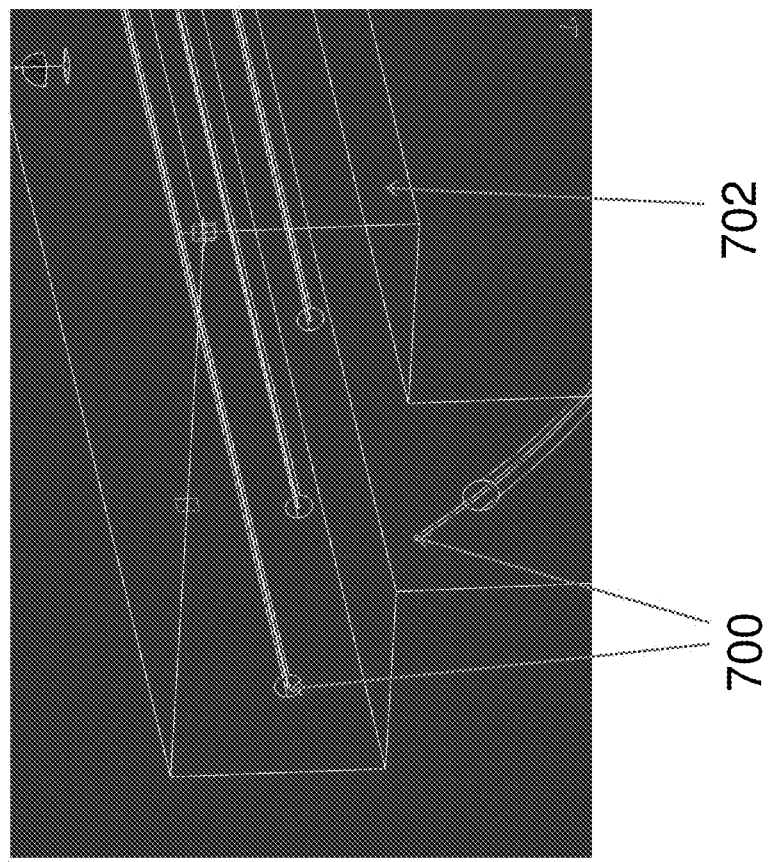

FIG. 27 illustrates a detailed wire-frame view of a Pre-Stressed Composite I-Beam for Flat Pressure Bulkhead Grillage. As illustrated, a conduit and cable 700 are included in the composite layup 702 of the I-Beam to be used for flat pressure bulkhead grillage.

Figure 28:
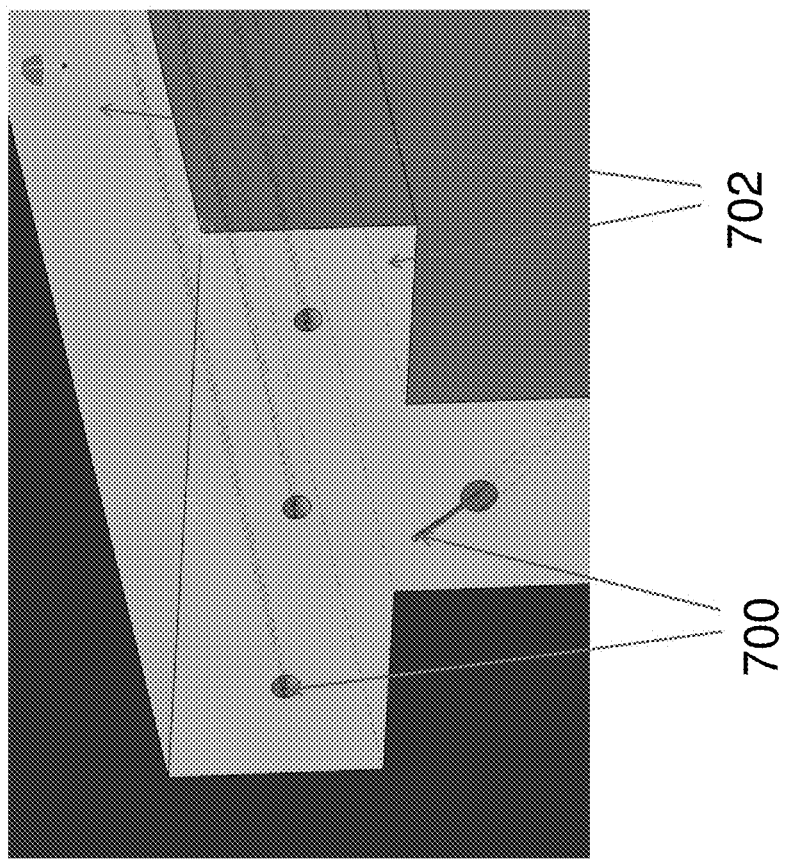

FIG. 28 illustrates a detailed shaded view of the Pre-Stressed Composite I-Beam for Flat Pressure Bulkhead Grillage. In this figure, the same conduit and cable 700 are included in the composite layup 702 of the I-Beam to be used for flat pressure bulkhead grillage.

The Composite Flat Pressure Bulkhead is built using several Composite I-Beams 702 attached to a flat Composite or Metallic plate. These I-Beams are bolted to the plate in parallel and across to form a Flat Pressure Bulkhead Grillage.

These I-Beams can be built in Thermoset or Thermoplastic Composite layups. The Conduits are placed at predetermined positions after ply layups to form the I-Beam shape using the Prepreg Fiber or Wet Layup process. The conduits are part of composite layup and embedded in the Fiber (fabric or tape). The I-Beams with Conduits are autoclave pressure cured. The Conduits can be made in metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. Hence with the applied cable tension, compression is created in Pre-Stressed Composite part to take more tension for the applied load.

Figure 29:
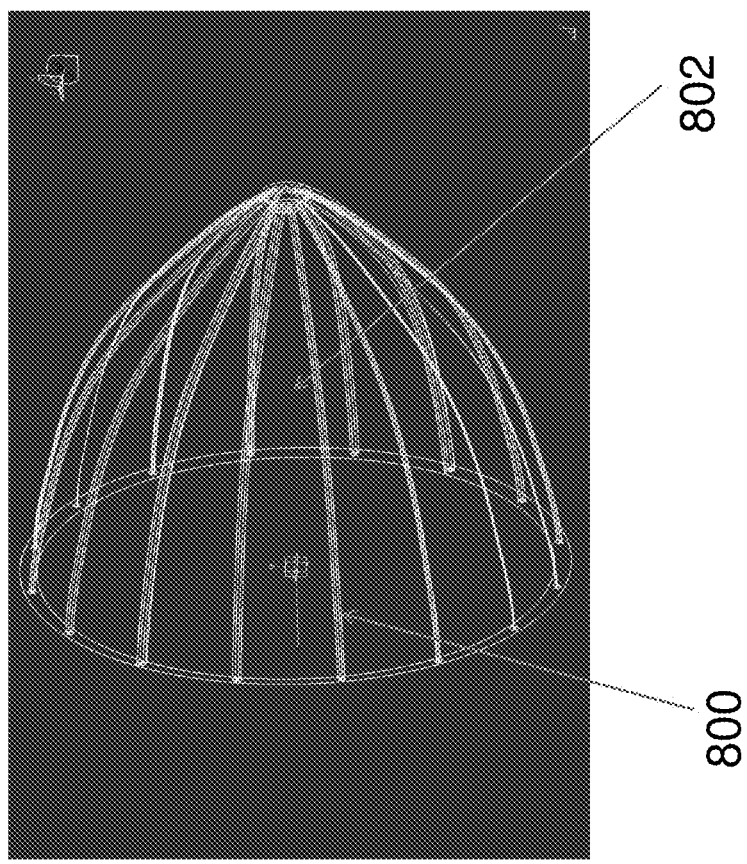
FIGS. 29-32 illustrate an embodiment of a Pre-Stressed Composite Dome Pressure Bulkhead.

FIG. 29 illustrates a wire-frame view of a Pre-Stressed Composite Dome Pressure Bulkhead. As illustrated, a conduit and cable 800 are included in the composite layup 802 of the Dome pressure bulkhead.

Figure 30:
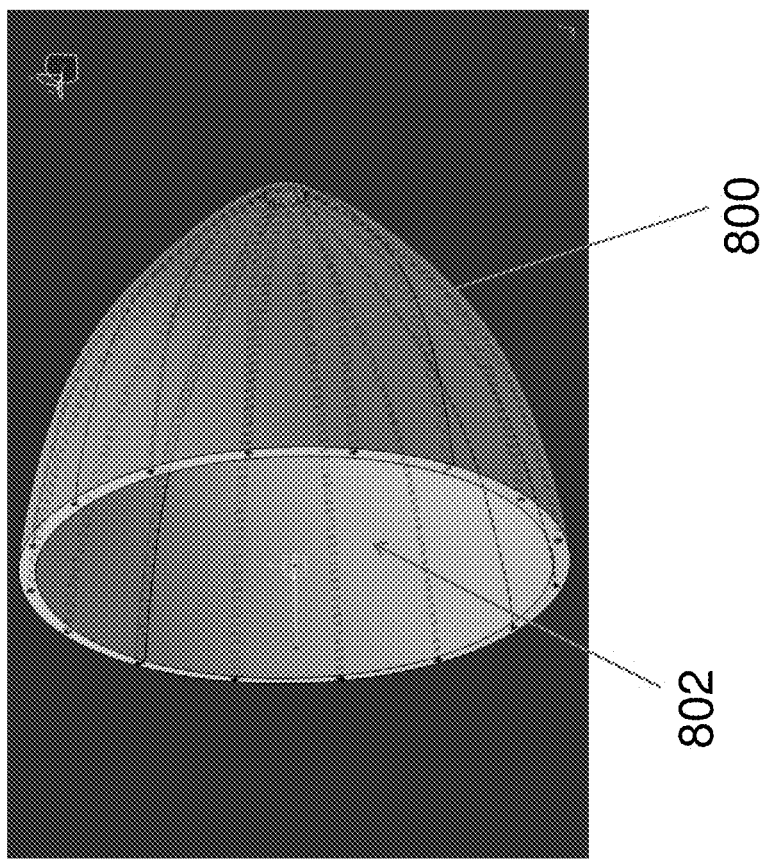

FIG. 30 illustrates a shaded view of the Pre-Stressed Composite Dome Pressure Bulkhead. In this figure, the same conduit and cable 800 are included in the composite layup 802 of the Dome pressure bulkhead.

Figure 31:
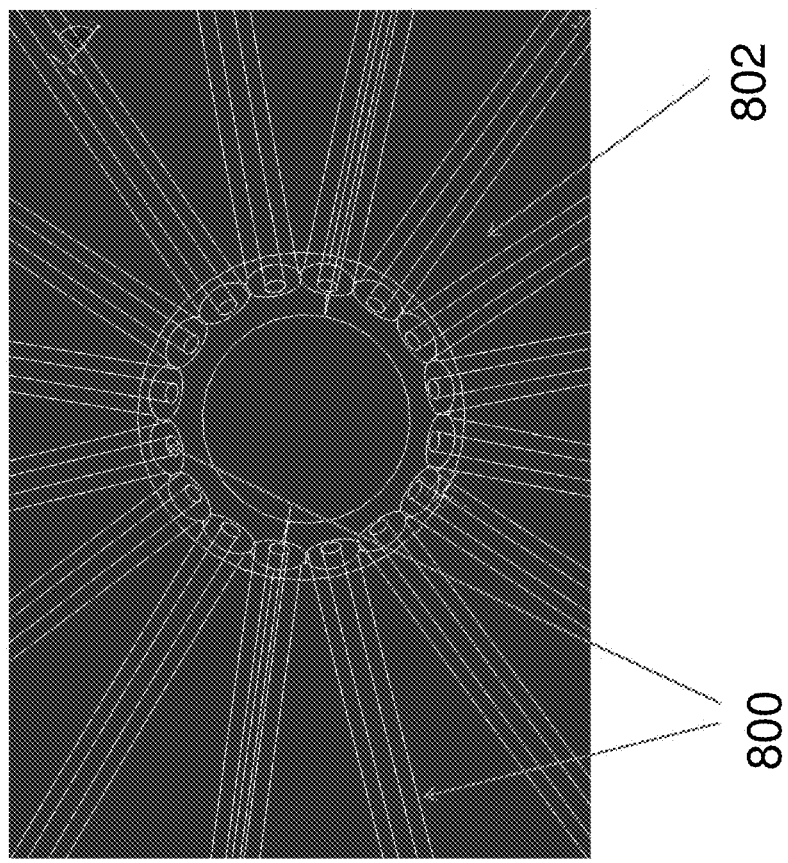

FIG. 31 illustrates a detailed wire-frame view of a Pre-Stressed Dome Pressure Bulkhead. As illustrated, a conduit and cable 800 are included in the composite layup 802 of the Dome pressure bulkhead.

Figure 32:
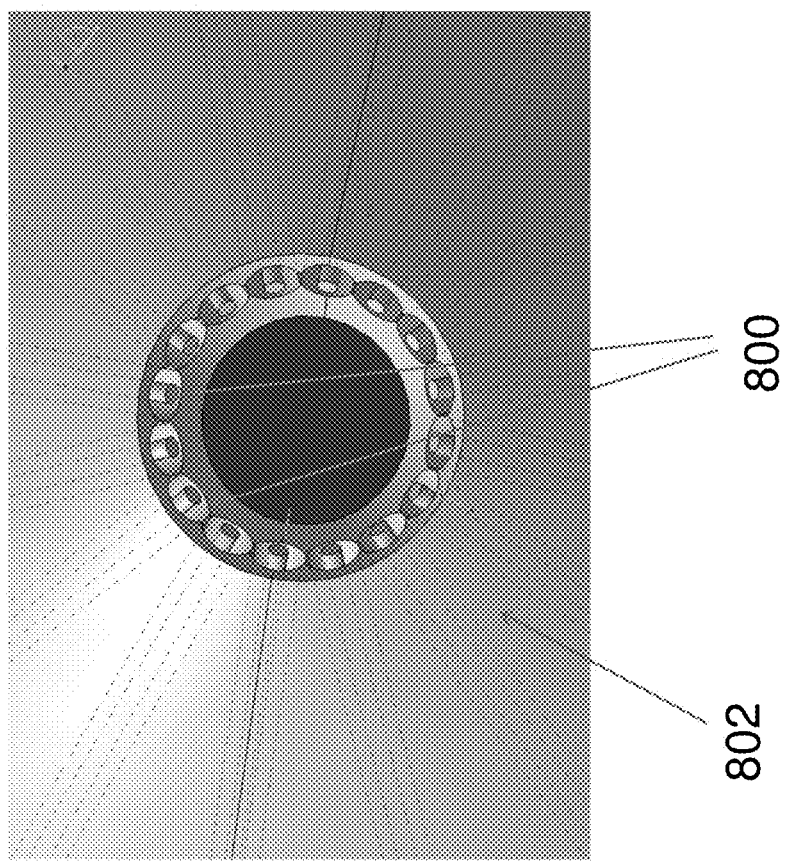

FIG. 32 illustrates a detailed shaded view of the Pre-Stressed Composite Dome Pressure Bulkhead. In this figure, the same conduit and cable 800 are included in the composite layup 802 of the Dome pressure bulkhead.

The Dome Pressure Bulkhead 802 can be built in Thermoset or Thermoplastic Composite layups. The Ply layups start on a Mandrel. The Conduits are laid at predetermined positions after Prepreg ply layups over the Mandrel surface. The Conduits are part of Composite layup and embedded in the Fiber (fabric or tape). The Dome Pressure Bulkhead with Conduits are autoclave pressure cured. The conduit can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. Hence with the applied cable tension, compression is created in Pre-Stressed Composite part to take more tension for the applied load.

The end of the Dome Pressure Bulkhead is Sealed by a Spherical Plate from inside. The Spherical Plate can be a thick Composite plate or it can be a Titanium or Steel Plate bonded or bolted to the Composite Dome.

Figure 33:
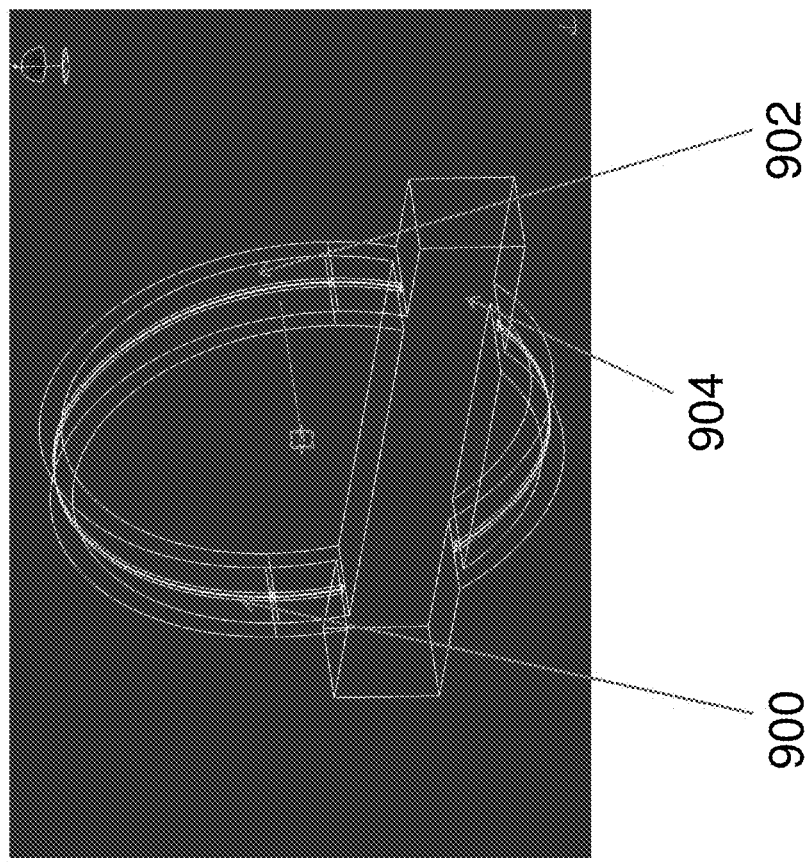
FIGS. 33-36 illustrate an embodiment of a Pre-Stressed Composite Fuselage Bulkhead.

FIG. 33 illustrates a wire-frame view of a Pre-Stressed Composite Fuselage Bulkhead. As illustrated, a conduit and cable 900 and wing carry-through 904 are included in the composite layup 902 of the fuselage bulkhead.

Figure 34:
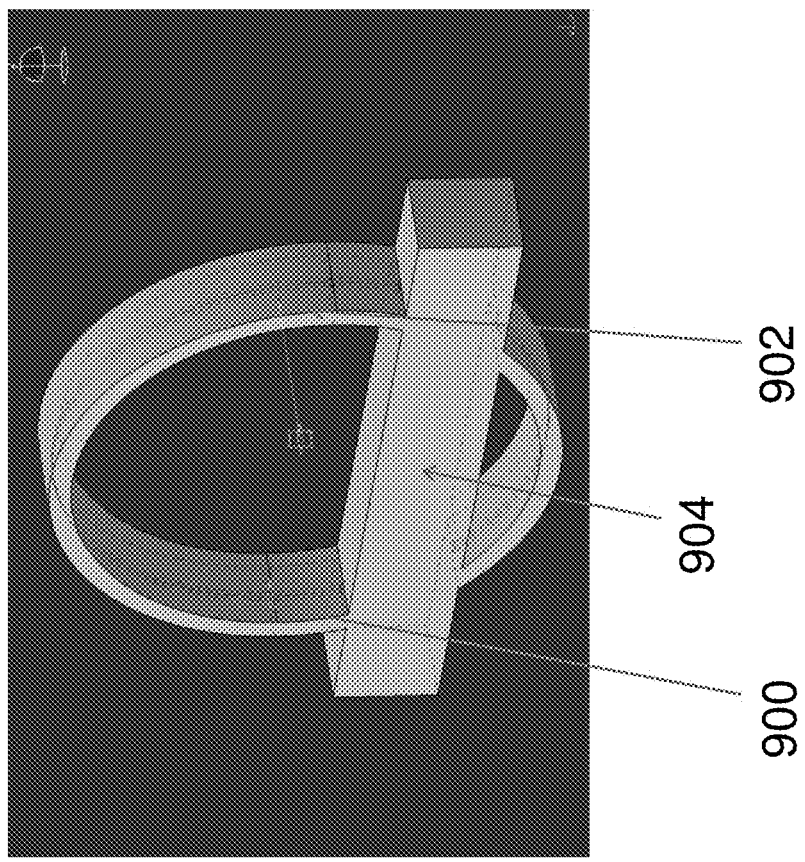

FIG. 34 illustrates a shaded view of the Pre-Stressed Composite Fuselage Bulkhead. In this figure, the same conduit and cable 900 and Wing Carry-through 904 are included in the composite layup 902 of the fuselage bulkhead.

Figure 35:
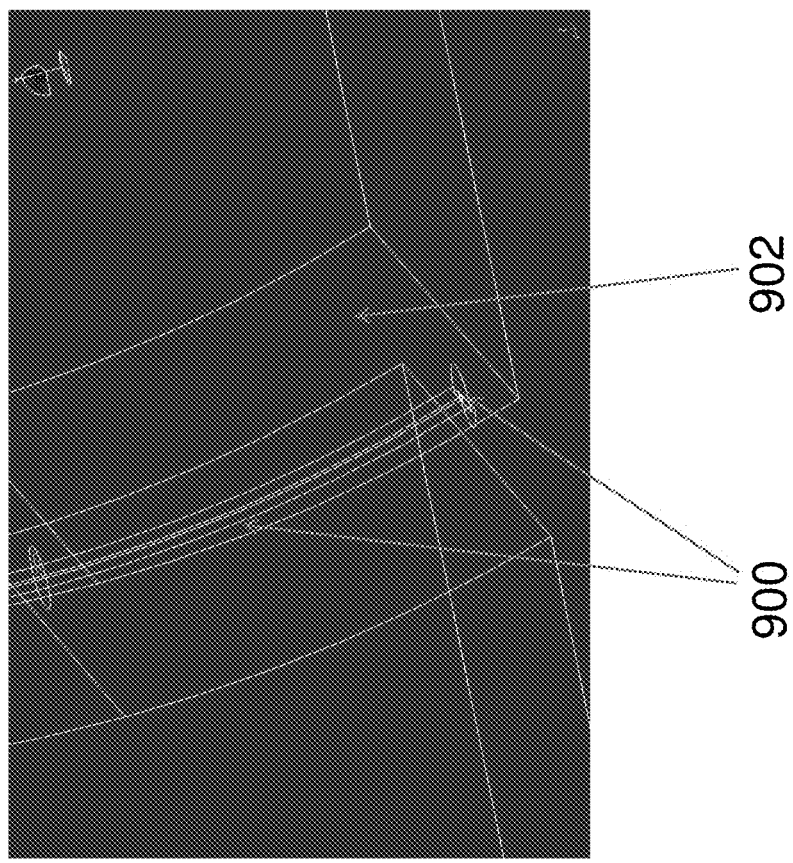

FIG. 35 illustrates a detailed wire-frame view of a Pre-Stressed Composite Fuselage Bulkhead. As illustrated, a conduit and cable 900 are included in the composite layup 902 of the fuselage bulkhead.

Figure 36:
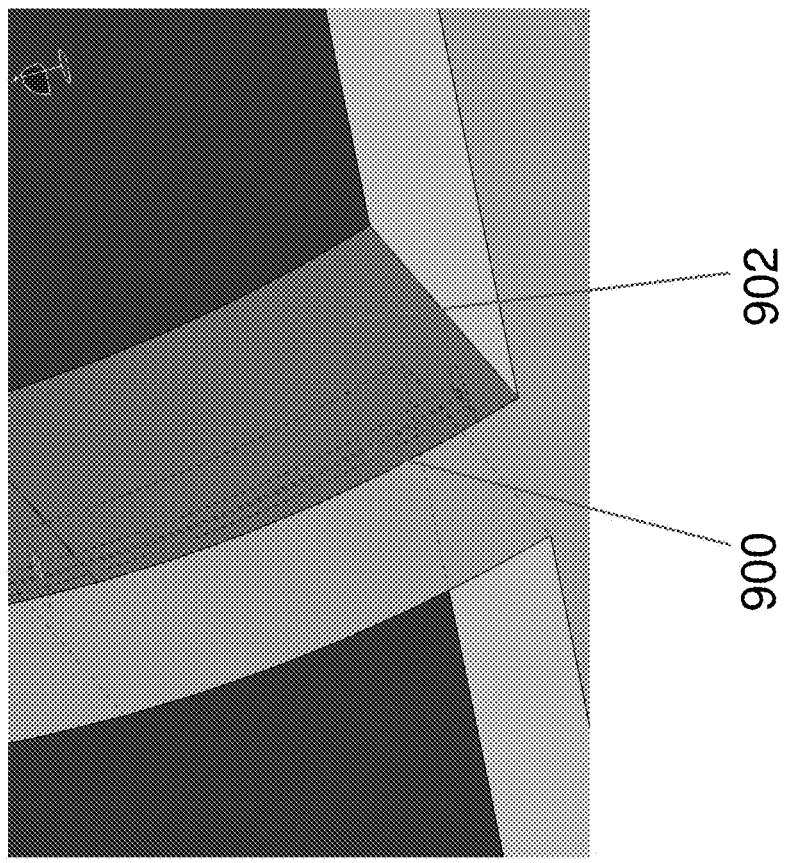

FIG. 36 illustrates a detailed shaded view of the Pre-Stressed Composite Fuselage Bulkhead. In this figure, the same conduit and cable 900 are included in the composite layup 902 of the fuselage bulkhead.

The Fuselage Bulkhead 902 can be built in Thermoset or Thermoplastic Composite layups. The Ply layups start on a Mandrel. The Conduits are laid at predetermined positions after Prepreg ply layups over the Mandrel surface. The conduits are part of composite layup and embedded in the Fiber (fabric or tape). The Fuselage Bulkhead with conduits are autoclave pressure cured. The conduit can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. The fuselage Bulkhead will behave as elastic structure because of tension in the Cable. Hence with the applied cable tension, compression is created in Pre-Stressed Composite part to take more tension for the applied load.

Figure 37:
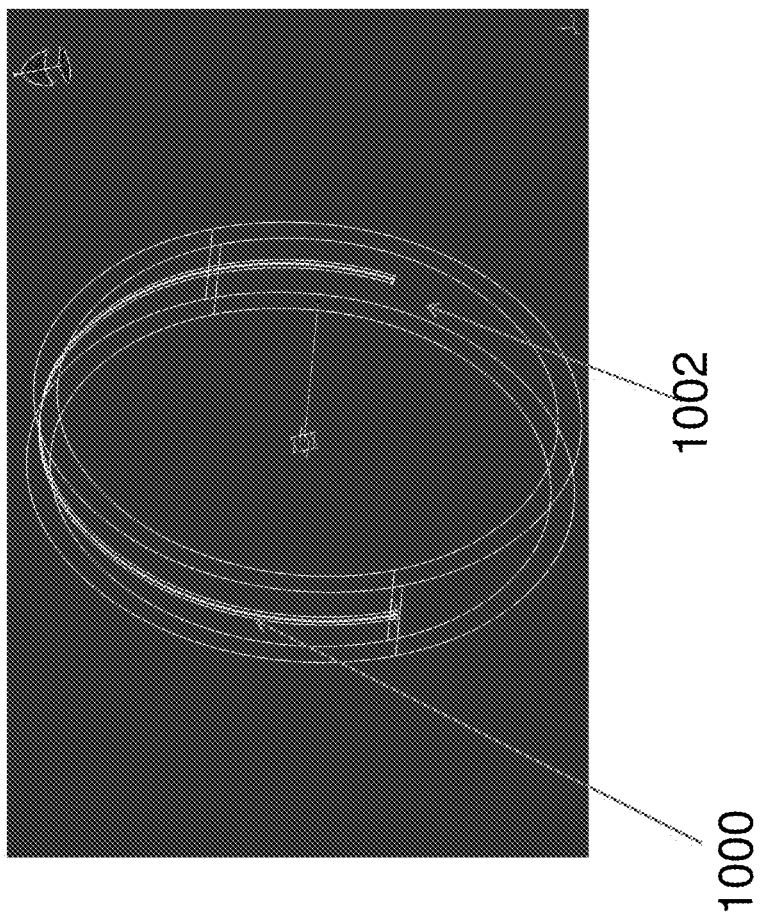
FIGS. 37-40 illustrate an embodiment of a Pre-Stressed Composite Fuselage Frame.

FIG. 37 illustrates a wire-frame view of a Pre-Stressed Composite Fuselage Frame. As illustrated, a conduit and cable 1000, and composite layup 1002 of the fuselage frame are shown.

Figure 38:
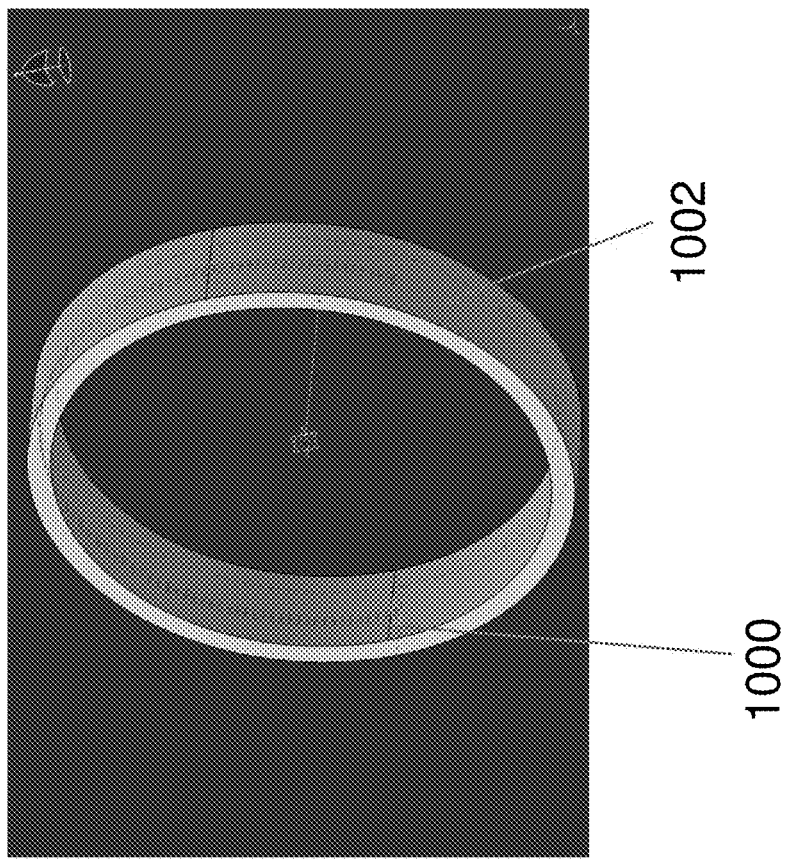

FIG. 38 illustrates a shaded view of the Pre-Stressed Composite Fuselage Frame. In this figure, the same conduit and cable 1000 are included in the composite layup 1002 of the fuselage frame.

Figure 39:
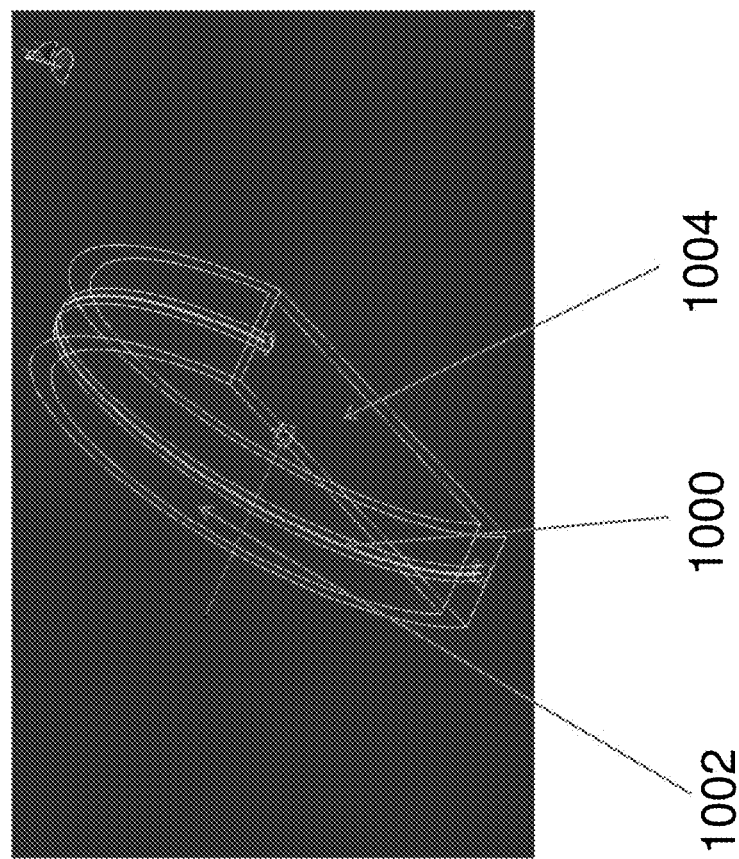

FIG. 39 illustrates a detailed wire-frame view of a Pre-Stressed Composite Fuselage Frame. As illustrated, a conduit and cable 1000, composite layup 1002, and cabin floor 1004 of the fuselage frame are shown.

Figure 40:
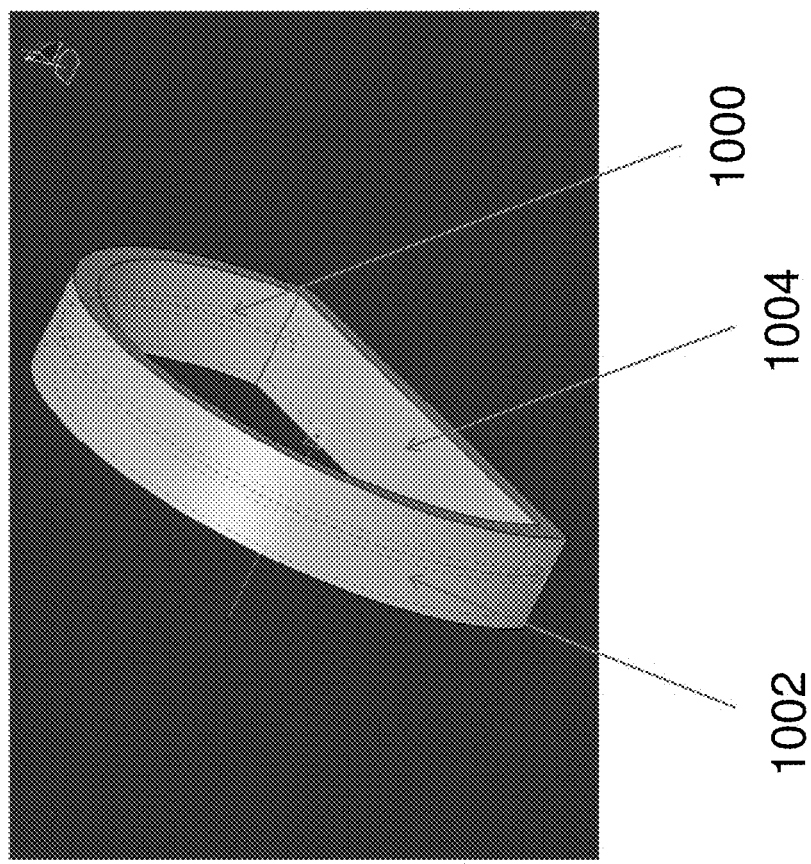

FIG. 40 illustrates a detailed shaded view of the Pre-Stressed Composite Fuselage Frame. In this figure, the same conduit and cable 1000 are included in the composite layup 1002 of the Fuselage Frame. The cabin floor 1004 is also shown.

The Fuselage Frame 1002 can be built in Thermoset or Thermoplastic Composite Layups. The Ply layups start on a Mandrel. The Conduits are laid at predetermined positions after Prepreg ply layups on the Mandrel surface. The Conduits are part of Composite layup and embedded in the Fabric. The Fuselage Frame with conduits are autoclave pressure cured. The conduits can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. The fuselage Frame will behave as elastic structure because of tension in the Cable. Hence with the applied cable tension, compression is created in Pre-Stressed Composite part to take more tension for the applied load.

Figure 41:
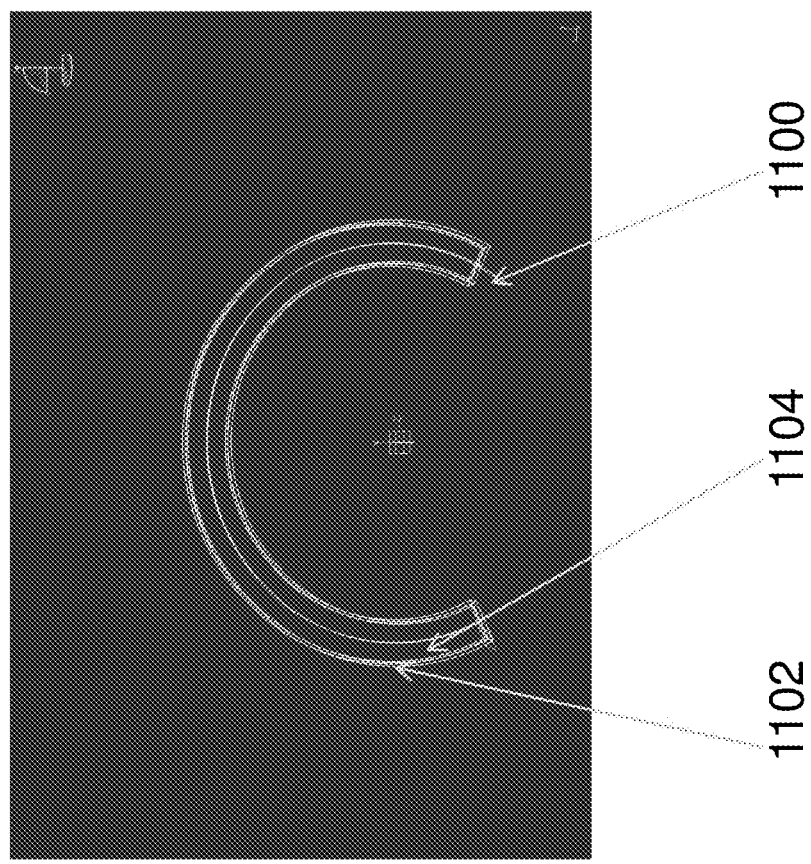
FIGS. 41-44 illustrate another embodiment of a Pre-Stressed Composite Hollow Fuselage Frame.

FIG. 41 illustrates a wire-frame view of a Pre-Stressed Composite Hollow Fuselage Frame 1102. As illustrated, a steel cable 1100, composite layup 1102, and chopped fiber 1104 are shown inside shell.

Figure 42:
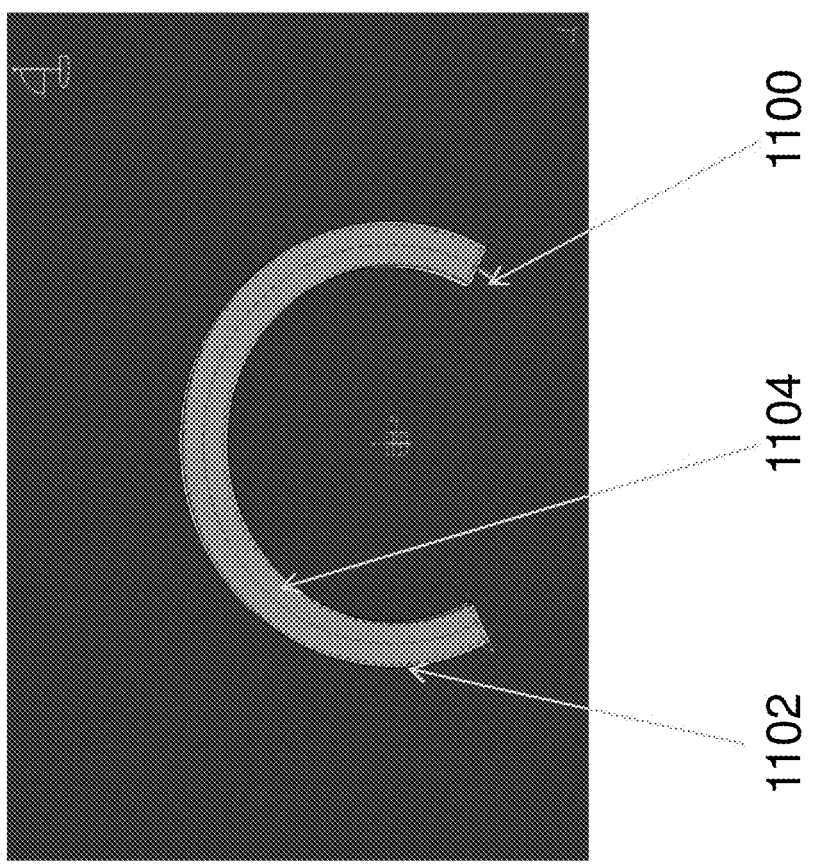

FIG. 42 illustrates a shaded view of the Pre-Stressed Composite Hollow Fuselage Frame 1102. In this figure, a Pre-Stressed cable 1100, composite layup 1102, and chopped fiber 1104 are shown inside shell.

Figure 43:
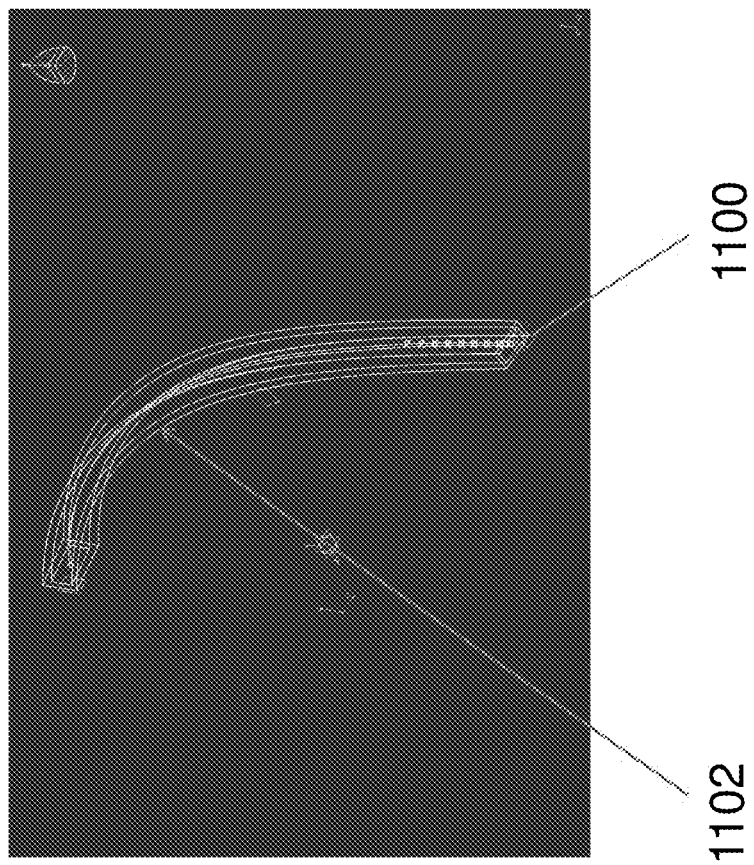

FIG. 43 illustrates a detailed wire-frame view of a Pre-Stressed Composite Hollow Box Fuselage Frame. As illustrated, a steel cable 1100 is included inside the composite layup 1102 of the hollow fuselage frame.

Figure 44:
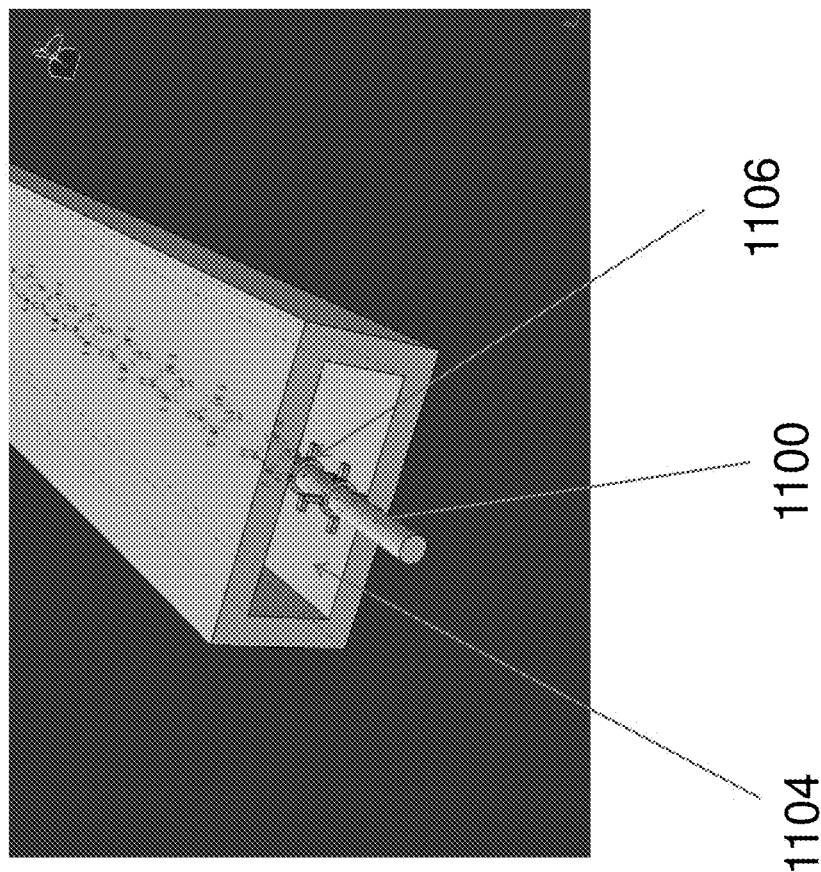

FIG. 44 illustrates a detailed shaded view of the Pre-Stressed Composite Hollow Fuselage Frame. In this figure, the steel cable 1100, composite layup 1102, the chopped fiber filling 1104 and movable metallic stirrups 1106 inside hollow fuselage frame are shown.

The Hollow Fuselage Frame 1102 can be built in Thermoset or Thermoplastic Composite Layups. The Ply Layups start on a Mandrel to form hollow box Frame shape using Prepreg Fiber or Wet Layup process. The hollow box Frame part is Autoclave Pressure Cured.

The Cable (steel) 1100 is laid inside the hollow portion of Frame. Movable metallic anchor Stirrups 1106 are added to the Cable. The hollow portion is filled with Composite or aluminum Chopped Fiber 1104. A calculated tension is applied to the Cable and it is anchored with jacks. The hollow portion is filled by injecting a special Resin with hardener and it is allowed to set until the cable is locked in the Resin. Anchors are then removed leaving permanent anchors at both ends of Frame.

The Pre-Stressed Composite Hollow Frame then achieves very high strength because of the cable tension in the part. The applied cable tension has induced compression in the surrounding areas of the cable where tension in the part normally will occur with the application of external applied loads. The fuselage hollow Frame will behave as elastic structure because of tension in the Cable. Hence with the applied cable tension, compression is created in Pre-Stressed Composite part to take more tension for the applied load.

Figure 45:
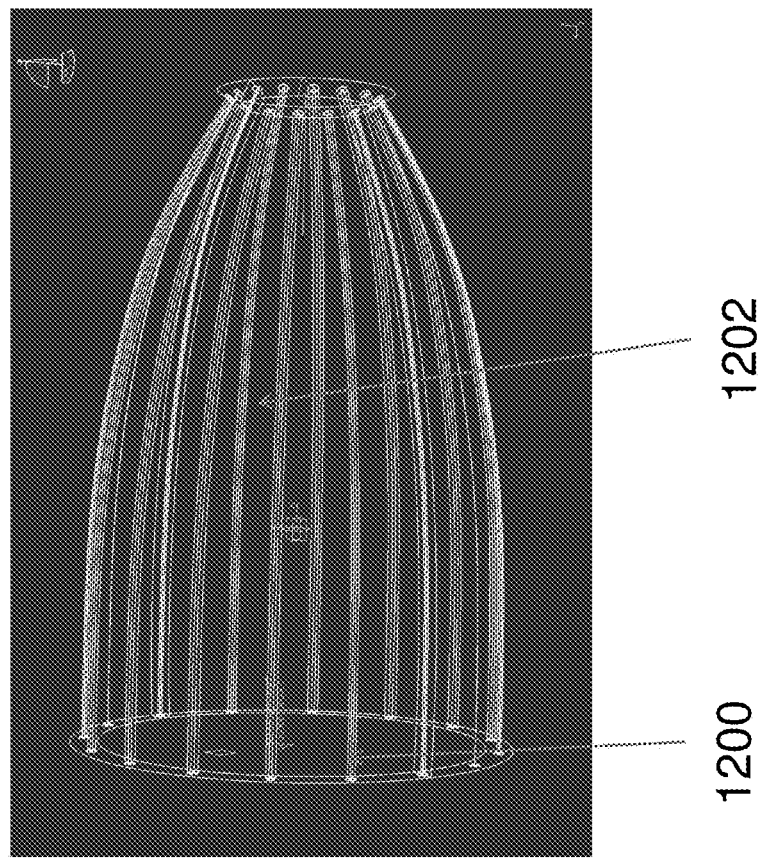
FIGS. 45-48 illustrate an embodiment of a Pre-Stressed Composite Engine Nacelle.

FIG. 45 illustrates a wire-frame view of a Pre-Stressed Composite Engine Nacelle. In this figure, a conduit and cable 1200 are included in the composite layup 1202 of the engine nacelle.

Figure 46:
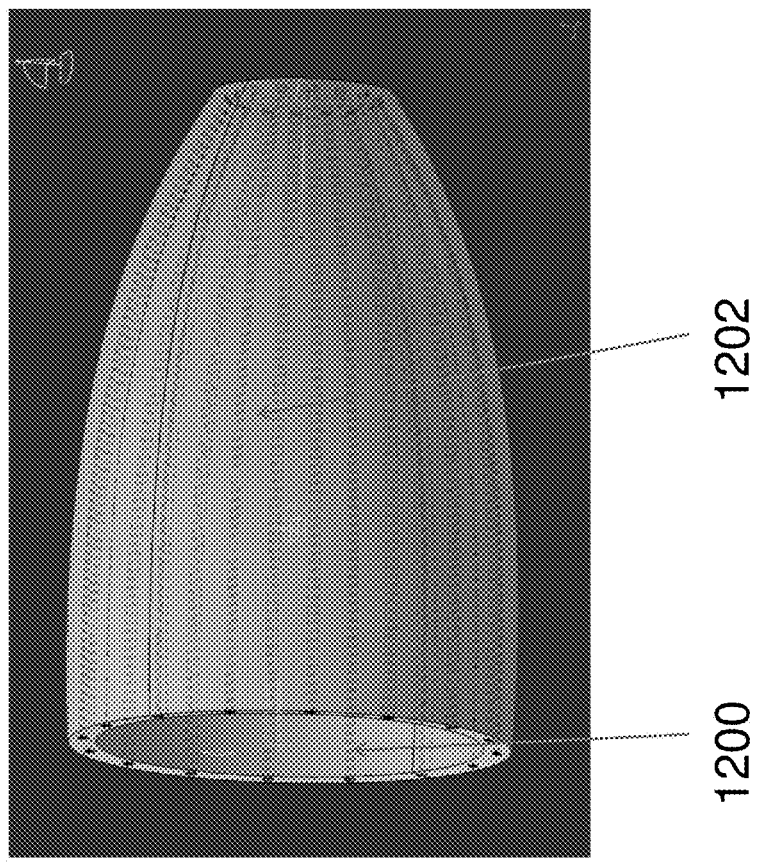

FIG. 46 illustrates a shaded view of the Pre-Stressed Composite Engine Nacelle. In this figure, the same conduit and cable 1200 are included in the composite layup 1202 of the engine nacelle.

Figure 47:
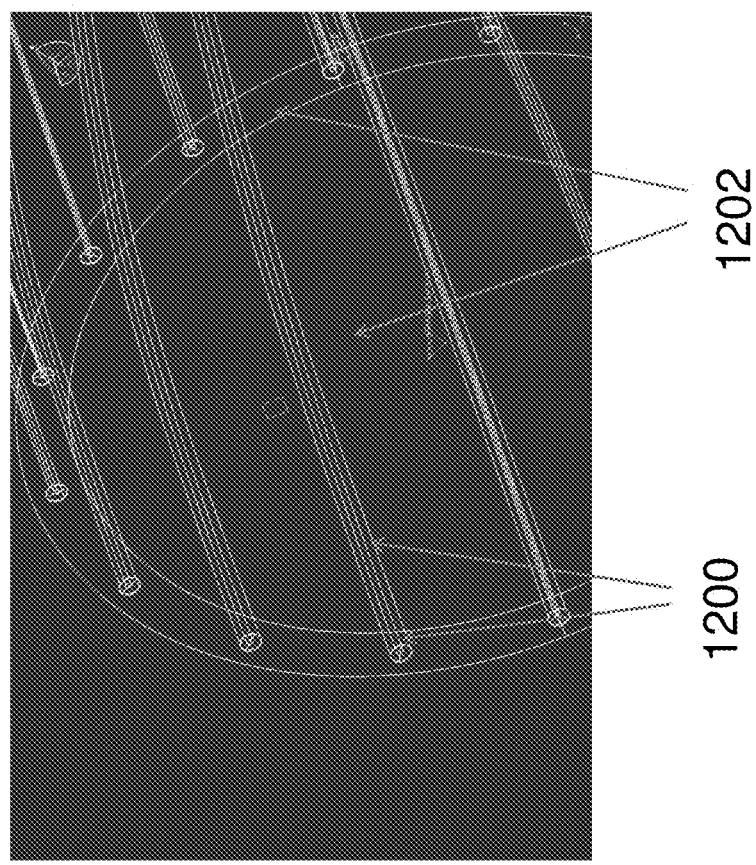

FIG. 47 illustrates a detailed wire-frame view of a Pre-Stressed Composite Engine Nacelle. In this figure, a conduit and cable 1200 are included in the composite layup 1202 of the engine nacelle.

Figure 48:
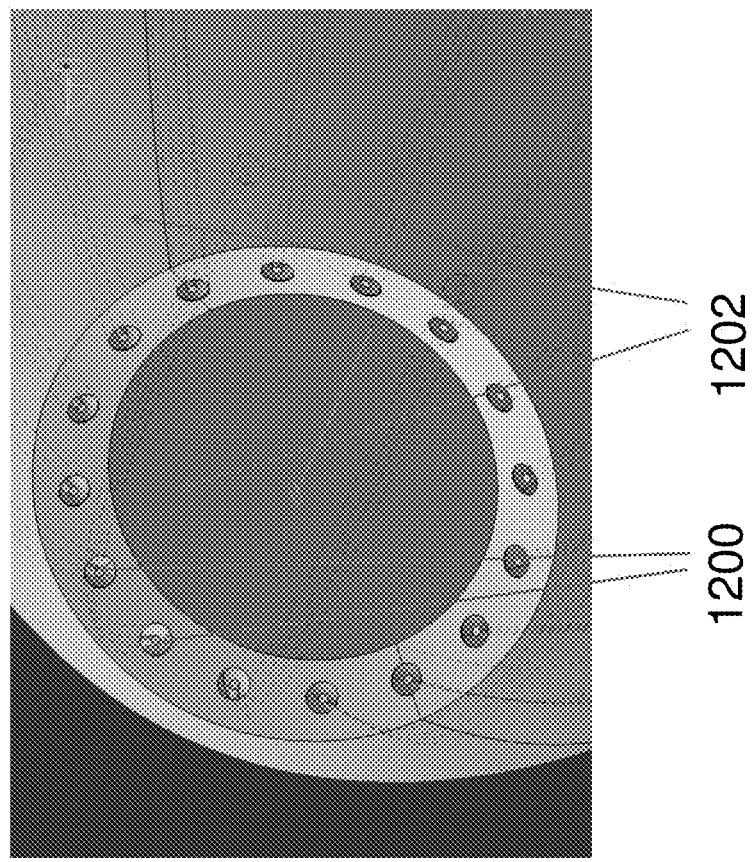

FIG. 48 illustrates a detailed shaded view of the Pre-Stressed Composite Engine Nacelle. In this figure, the same conduit and cable 1200 are included in the composite layup 1202 of the engine nacelle.

The Composite Engine Nacelle 1202 can be built in Thermoset or Thermoplastic Composite Layups. The Ply layups start on a Mandrel. The Conduits are laid at predetermined positions after Prepreg ply layups on the Mandrel surface. The conduits are part of composite layup and embedded in the Fiber. The Composite Engine Nacelle with conduits are autoclave pressure cured. The Mandrel is removed after cure. The conduit can be made from metal or glass fiber.

The Engine Nacelle can also be built using Conduits embedded with composite or aluminum Chopped Fiber and metallic outer Skin. The conduits can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. Hence with the applied cable tension, compression is created in Pre-Stressed Composite part to take more tension for the applied load.

Figure 49:
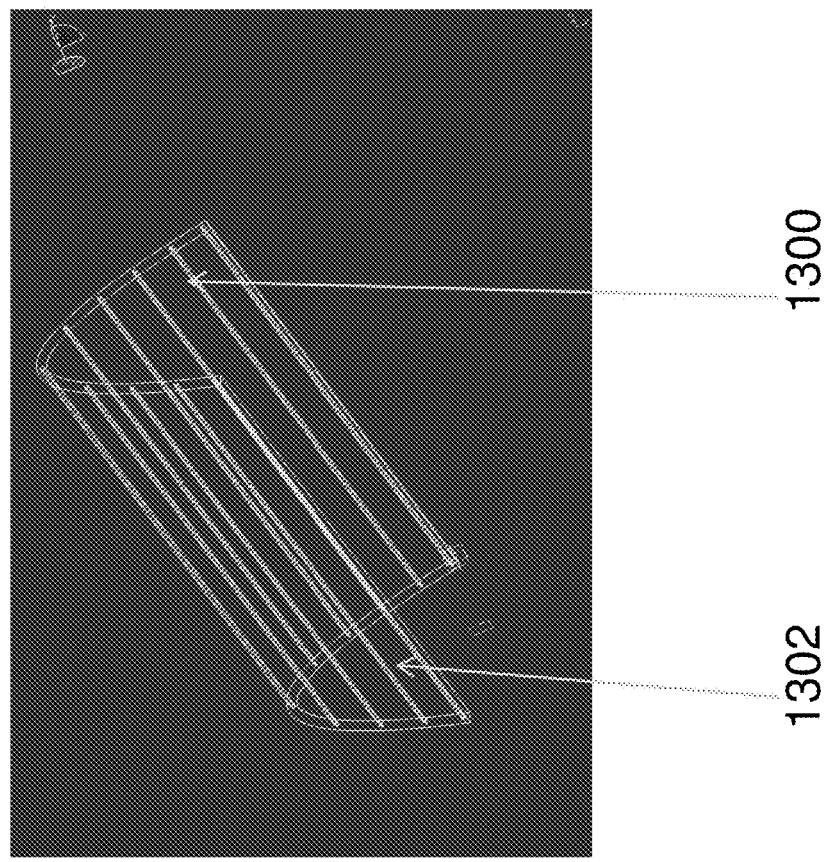
FIGS. 49-52 illustrate an embodiment of a Pre-Stressed Composite Edge for Wing, Flap, Slat, Aileron.

FIG. 49 illustrates a wire-frame view of a Pre-Stressed Composite Edge for Wing, Flap, Slat, or Aileron. In this figure, a Conduit and Cable 1300 are included in the composite layup 1302 of the Edge.

Figure 50:
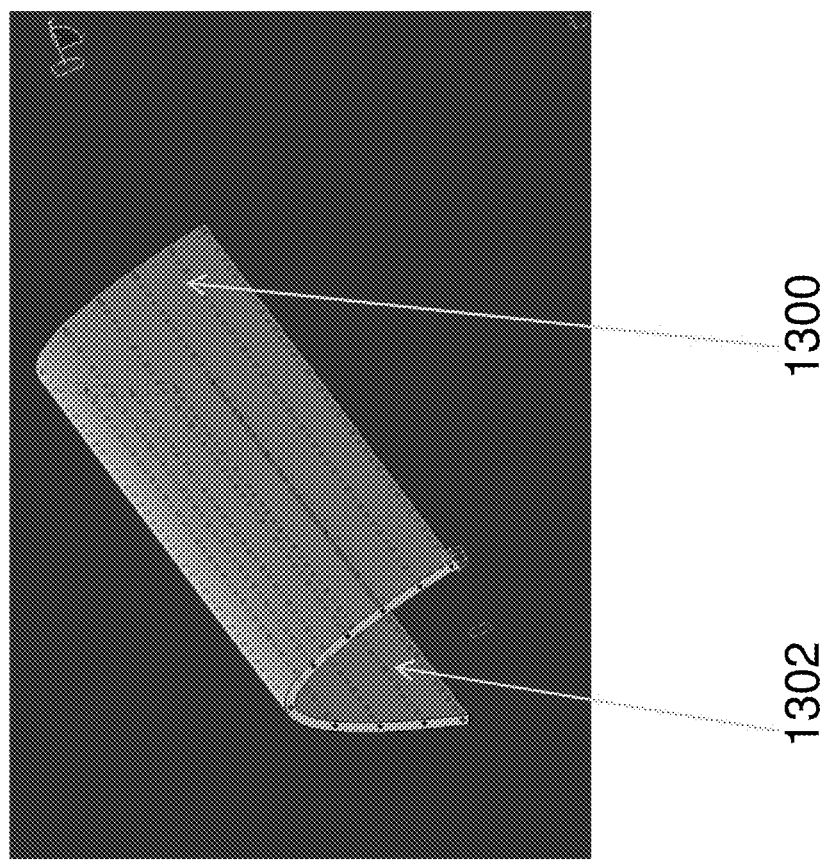

FIG. 50 illustrates a shaded view of the Pre-Stressed Composite Edge for Wing, Flap, Slat, or Aileron. In this figure, the same conduit and cable 1300 are included in the composite layup 1302 of the Edge.

Figure 51:
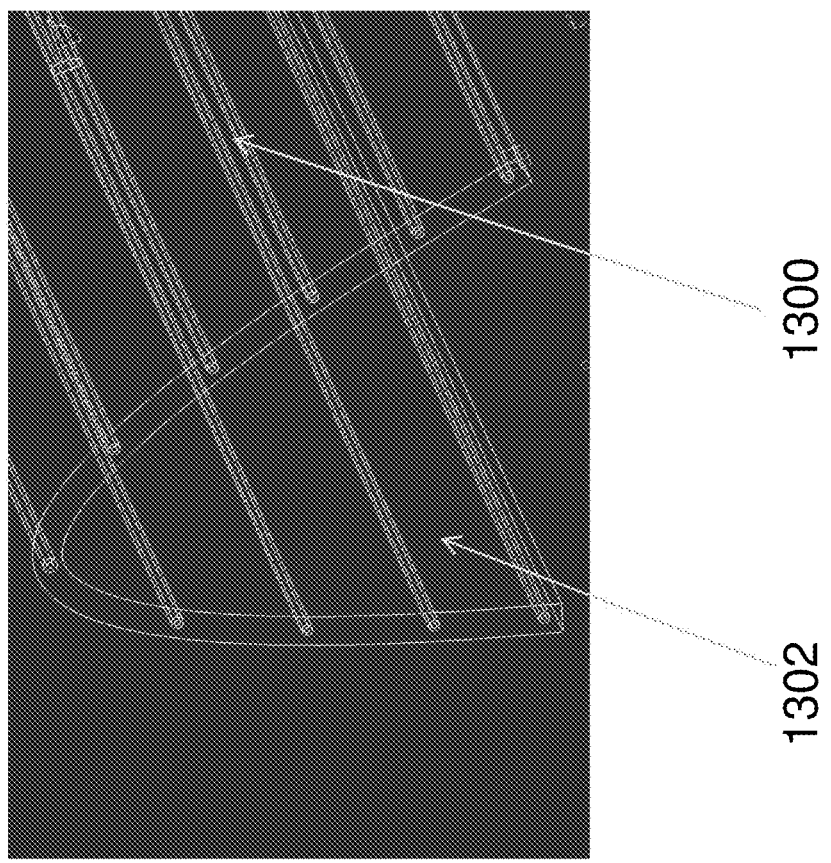

FIG. 51 illustrates a detailed wire-frame view of a Pre-Stressed Composite Edge for Wing, Flap, Slat, or Aileron. In this figure, a conduit and cable 1300 are included in the composite layup 1302 of the edge.

Figure 52:
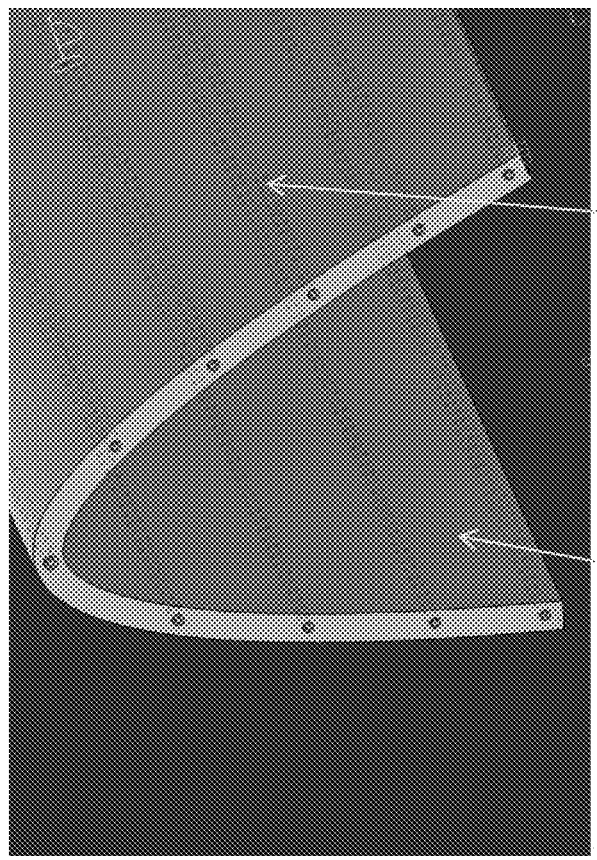

FIG. 52 illustrates a detailed shaded view of the Pre-Stressed Composite Edge for Wing, Flap, Slat or Aileron. In this figure, the same conduit and cable 1300 are included in the composite layup 1302 of the Edge.

The typical Aircraft Wing Box consists of Spar, Flap, Slat, Aileron, and Stringers. A typical Edge is shown and analyzed here which is applicable to all above.

The Composite Wing Edge 1302 can be built in Thermoset or Thermoplastic Composite layups. The ply layups start on a Mandrel. The Conduits are laid at predetermined positions after Prepreg ply layups on the Mandrel surface. The Conduits are part of composite layup and embedded in the Fabric. The Composite Wing Edge with conduits are autoclave pressure cured. The Mandrel is removed after cure.

The Wing Edge can also be built using Pre-Stressed Composite conduits embedded into metallic or composite Chopped Fiber and metallic outer Skin. The conduit can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the cable is locked in the Resin. The part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the cable where tension in the part normally will occur with the application of external applied loads. Hence with the applied cable tension, compression is created in Pre-Stressed Composite part to take more tension for the applied load.

Figure 53:
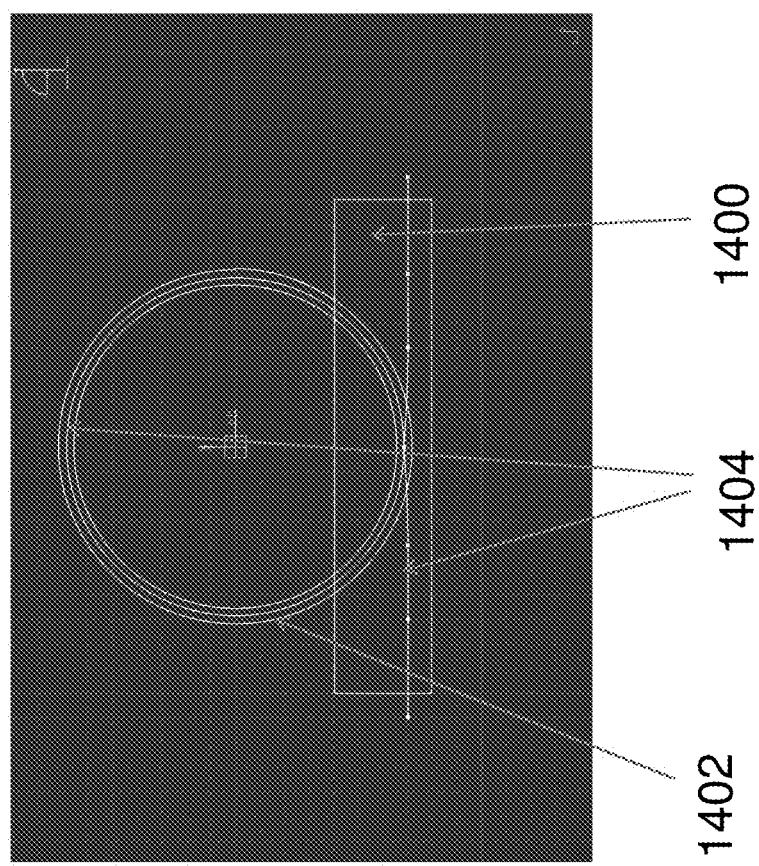
FIGS. 53-56 illustrate an embodiment of a Pre-Stressed Composite Wing-Fuselage Intersection area.

FIG. 53 illustrates a low wing wire-frame view of a Pre-Stressed Composite Wing-Fuselage Intersection. In this figure a wing 1404, fuselage 1402 and steel cable 1400 are shown.

Figure 54:
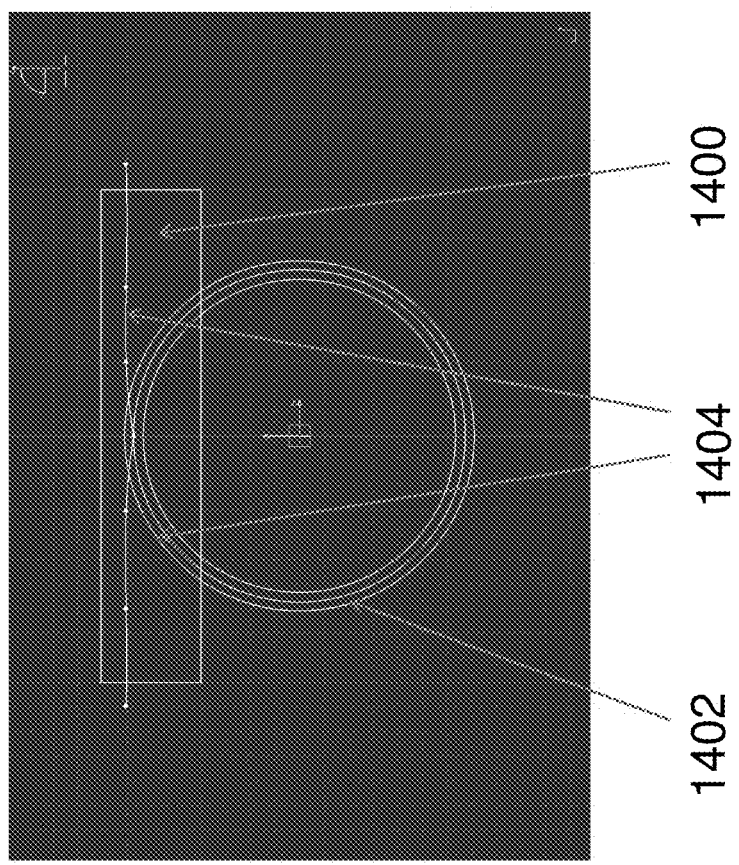

FIG. 54 illustrates a high wing wire-frame view of a Pre-Stressed Composite Wing-Fuselage Intersection. In this figure the same wing 1404, fuselage 1402 and steel cable 1400 are shown.

Figure 55:
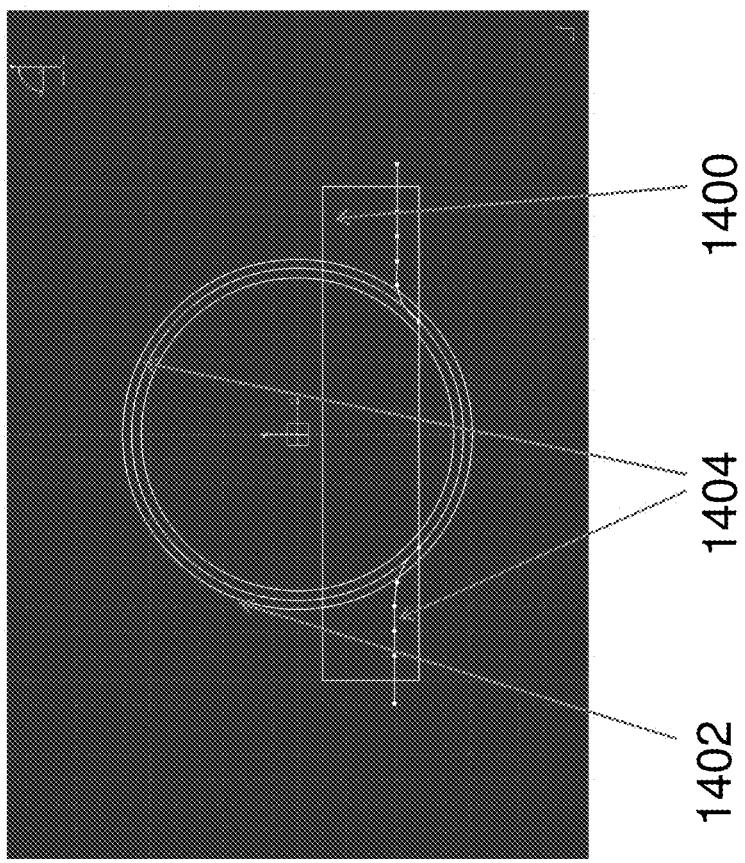

FIG. 55 illustrates a low mid wing wire-frame view of a Pre-Stressed Composite Wing-Fuselage Intersection. In this figure a wing 1404, fuselage 1402 and steel cable 1400 are shown.

Figure 56:
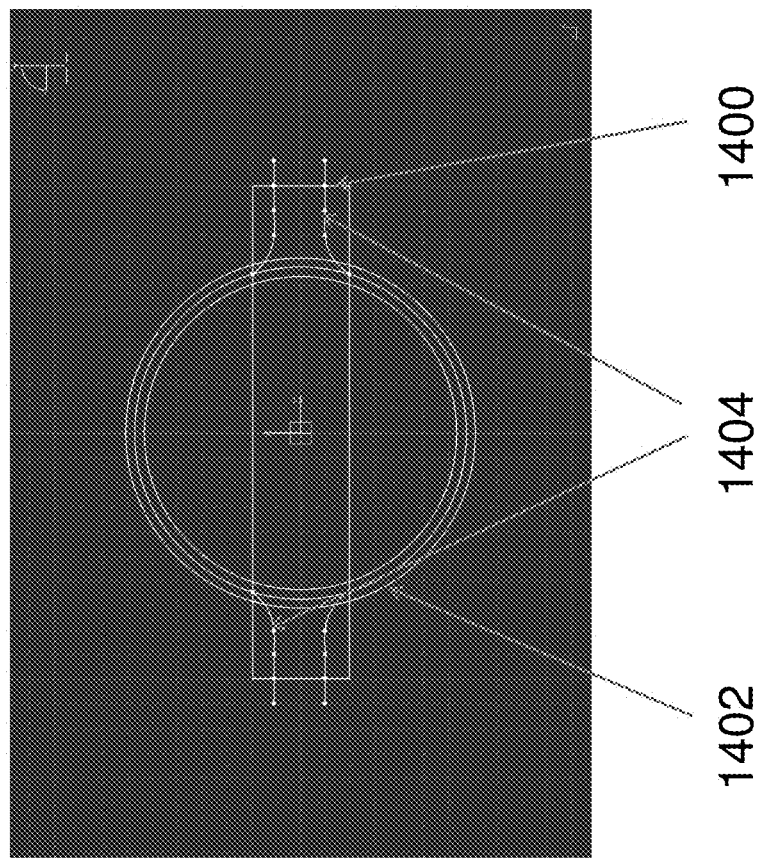

FIG. 56 illustrates a mid wing wire-frame view of a Pre-Stressed Composite Wing-Fuselage Intersection. In this figure the same wing 1404, fuselage 1402 and steel cable 1400 are shown.

The Pre-Stressed Composite Conduit & Cable application at Wing-Fuselage Intersection 1404-1402 is different for Composite Aircraft and Metallic Aircraft.

For Composite Aircraft the Conduit & cable are embedded in Fuselage Ply Layup. The Cable is anchored in Wing and the location depends on analysis. In Wing area the Conduit and Cable can be outside the Composite Ply Layup. Tension is applied to the Cable and it is anchored in Wing area by jacks.

Now the special Resin with hardener is injected into the Conduit and it is allowed to set until the cable is locked in the Resin. The part is then released from jacks after cure, leaving permanent anchors to maintain the cable tension at both ends of conduit. Huge Stability is obtained with this Pre-Stressed Composite application in this very critical area of the Aircraft.

The Composite Wing-Fuselage Intersection can also be built using Pre-Stressed Composite Conduit and Cable without going around Fuselage and anchored in the Wing area by jacks. Also more than one Cable if required can be used in this application.

The Pre-Stressed Cable alone can also be used from left Wing Tip to right Wing Tip through Wing Carry Through and around Fuselage if required. The Cable is anchored permanently with calculated tension in wing area by jacks. This technique can also be applied in Metallic Aircraft.

For Metallic Aircraft use the Conduit and Cable (or Cable alone) in Fuselage Bulkhead and the Cable is anchored in Wing and the location is based on analysis. This technique is very good for large wing span aircraft such as in Airbus A380.

Figure 57:
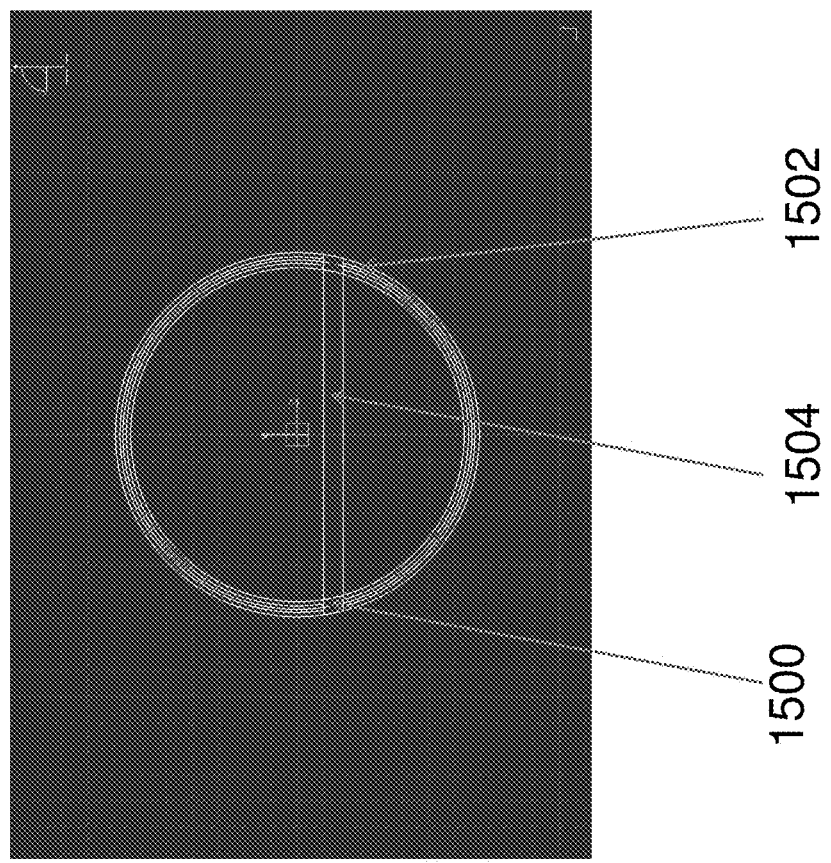
FIGS. 57-60 illustrate an embodiment of a Pre-Stressed Composite Fuselage Skin.

FIG. 57 illustrates a wire-frame view of a Pre-Stressed Composite Fuselage Skin. In this figure a composite fuselage skin layup 1502, floor beam 1504 and Pre-Stressed Conduit and Cable 1500 are shown. Two Conduits and Cables are shown for upper floor deck and lower floor deck anchored separately at cabin floor deck level.

Figure 58:
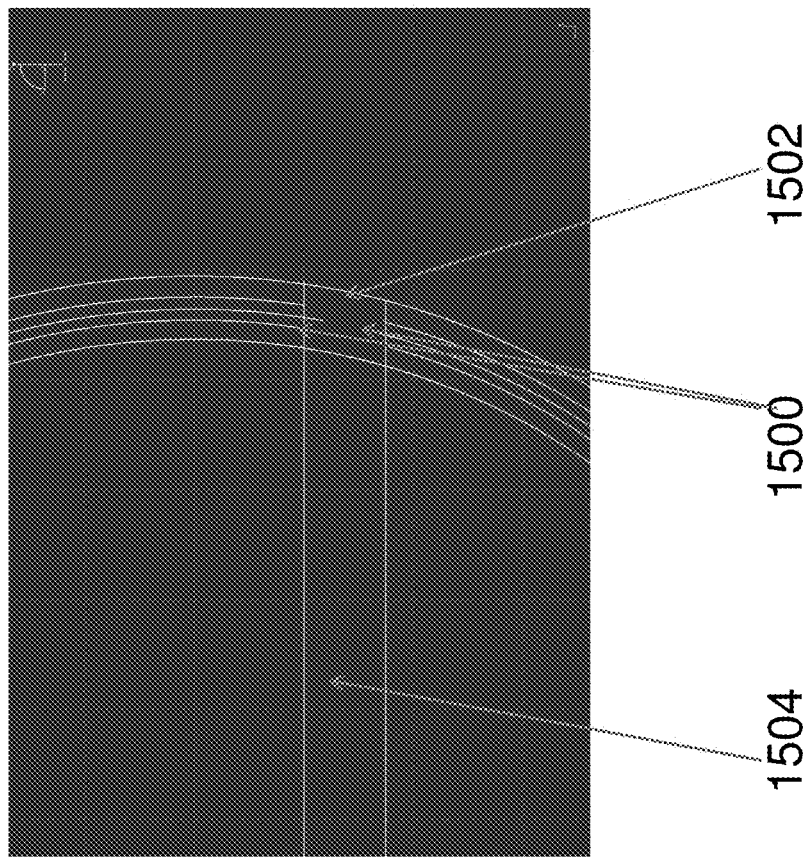

FIG. 58 illustrates a detailed wire-frame view of a Pre-Stressed Composite Fuselage Skin. In this figure the composite fuselage skin layup 1502, floor beam 1504 and Pre-Stressed Cable 1500 are shown. The Cables are anchored at floor for both upper and lower deck.

Figure 59:
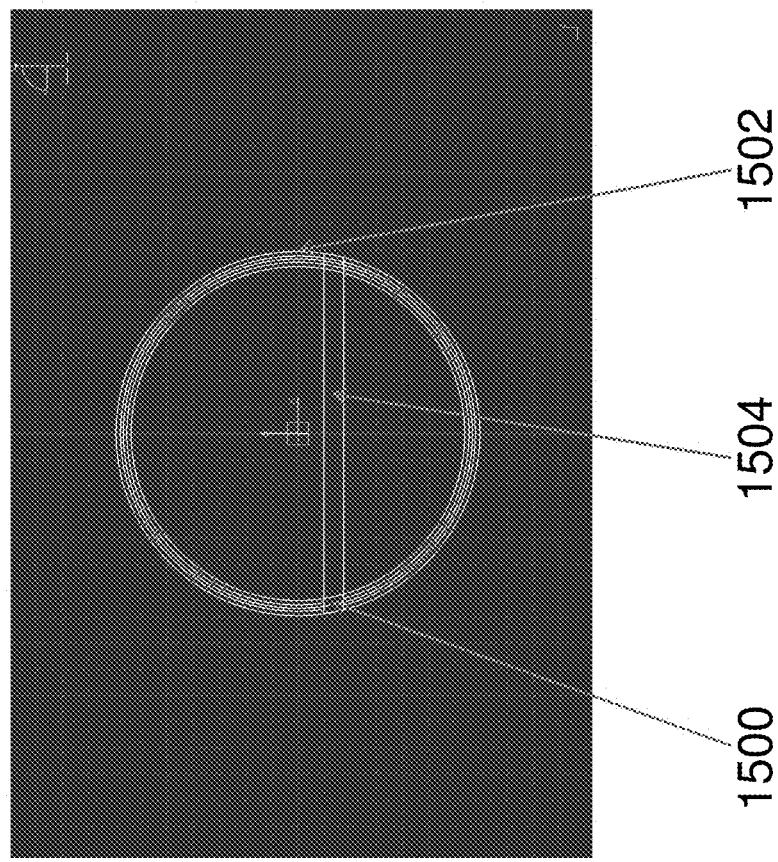

FIG. 59 illustrates a wire-frame view of a Pre-Stressed Composite Fuselage Skin. In this figure a composite fuselage skin layup 1502, floor beam 1504 and Pre-Stressed Conduit and Cable 1500 are shown. One Conduit and Cable is shown for both upper and lower deck anchored at cabin floor level.

Figure 60:
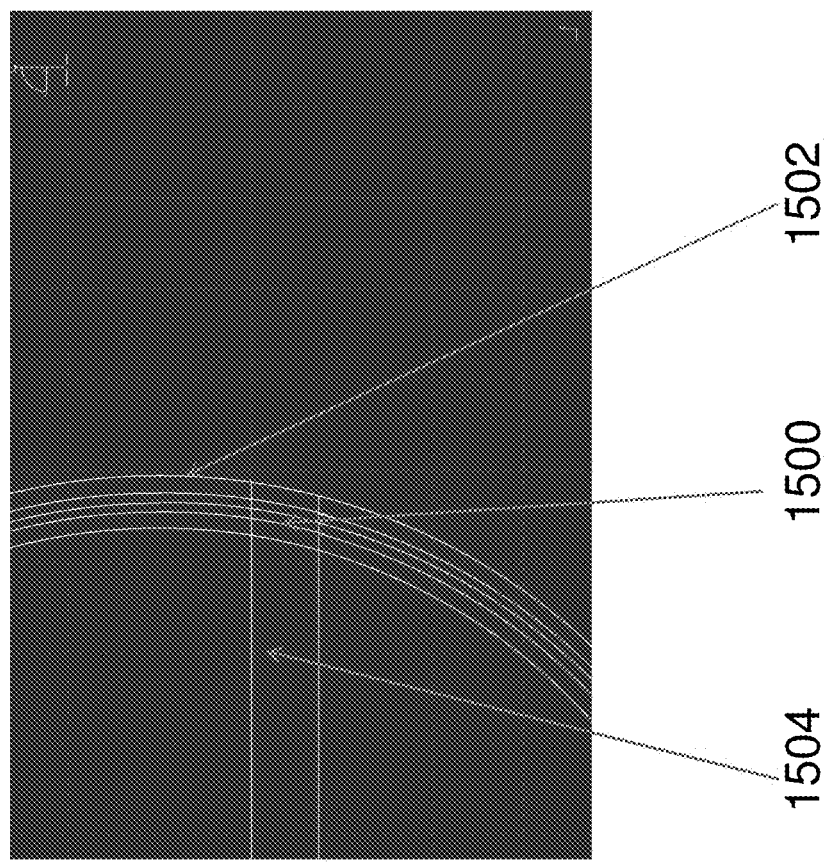

FIG. 60 illustrates a detailed wire-frame view of a Pre-Stressed Composite Fuselage Skin. In this figure the composite fuselage skin layup 1502, floor beam 1504 and Pre-Stressed Cable 1500 are shown. The Cable is anchored at floor for both upper and lower decks.

The Composite Fuselage Skin 1502 can be built in Thermoset or Thermoplastic Composite layups. The ply layups start on a Mandrel. The Conduits are laid at predetermined positions after Prepreg ply layups on the Mandrel surface. The Conduits are part of Composite layup and embedded in the Fabric. The Composite Fuselage Skin with conduits are autoclave pressure cured. The Fuselage is to be divided into several sections for autoclave pressure cure operations. The Mandrel is removed after cure. The Conduit can be made from metal or glass fiber.

The Cable (steel) is then inserted in the Conduit and placed in the center of the Conduit. A required and calculated tension is then applied to the Cable and tension is held with the help of jacks. The Conduit is then filled by injecting a special Resin with hardener and it is allowed to set until the Cable is locked in the Resin. The Part is then released from jacks after cure, leaving permanent anchors to maintain the Cable tension at both ends of Conduit.

The Pre-Stressed Composite Skin then achieves very high strength because of the Cable tension in the part. The applied Cable tension has induced compression in the surrounding areas of the Cable where tension in the part normally will occur with the application of external applied loads. The Pre-Stressed Composite Skin will behave elastic as metallic aircraft for pressurization and depressurization operations because of Cable tension.

Figure 61:
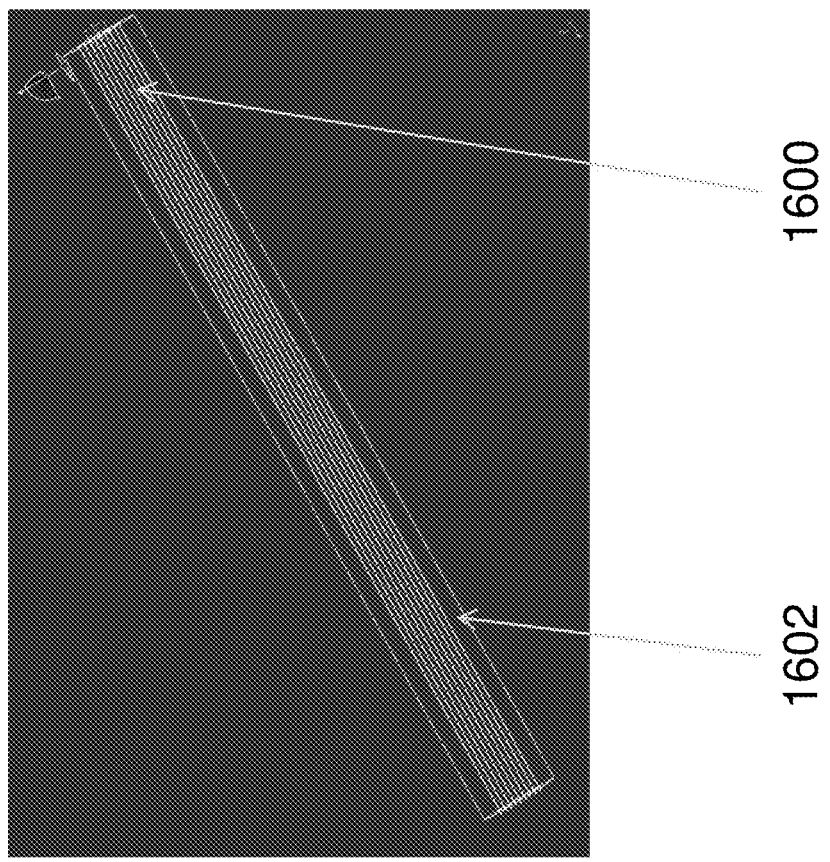
FIGS. 61-64 illustrate an embodiment of a Pre-Stressed Composite Helicopter Rotor Blade.

FIG. 61 illustrates a wire frame view of a Pre-Stressed Composite Helicopter Rotor Blade. As illustrated, a helicopter rotor blade Cable 1600 and composite skin 1602 are shown.

Figure 62:
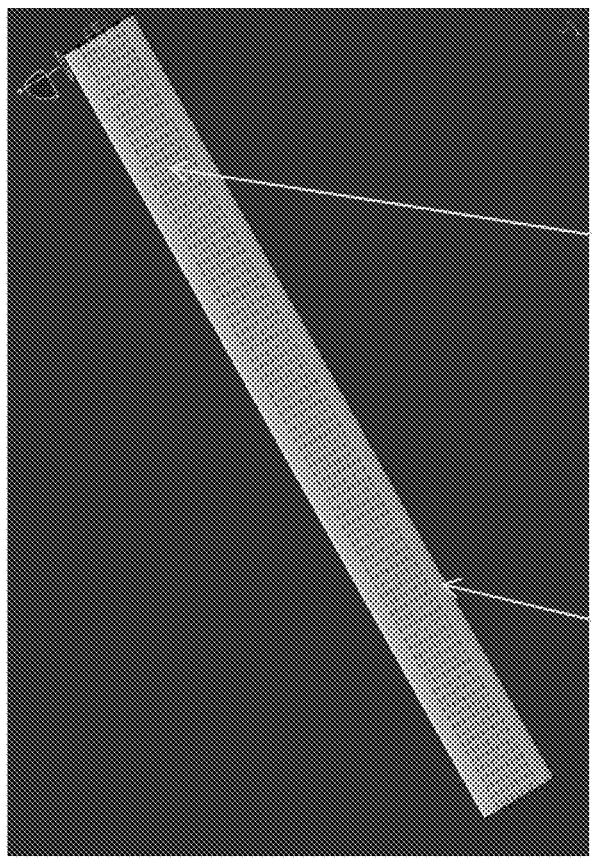

FIG. 62 illustrates a shaded view of a Pre-Stressed Composite Helicopter Rotor Blade. As illustrated, a helicopter rotor blade Cable 1600 and composite skin 1602 are shown.

Figure 63:
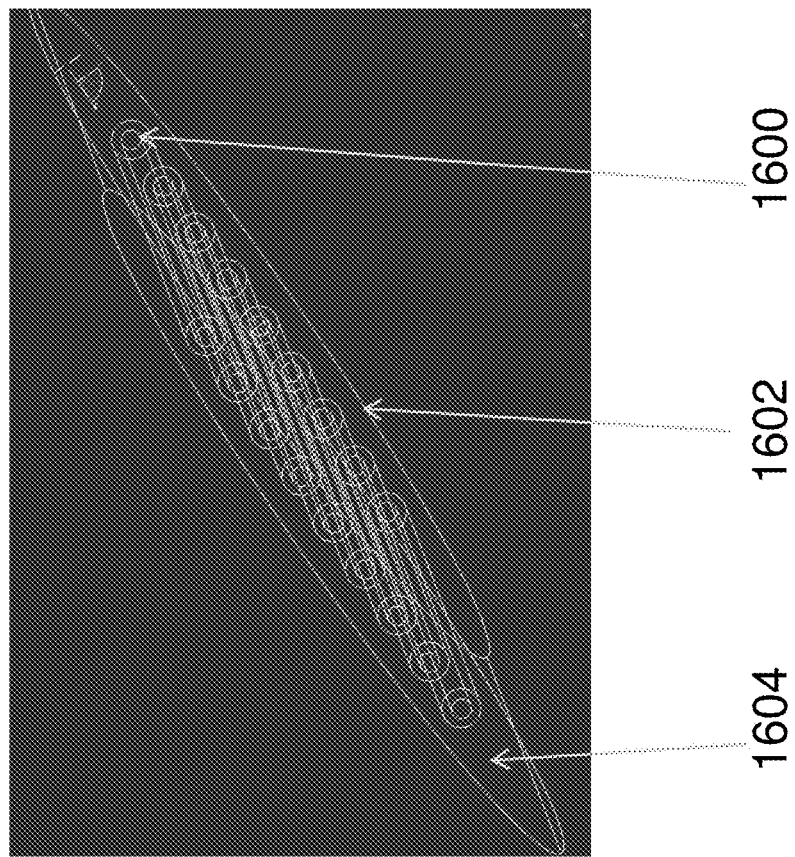

FIG. 63 illustrates a detailed wire-frame view of a Pre-Stressed Composite Helicopter Rotor Blade. As illustrated, the embedded conduit and cable 1600 are included in the composite layup 1602 of the helicopter rotor blade. Also chopped fiber 1604 of the helicopter rotor blade are shown.

Figure 64:
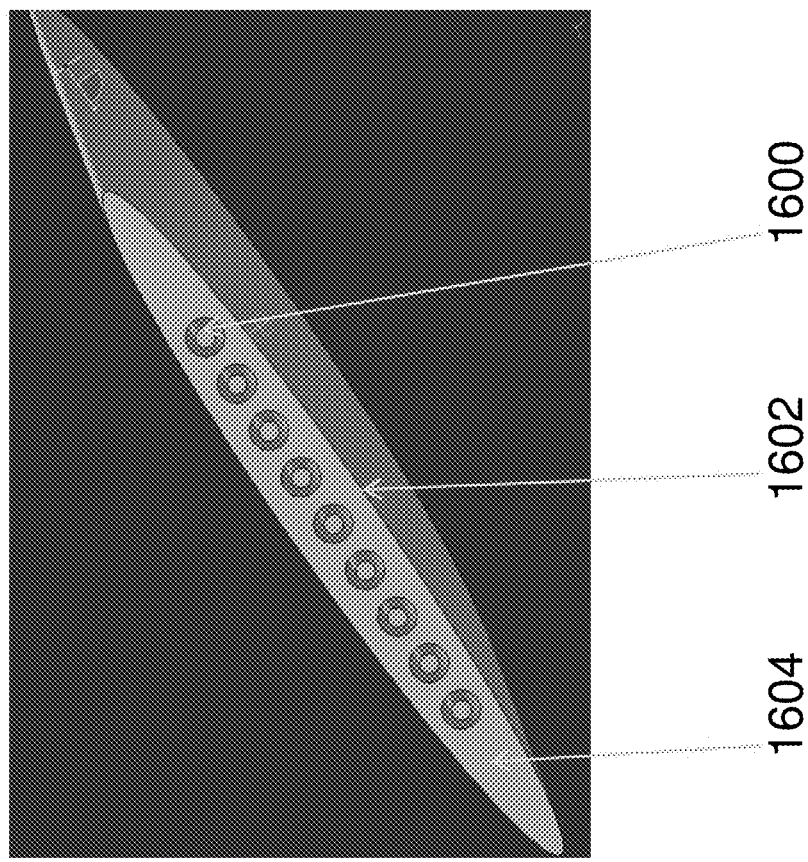

FIG. 64 illustrates a detailed shaded view of the Pre-Stressed Composite Helicopter Rotor Blade. In this figure, the same embedded conduit and cable 1600 are included in the composite layup 1602 of the helicopter rotor blade. Also chopped fiber 1604 of the helicopter rotor blade are shown.

The Composite Helicopter Rotor Blade 1602 can be built in Thermoset or Thermoplastic Composite Layups or by Filament Winding. The Ply layups start on a Mandrel to form the Rotor Blade shape using the Prepreg or Wet Layup process. The outer shell of the Rotor Blade is autoclave pressure cured. The Mandrel is removed after the cure.

The inner portion of Rotor Blade is filled with composite or metallic Chopped Fiber. The Conduits 1600 are embedded in Chopped Fiber. The Chopped Fiber 1604 along with all the Conduits are Co-cured. The Conduit can be made from metal or glass fiber.

The Helicopter Rotor Blade can also be built using Pre-Stressed Composite Conduits embedded into metallic or composite Chopped Fiber and metallic outer Skin.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the Cable is locked in the Resin. The Part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the Cable where tension in the part normally will occur with the application of external applied loads. Hence with the applied Cable tension, compression is created in Pre-Stressed Composite part to take more tension for the applied load.

Figure 65:
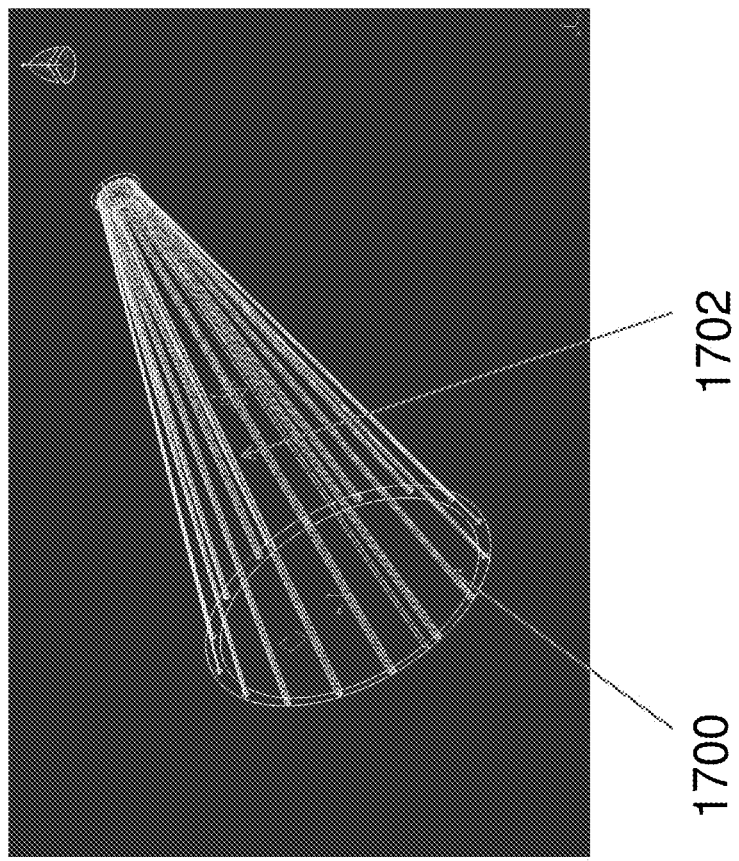
FIGS. 65-68 illustrate an embodiment of a Pre-Stressed Composite Helicopter Tail Boom.

FIG. 65 illustrates a wire-frame view of a Pre-Stressed Composite Helicopter Tail Boom. As illustrated, a conduit and cable 1700 are included in the composite layup 1702 of the helicopter tail boom.

Figure 66:
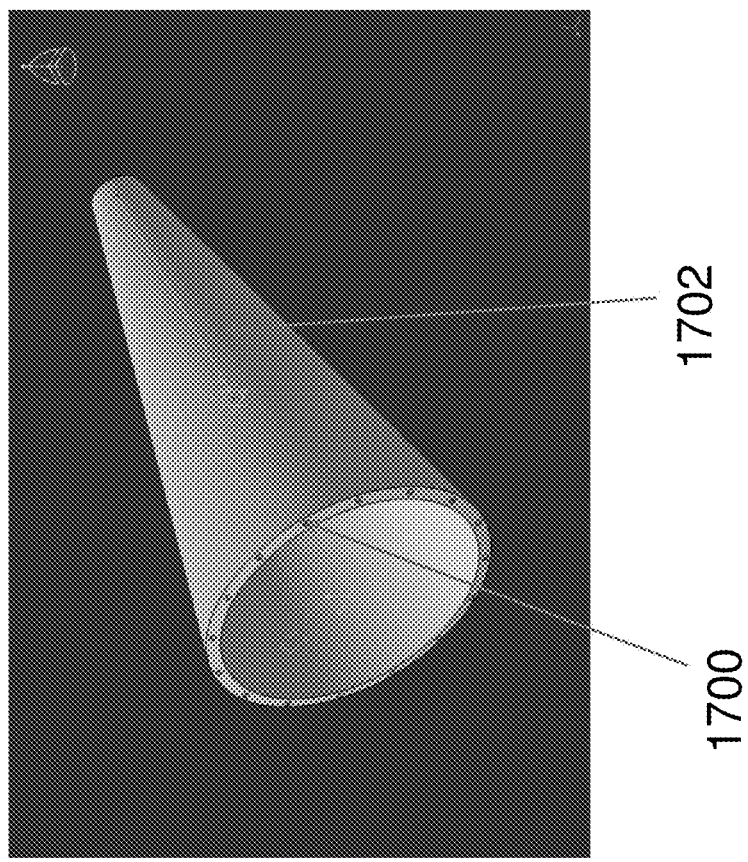

FIG. 66 illustrates a shaded view of the Pre-Stressed Composite Helicopter Tail Boom. In this figure, the same conduit and cable 1700 are included in the composite layup 1702 of the helicopter tail boom.

Figure 67:
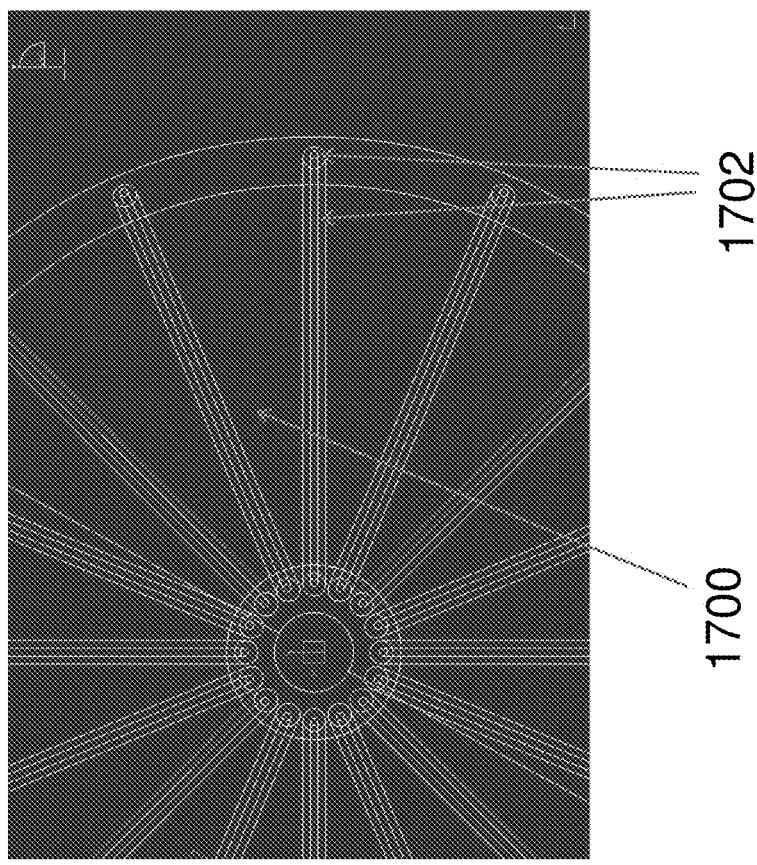

FIG. 67 illustrates a detailed wire-frame view of a Pre-Stressed Composite Helicopter Tail Boom. As illustrated, a conduit and cable 1700 are included in the composite layup 1702 of the helicopter tail boom.

Figure 68:
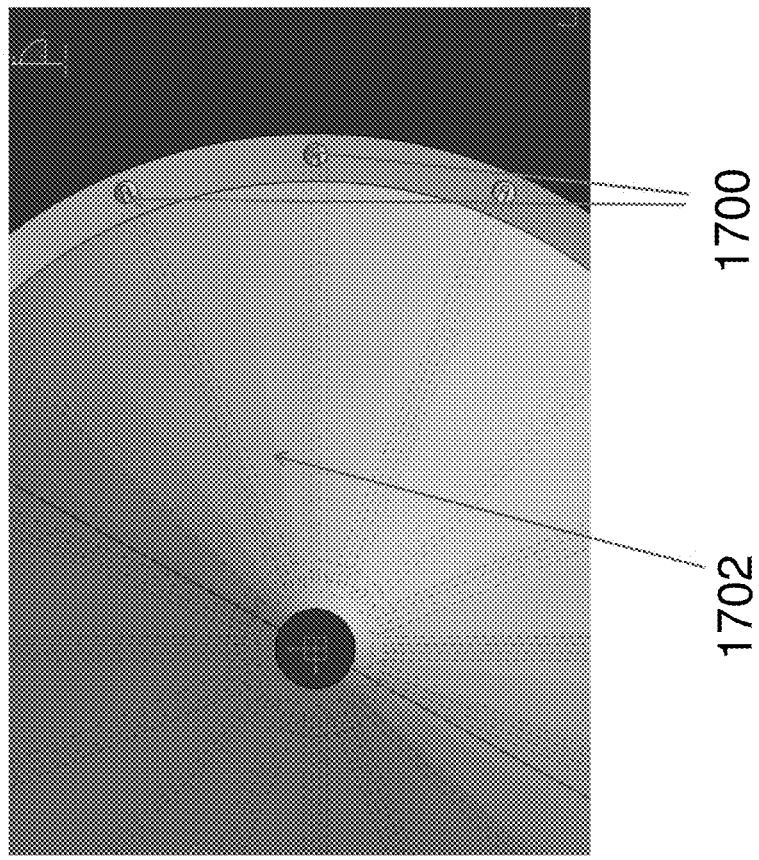

FIG. 68 illustrates a detailed shaded view of the Pre-Stressed Composite Helicopter Tail Boom. In this figure, the same conduit and cable 1700 are included in the composite layup 1702 of the helicopter tail boom.

The Composite Helicopter Tail Boom 1702 can be built in Thermoset or Thermoplastic Composite Layups. The Ply layups start on a Mandrel. The Conduits are laid at predetermined positions after Prepreg ply layups on the Mandrel surface. The conduits are part of composite layup and embedded in the Fiber. The composite Tail Boom with conduits are autoclave pressure cured. The Conduit can be made from metal or glass fiber.

The Helicopter Tail Boom can also be built using Pre-Stressed Composite Conduit embedded into Metallic or composite Chopped Fiber and metallic outer Skin.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the Cable is locked in the Resin. The Part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the Cable where tension in the part normally will occur with the application of external applied loads. Hence with the applied Cable tension, compression is created in Pre-Stressed Composite part to take more tension for the applied load.

Figure 69:
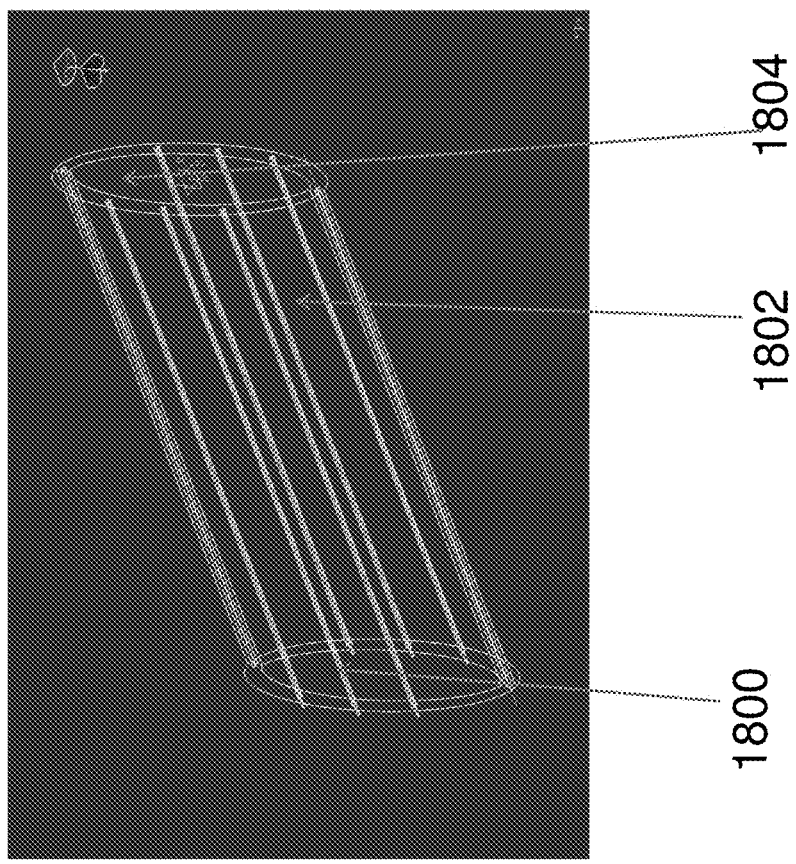
FIGS. 69-72 illustrate an embodiment of a Pre-Stressed Composite Windmill Fan Blade.

FIG. 69 illustrates a wire-frame view of a Pre-Stressed Composite Windmill Fan Blade. As illustrated, a conduit and cable 1800 are included in the composite layup 1802, and chopped fiber 1804 of the windmill fan blade.

Figure 70:
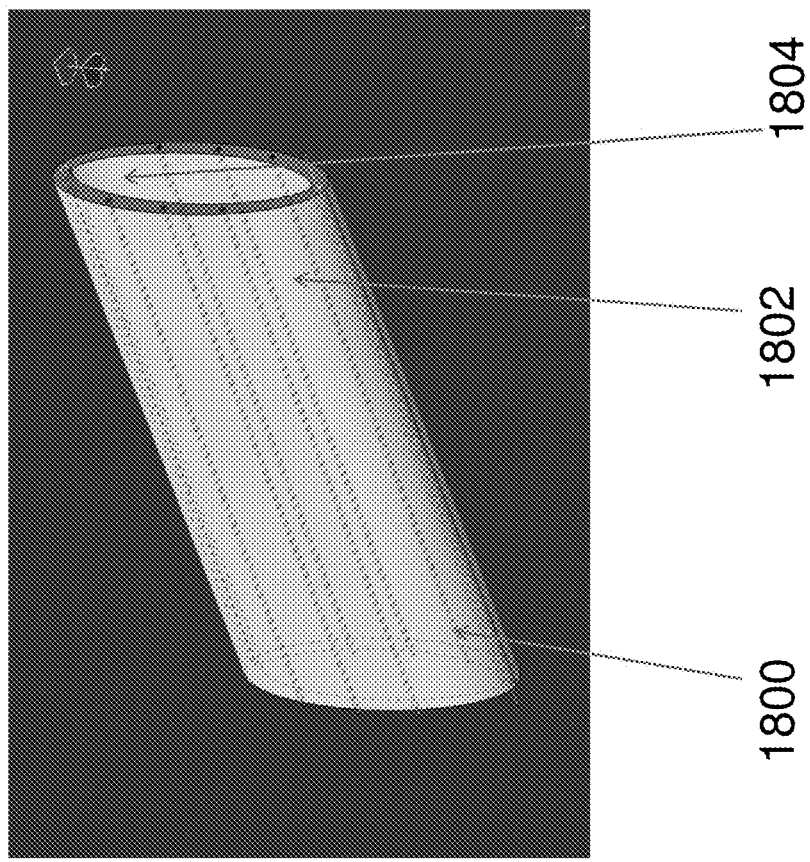

FIG. 70 illustrates a shaded view of the Pre-Stressed Composite Windmill Fan Blade. In this figure, the same conduit and cable 1800 are included in the composite layup 1802, and chopped fiber 1804 of the windmill fan blade.

Figure 71:
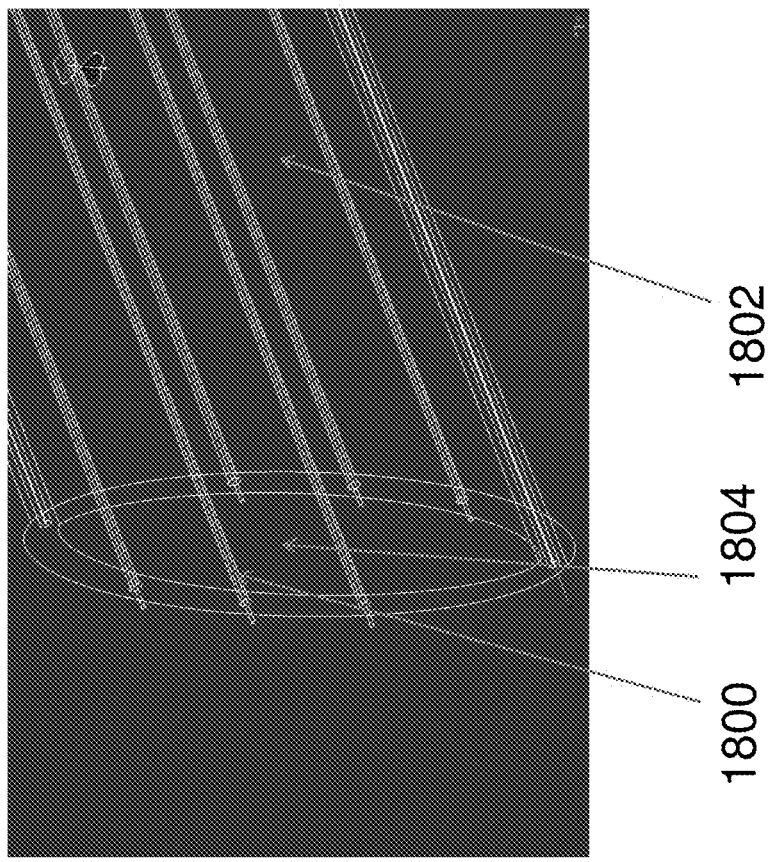

FIG. 71 illustrates a detailed wire-frame view of a Pre-Stressed Composite Windmill Fan Blade. As illustrated, a conduit and cable 1800 are included in the composite layup 1802, and chopped fiber 1804 of the windmill fan blade.

Figure 72:
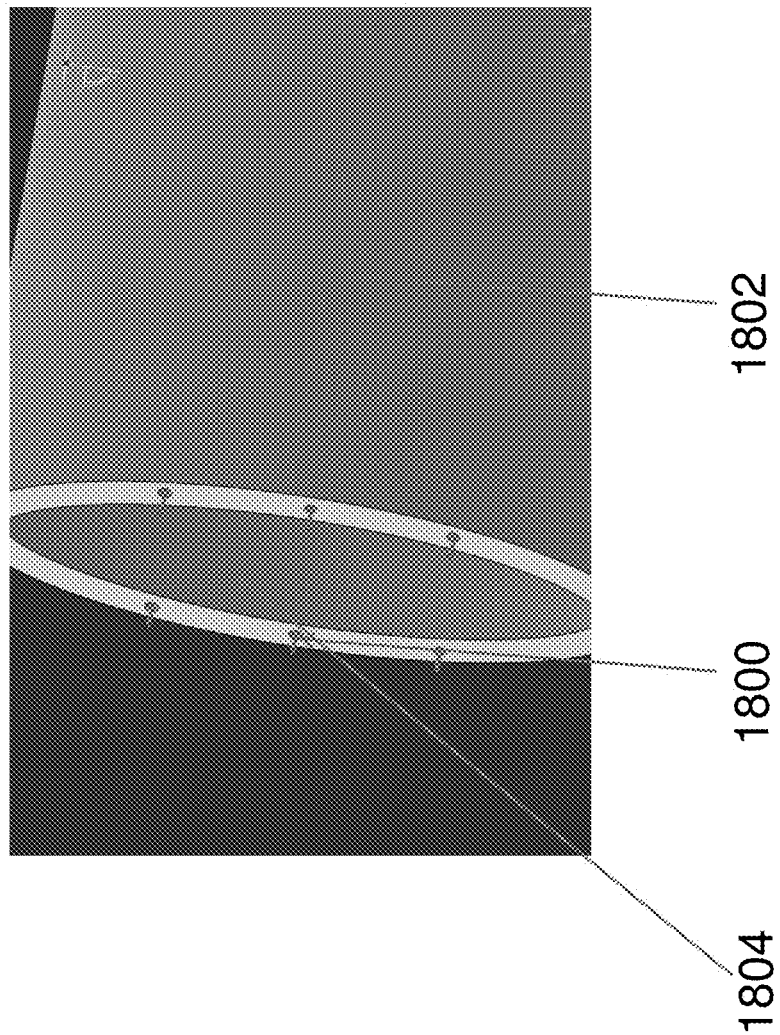

FIG. 72 illustrates a detailed shaded view of the Pre-Stressed Composite Windmill Fan Blade. In this figure, the same conduit and cable 1800 are included in the composite layup 1802, and chopped fiber 1804 of the windmill fan blade.

The Composite Windmill Fan Blade 1802 can be built in Thermoset or Thermoplastic Composite Layups. The Ply layups start on a Mandrel. The Conduits are laid at predetermined positions after Prepreg ply layups on the Mandrel surface. The conduits are part of composite layup and embedded in the Fiber. The outer shell of composite windmill fan blade with conduits are autoclave pressure cured. The Conduit can be made from metal or glass fiber.

The inner portion of Windmill Fan Blade is filled with composite or metallic Chopped Fiber. The composite windmill fan blade outer shell with Conduits and Chopped fiber are Co-cured. The conduit can be made from metal or glass fiber.

The Windmill Fan Blade can also be built using Pre-Stressed Composite Conduits embedded into metallic or composite Chopped Fiber and metallic outer Skin.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the Cable is locked in the Resin. The Part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the Cable where tension in the part normally will occur with the application of external applied loads. Hence with the applied Cable tension, compression is created in Pre-Stressed Composite part to take more tension for the applied load.

Figure 73:
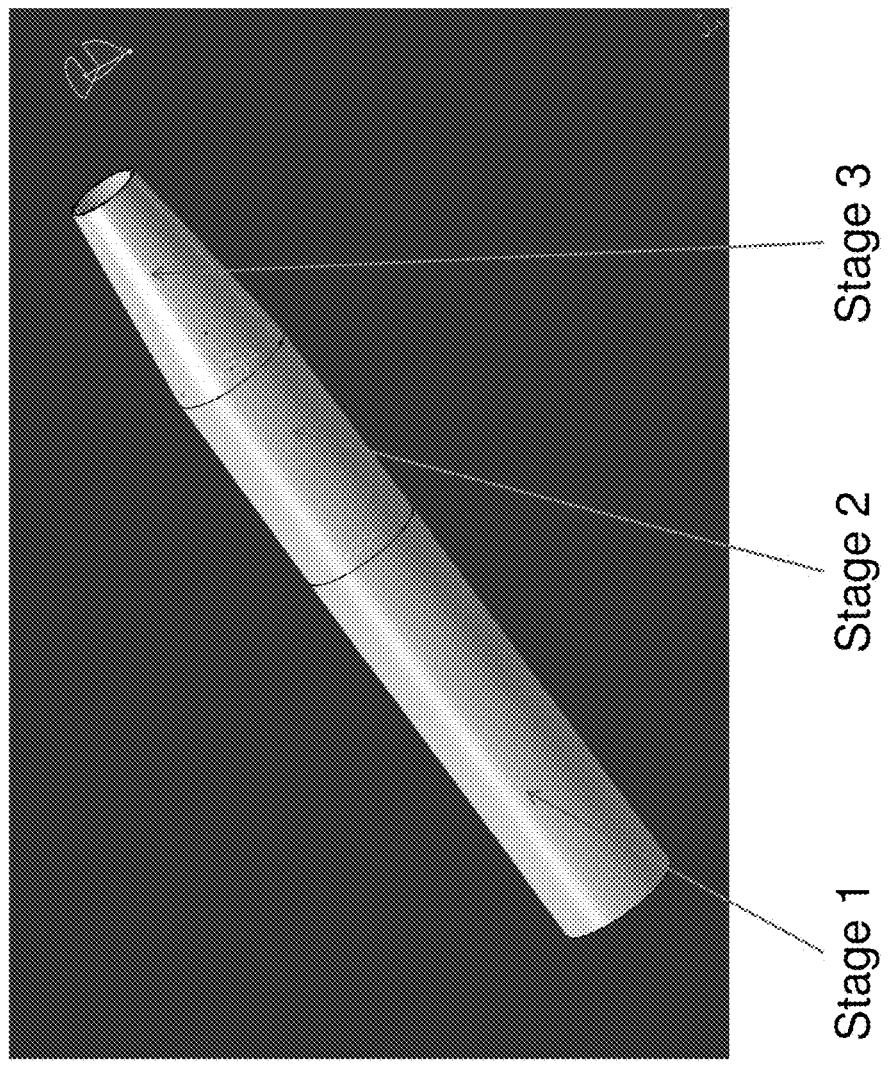
FIGS. 73-77 illustrate an embodiment of Pre-Stressed Composite Missile Stages.

FIG. 73 illustrates the three stages of the Pre-Stressed Composite Missile.

Figure 74:
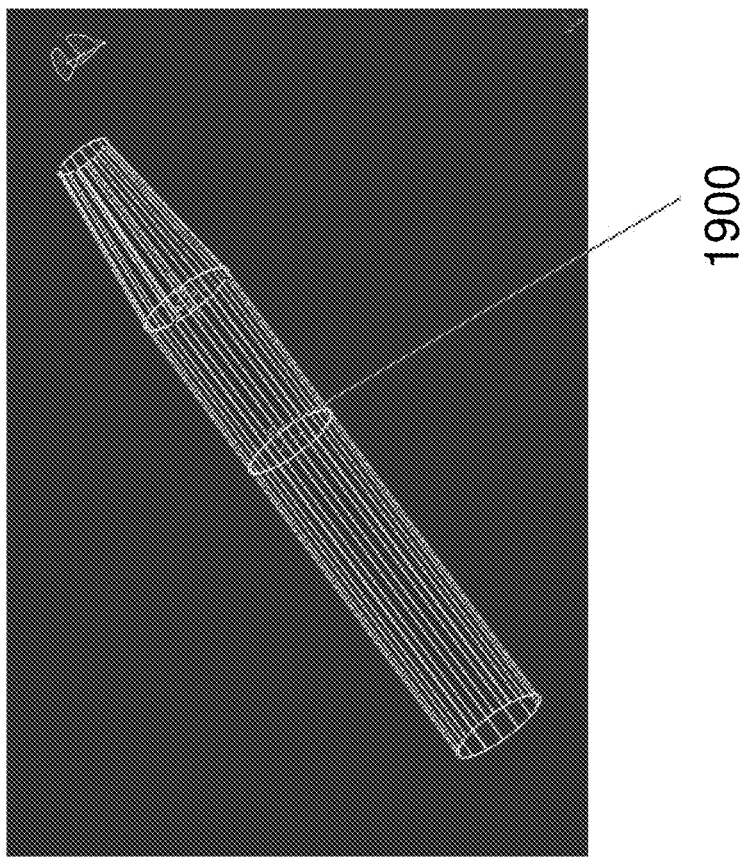

FIG. 74 illustrates a wire-frame view of a Pre-Stressed Composite Missile Stages. As illustrated, a conduit and cable 1900 are embedded in composite layup of the missile stages.

Figure 75:
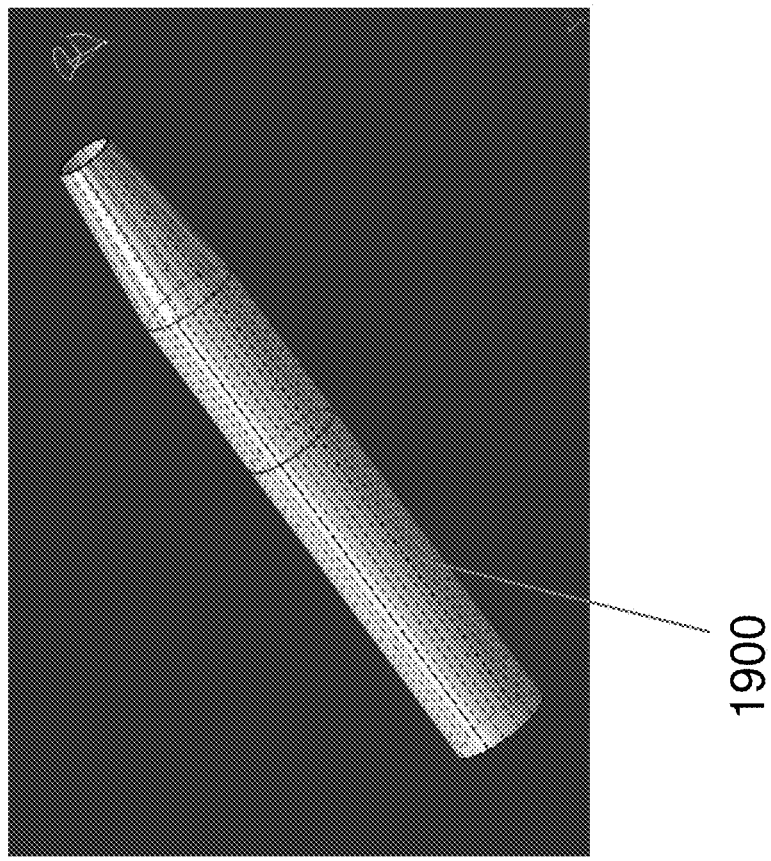

FIG. 75 illustrates a shaded view of the Pre-Stressed Composite Missile Stages. In this figure, the same conduit and cable 1900 are embedded in composite layup of the missile stages.

Figure 76:
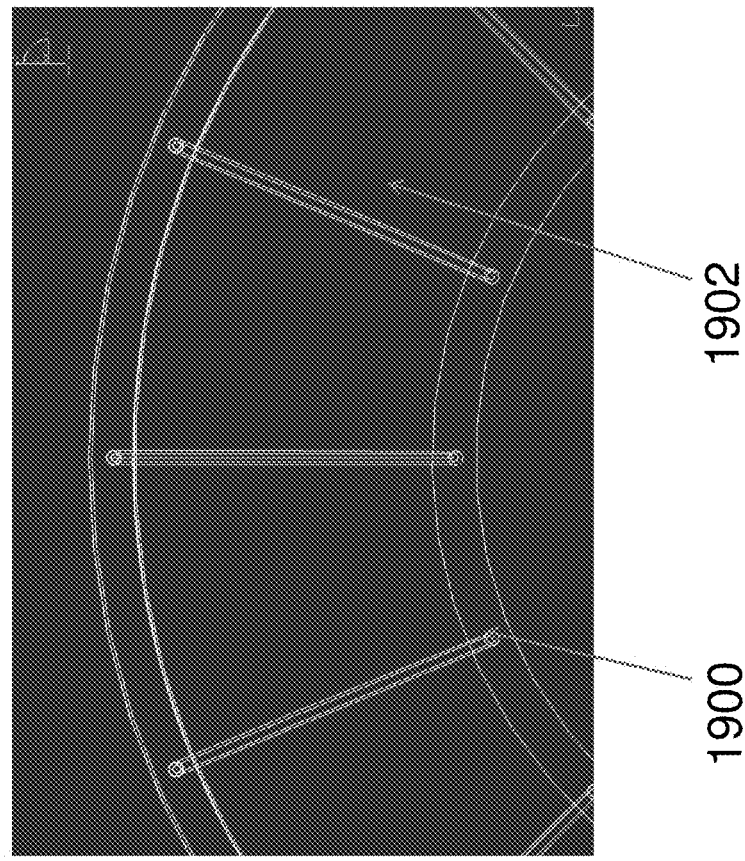

FIG. 76 illustrates a detailed wire-frame view of a Pre-Stressed Composite Missile Stage. As illustrated, a conduit and cable 1900 are included in the composite layup 1902 of the missile stage.

Figure 77:
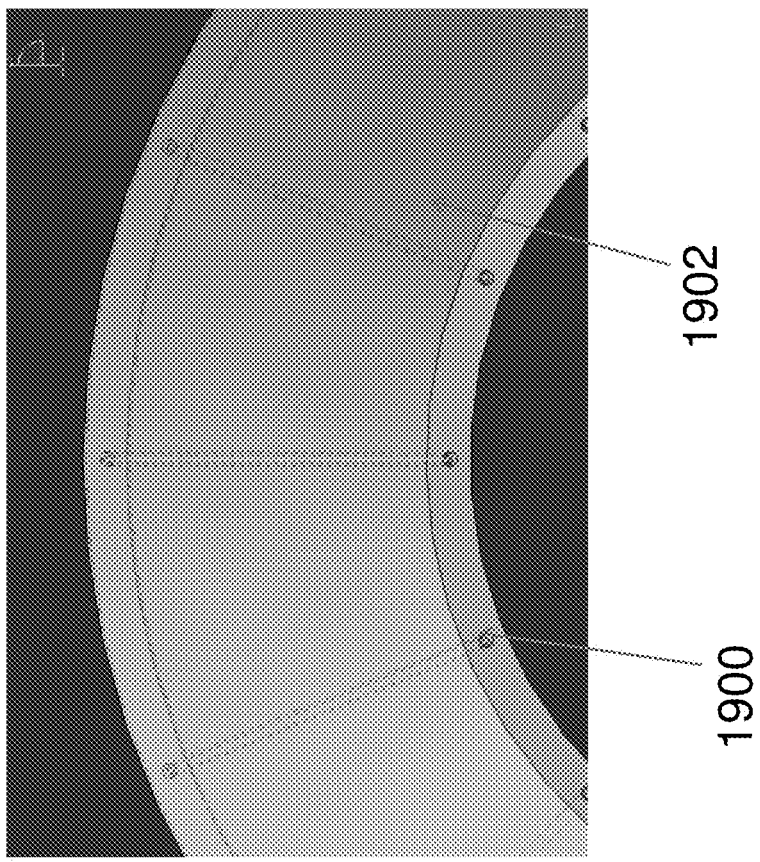

FIG. 77 illustrates a detailed shaded view of the Pre-Stressed Composite Missile Stage. In this figure, the same conduit and cable 1900 are included in the composite layup 1902 of the missile stage.

The Composite Missile Stage 1902 can be built in Thermoset or Thermoplastic Composite layups or by Filament Winding. The Ply layups start on a Mandrel to form the Missile Stage shape using the Prepreg or Wet Layup process. The Conduits are laid at predetermined positions after Prepreg Ply Layups on top of Mandrel. All Stages are fabricated separately on Mandrels.

The Conduits are part of Composite layup and embedded in the Fiber plies. The Composite Missile Stage with Conduits are autoclave pressure cured for each Stage separately. The Mandrel is removed after cure. The Conduits can be made from metal or glass fiber.

The Missile Stage can also be built using Pre-Stressed Composite Conduits embedded into metallic or composite Chopped Fiber and metallic outer Skin.

The Cable (steel) is then inserted in the Missile Stage Conduits and placed in the center of the conduit. A required and calculated tension is then applied to the Cable and tension is held with the help of jacks. The Conduit is then filled by injecting a special Resin with hardener and it is allowed to set until the Cable is locked in the Resin. The Stage is then released from jacks after cure, leaving permanent anchors to maintain the cable tension at both ends of conduit.

The Pre-Stressed Composite Missile Stage then achieves very high strength because of the cable tension in the part. The applied cable tension has induced compression in the surrounding areas of the Cable where tension in the part normally will occur with the application of external applied loads. Hence with the applied Cable tension, compression is created in Pre-Stressed Composite missile stage to take more tension for the applied load.

The Missile Stages Cylindrical and Conical can be put together in a tool fixture after all the operations are done for each Stage. All the Stages are connected together mechanically with some ordinance charge for separation of Stage for deployment in space.

Figure 78:
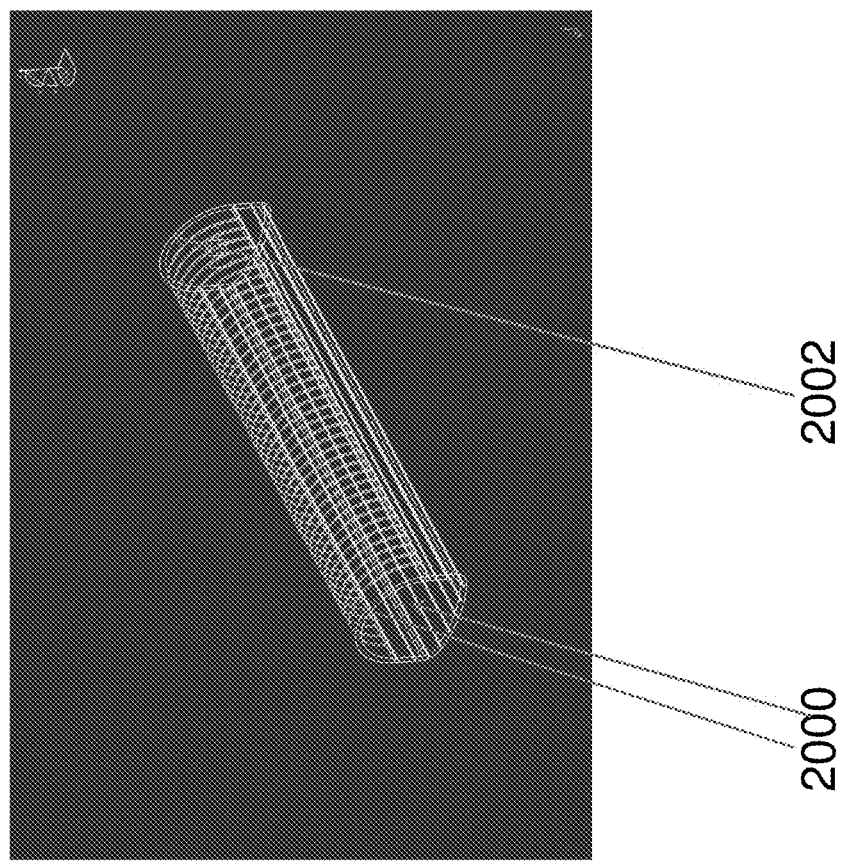
FIGS. 78-81 illustrate an embodiment of a Pre-Stressed Composite Space Shuttle Payload Bay with Door.

FIG. 78 illustrates a wire-frame view of a Pre-Stressed Composite Space Shuttle Payload Bay with Door. As illustrated, a conduit and cable 2000 for payload bay and door, are included in the composite layup 2002 of the space shuttle payload bay and door (both halves).

Figure 79:
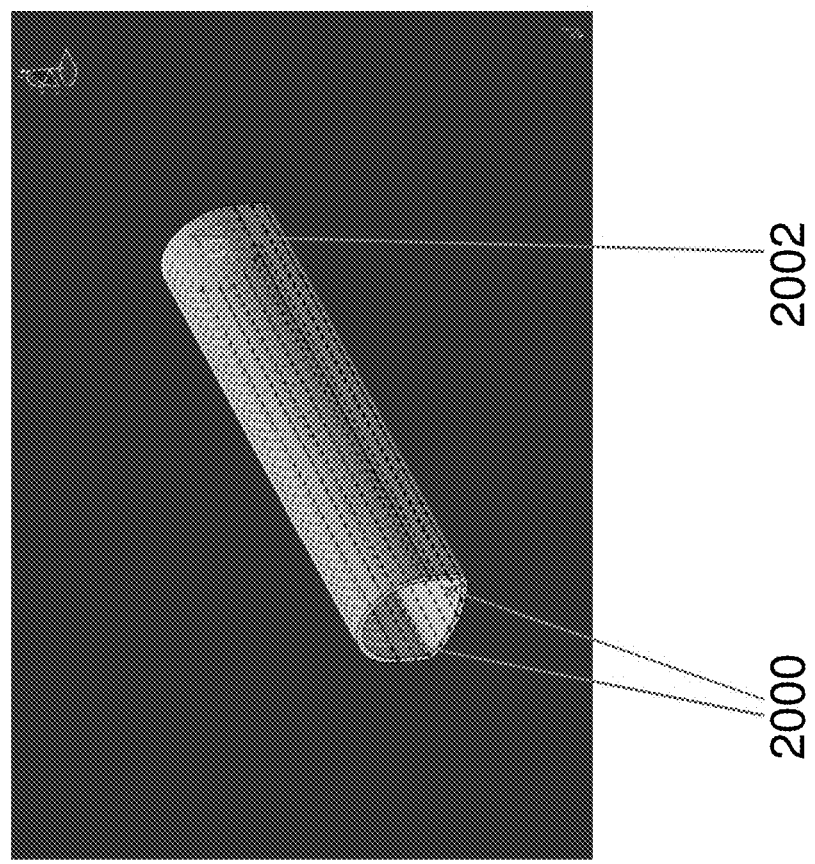

FIG. 79 illustrates a shaded view of the Pre-Stressed Composite Space Shuttle Payload Bay with Door. In this figure, the same conduit and cable 2000 for payload bay and door, are included in the composite layup 2002 of the space shuttle payload bay and door (both halves).

Figure 80:
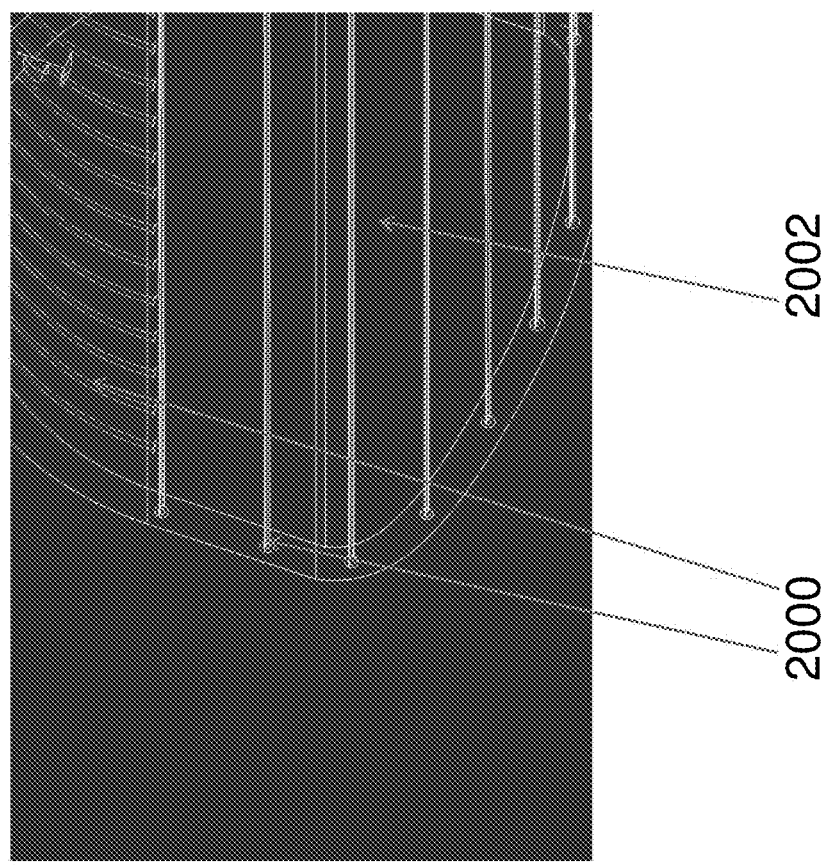

FIG. 80 illustrates a detailed wire-frame view of a Pre-Stressed Composite Space Shuttle Payload Bay with Door. As illustrated, a conduit and cable 2000 for payload bay and door, are included in the composite layup 2002 of the space shuttle payload bay and door.

Figure 81:
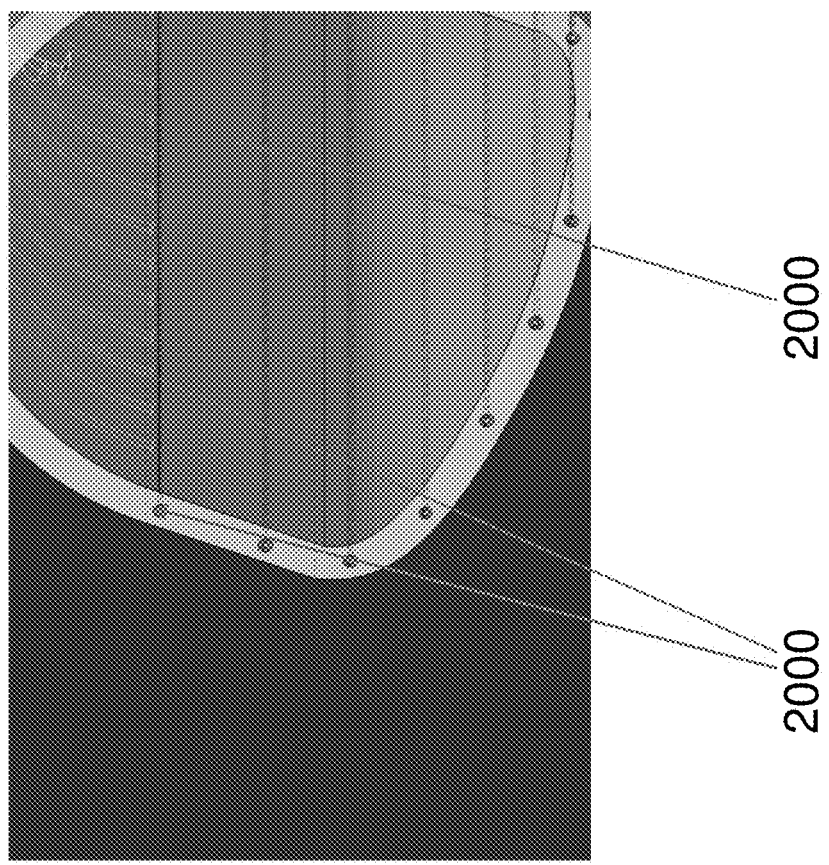

FIG. 81 illustrates a detailed shaded view of the Pre-Stressed Composite Space Shuttle Payload Bay with Door. In this figure, the same conduit and cable 2000 for payload bay and door, are included in the composite layup 2002 of the space shuttle payload bay and door.

The Composite Space Shuttle Payload Bay 2002 and Door can be built in Thermoset or Thermoplastic Composite Layups. The Ply layups start on a Mandrel to form the Space Shuttle Payload Bay shape using the Prepreg or Wet Layup process. The Conduits are laid at predetermined positions after Prepreg Ply Layups on top of Mandrel forming inner surface.

The Conduits are part of Composite layup and embedded in the Fiber. The Composite Space Shuttle Payload Bay with Conduits are autoclave pressure cured. The Mandrel is removed after the cure. The conduits can be made from metal or glass fiber.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the Cable is locked in the Resin. The Part is then released from jacks after cure, leaving permanent anchors to maintain the cable tension at both ends of conduit.

The Pre-Stressed Composite Payload Bay then achieves very high strength because of the cable tension in the part. The applied cable tension has induced compression in the surrounding areas of the Cable where tension in the part normally will occur with the application of external applied loads. Hence with the applied Cable tension, compression is created in Pre-Stressed Composite part to take more tension for the applied load.

The Payload Bay Door opens in the middle. The Door Conduit & Cable are built in the same way as above for Payload Bay. The Conduits and Cable for Door which opens in the middle should be built separately.

The future Space Shuttle can be built using Pre-Stressed Composite material, preferably in Thermoplastic. All the heavy load carrying Beams and almost every internal part of the Space Shuttle can be replaced and built in Pre-Stressed Composite Material.

The total weight of the Pre-Stressed Composite Space Shuttle will be 50 to 60% of the present Space Shuttle. This reduction in weight will make the huge external tank of the Space Shuttle, along with the three main engines redundant. It will be possible to fly the Pre-Stressed Composite Space Shuttle using two huge rockets similar to Russian liquid fuel boosters being used for the Space Station supply.

The outer Skin of the Space Shuttle is Pre-Stressed Composite. A Direct Bond Thermal Protection System (TPS) will be used so that there is no Strain miss-match between the Space Shuttle body and TPS system. Also the same Black Carbon on Carbon will be used for the Space Shuttle Nose and under belly of the Space Shuttle body.

A company, IND US Enterprises LLC, in Keller, Tex. has developed a Direct Bond Thermal Protection System (TPS) for Composites structures. The new Pre-Stressed Composite Space Shuttle will look like the present Shuttle but it will be much lighter.

Figure 82:
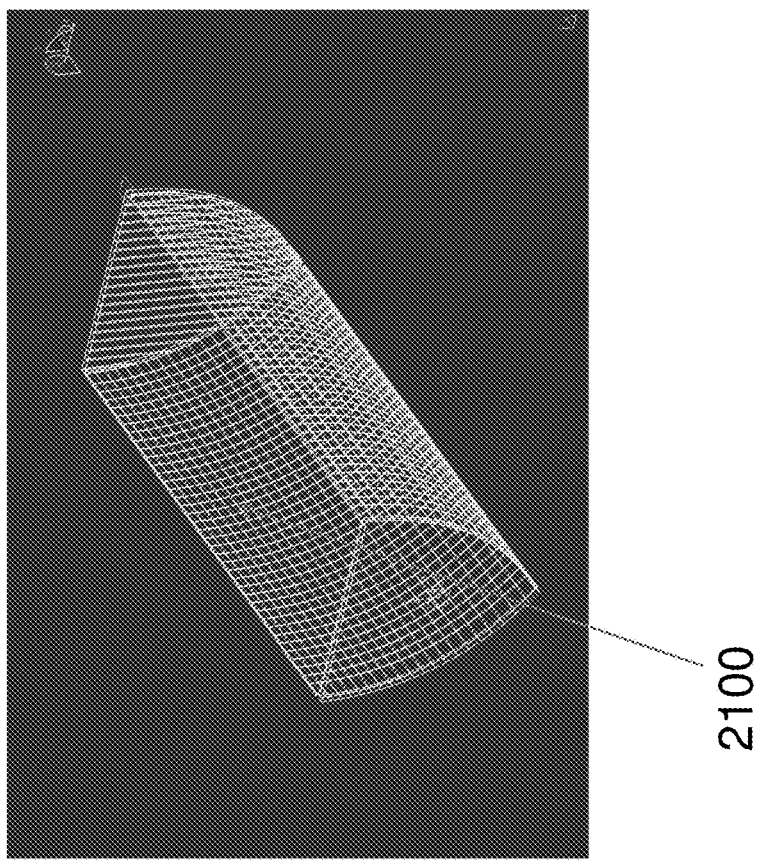
FIGS. 82-85 illustrate an embodiment of a Pre-Stressed Composite Boat.

FIG. 82 illustrates a wire-frame view of a Pre-Stressed Composite Boat. As illustrated, a conduit and cable 2100 for longitudinal and across, are included in the composite shell 2102 of the Boat.

Figure 83:
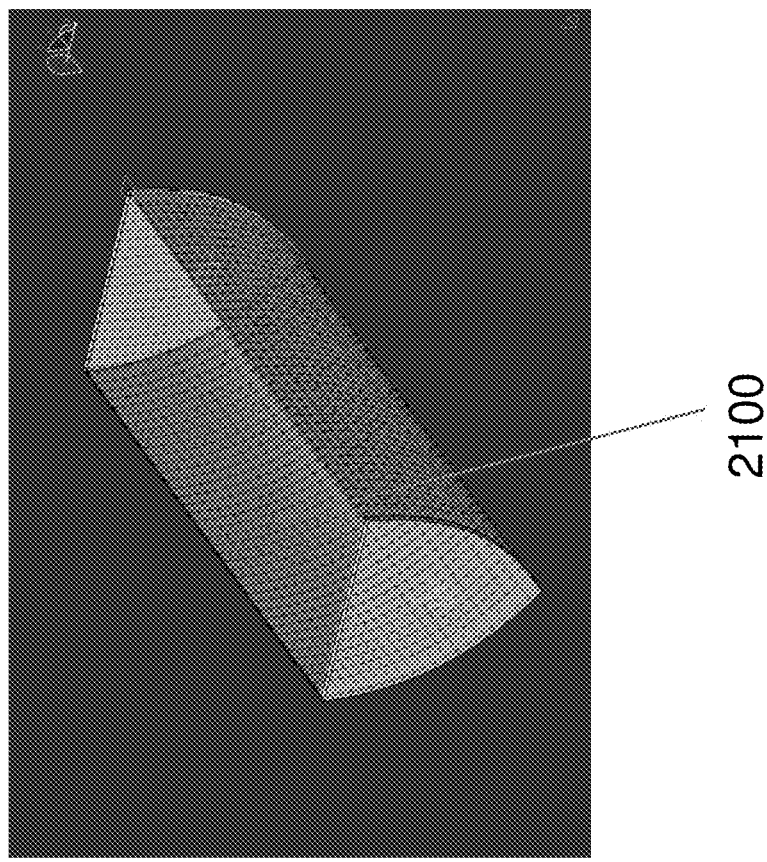

FIG. 83 illustrates a shaded view of the Pre-Stressed Composite Boat. In this figure, the same conduit and cable 2100 for longitudinal and across, are included in the composite shell 2102 of the Boat.

Figure 84:
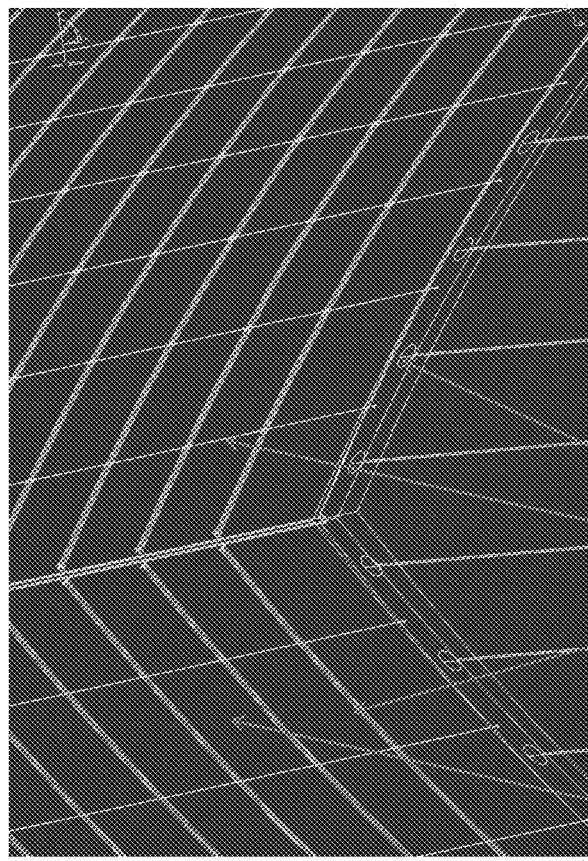

FIG. 84 illustrates a detailed wire-frame view of a Pre-Stressed Composite Boat. As illustrated, a conduit and cable 2100 for longitudinal, across and vertical, are included in the composite shell 2102 of the Boat.

Figure 85:
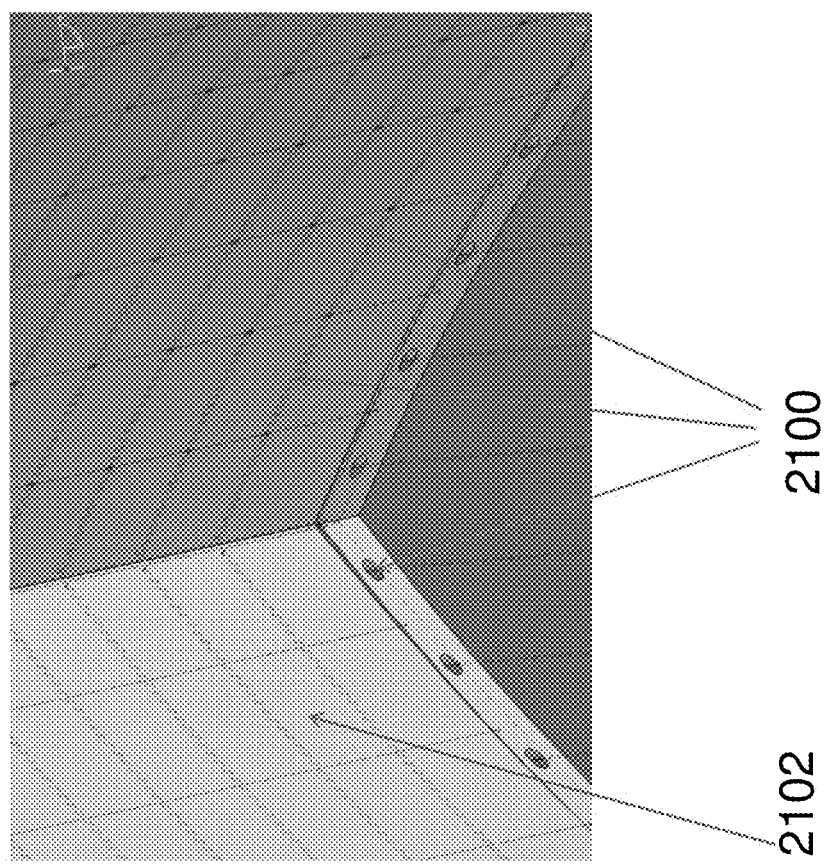

FIG. 85 illustrates a detailed shaded view of the Pre-Stressed Composite Boat. In this figure, the same conduit and cable 2100 for longitudinal, across and vertical, are included in the composite shell 2102 of the Boat.

The Composite Boat 2102 can be built in Thermoset or Thermoplastic Composite Layups. The Ply layups start on a Mandrel to form the Boat shape using the Prepreg or Wet Layup process. The Conduits are laid at predetermined positions after Prepreg Ply Layups on top of Mandrel to form inner surface.

The Conduits are part of Composite layup and embedded in the Fiber (fabric or tape). The Composite Boat with Conduits are autoclave pressure cured. The autoclave pressure curing can be done on parts of boat separately and joined together. The Mandrel is removed after the cure. The conduit can be made from metal or glass fiber.

The Composite Boat can also be built using Pre-Stressed Composite Conduits embedded into metallic or composite Chopped Fiber and metallic outer Skin.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the Cable is locked in the Resin. The Part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the Cable where tension in the part normally will occur with the application of external applied loads. Hence with the applied Cable tension, compression is created in Pre-Stressed Composite part to take more tension for the applied load.

The Boat is a large Structure therefore the Boat has to be divided into Components that can be assembled after all above operations.

Figure 86:
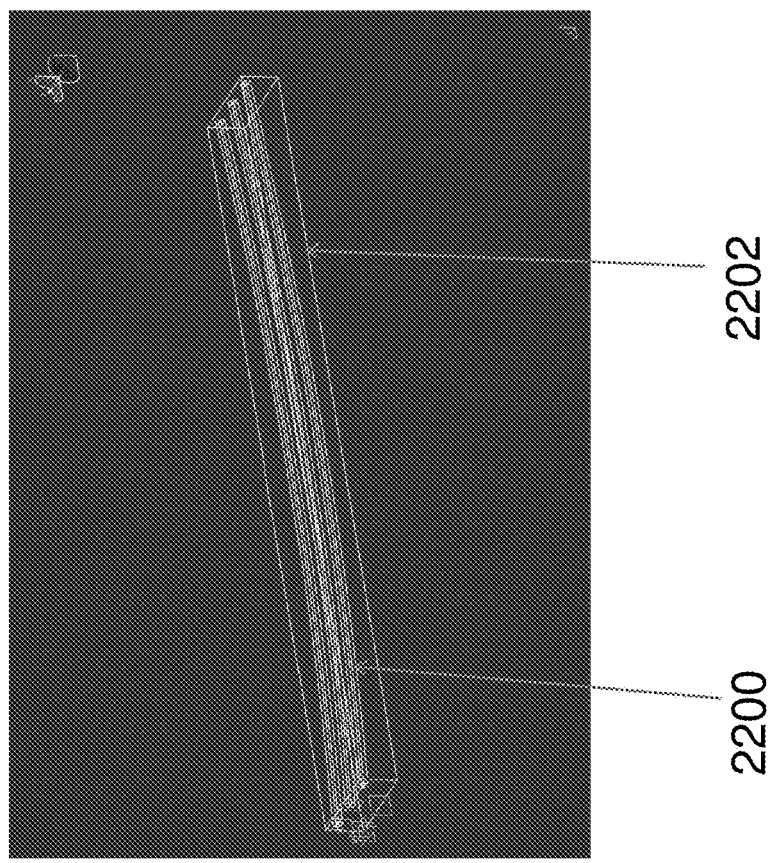
FIGS. 86-89 illustrate an embodiment of a Pre-Stressed Composite Car Bumper.

FIG. 86 illustrates a wire-frame view of a Pre-Stressed Composite Car Bumper. As illustrated, a conduit and cable 2200 are included in the composite layup 2202 of the car bumper.

Figure 87:
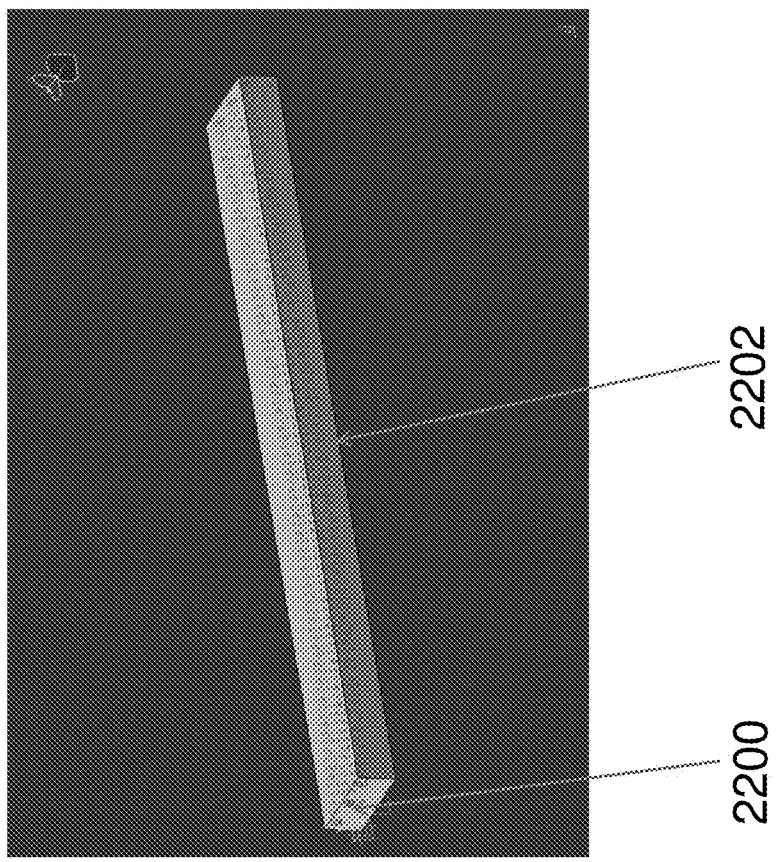

FIG. 87 illustrates a shaded view of the Pre-Stressed Composite Car Bumper. In this figure, the same conduit and cable 2200 are included in the composite layup 2202 of the car bumper.

Figure 88:
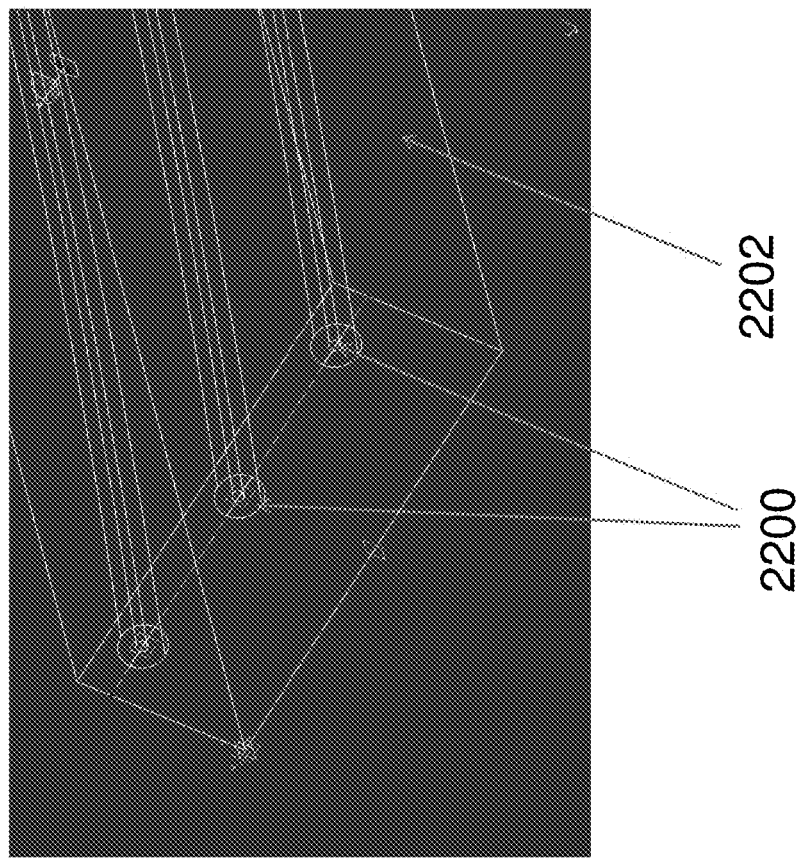

FIG. 88 illustrates a detailed wire-frame view of a Pre-Stressed Composite Car Bumper. As illustrated, a conduit and cable 2200 are included in the composite layup 2202 of the car bumper.

Figure 89:
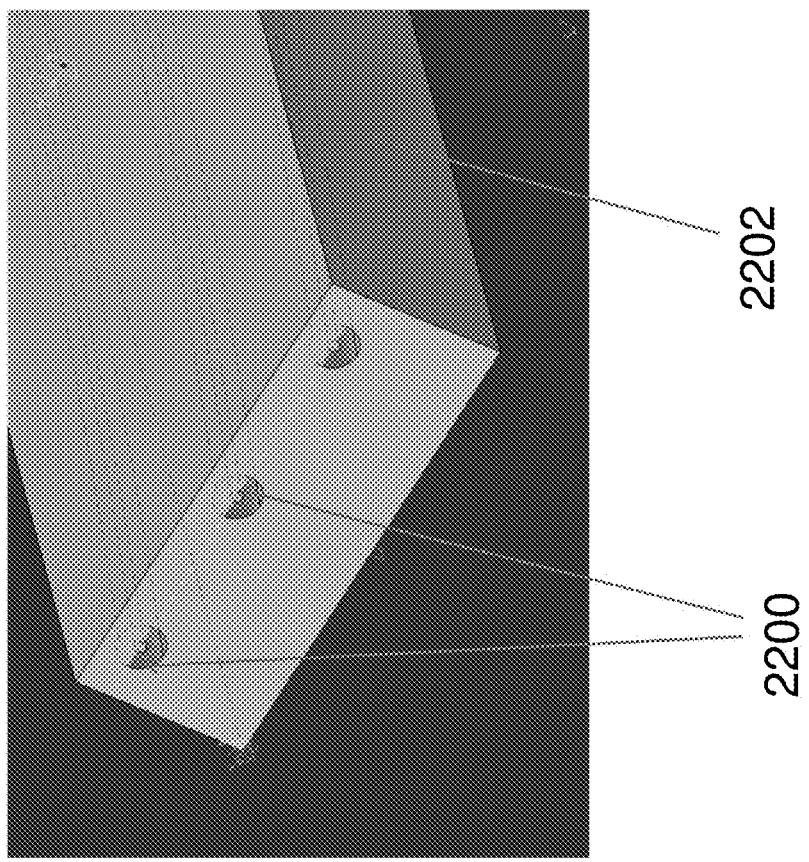

FIG. 89 illustrates a detailed shaded view of the Pre-Stressed Composite Car Bumper. In this figure, the same conduit and cable 2200 are included in the composite layup 2202 of the car bumper.

This Car Bumper can be built in Thermoset or Thermoplastic Composite Layups. The Conduits are laid at predetermined positions after ply layups to form the Bumper shape using the Prepreg or Wet Layup process. The conduits can be a part of composite layup and embedded in Fiber (fabric or tape). The whole part is autoclave pressure cured. The conduit can be made in metal or glass fiber.

The Composite Car Bumper can also be built using Pre-Stressed Composite Conduits embedded into metallic or composite Chopped Fiber and metallic outer Skin.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the Cable is locked in the Resin. The Part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the Cable where tension in the part normally will occur with the application of external applied loads. Hence with the applied Cable tension, compression is created in Pre-Stressed Composite part to take more tension for the applied load.

Figure 90:
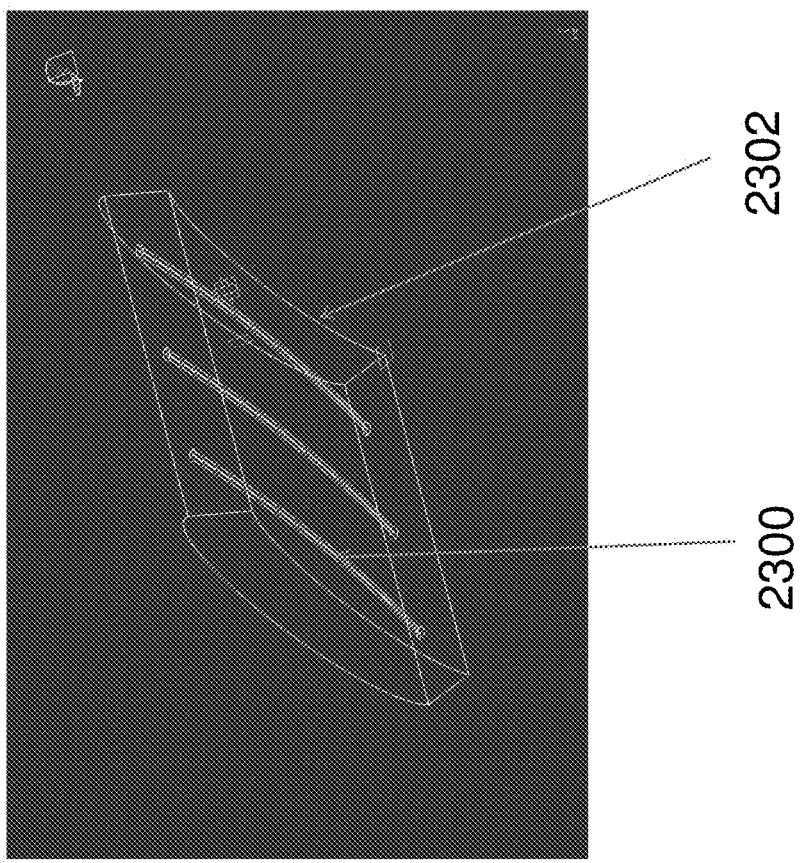
FIGS. 90-93 illustrate an embodiment of a Pre-Stressed Composite Car Door.

FIG. 90 illustrates a wire-frame view of a Pre-Stressed Composite Car Door. As illustrated, a conduit and cable 2300 are included and composite layup 2302 of the car door.

Figure 91:
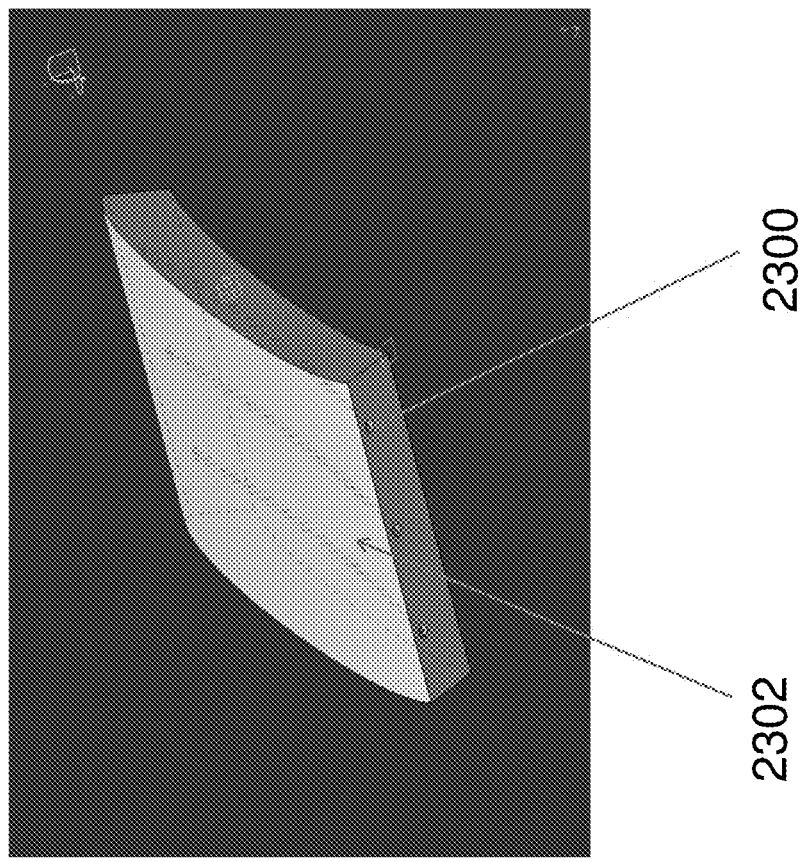

FIG. 91 illustrates a shaded view of the Pre-Stressed Composite Car Door. In this figure, the same conduit and cable 2300 and composite layup 2302 of the car door.

Figure 92:
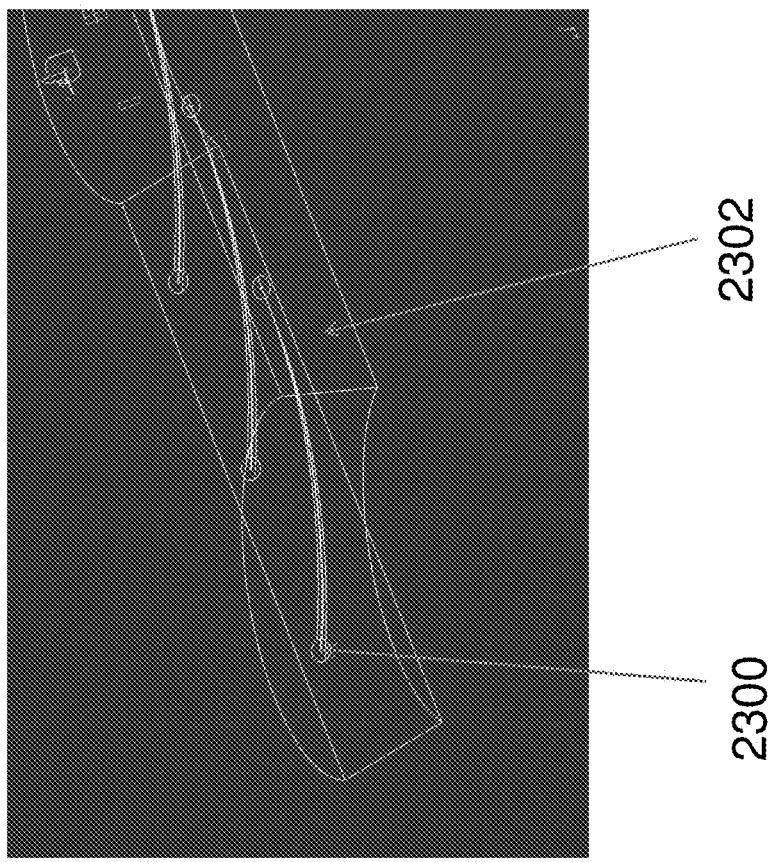

FIG. 92 illustrates a detailed wire-frame view of a Pre-Stressed Composite Car Door. As illustrated, a conduit and cable 2300 and composite layup 2302 of the car door.

Figure 93:
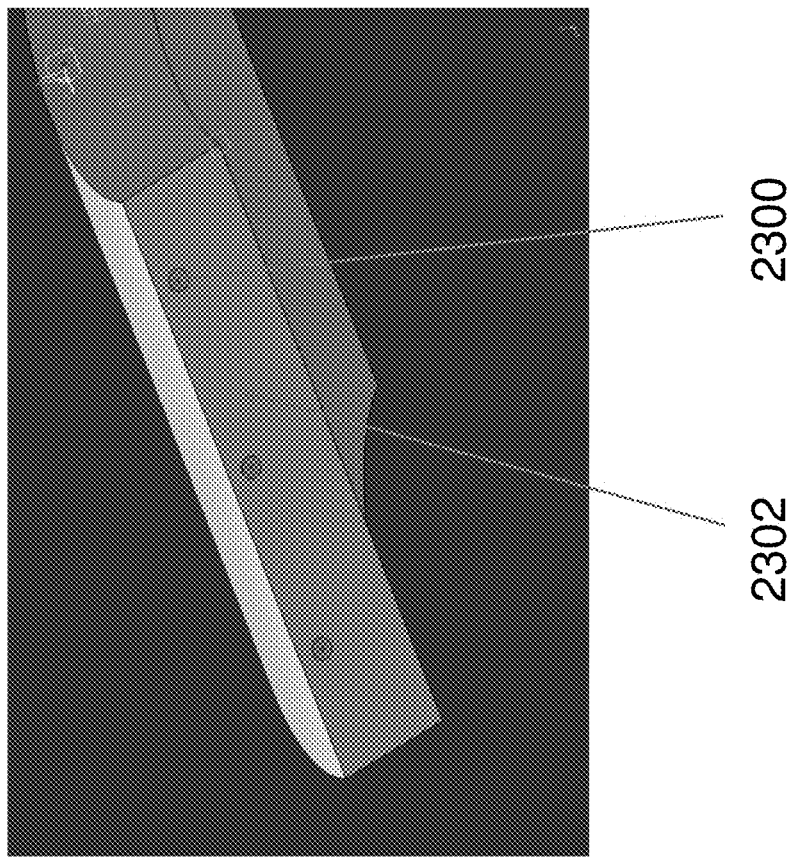

FIG. 93 illustrates a detailed shaded view of the Pre-Stressed Composite Car Door. In this figure, the same conduit and cable 2300 and composite layup 2302 of the car door.

The Car Door 2302 can be built in Thermoset or Thermoplastic Composite Layups. The Conduits are laid at predetermined positions after ply layups to form the Door shape using the Prepreg or Wet Layup process. The Conduits can be a part of Composite layup and embedded in Fiber (fabric or tape) plies. The whole part is autoclave pressure cured. The Conduit can be Metallic or Glass fiber.

The Composite Car Door can also be built using Pre-Stressed Composite Conduit embedded into metallic or composite Chopped Fiber and metallic outer Skin.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the Cable is locked in the Resin. The Part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the Cable where tension in the part normally will occur with the application of external applied loads. Hence with the applied Cable tension, compression is created in Pre-Stressed Composite part to take more tension for the applied load.

Figure 94:
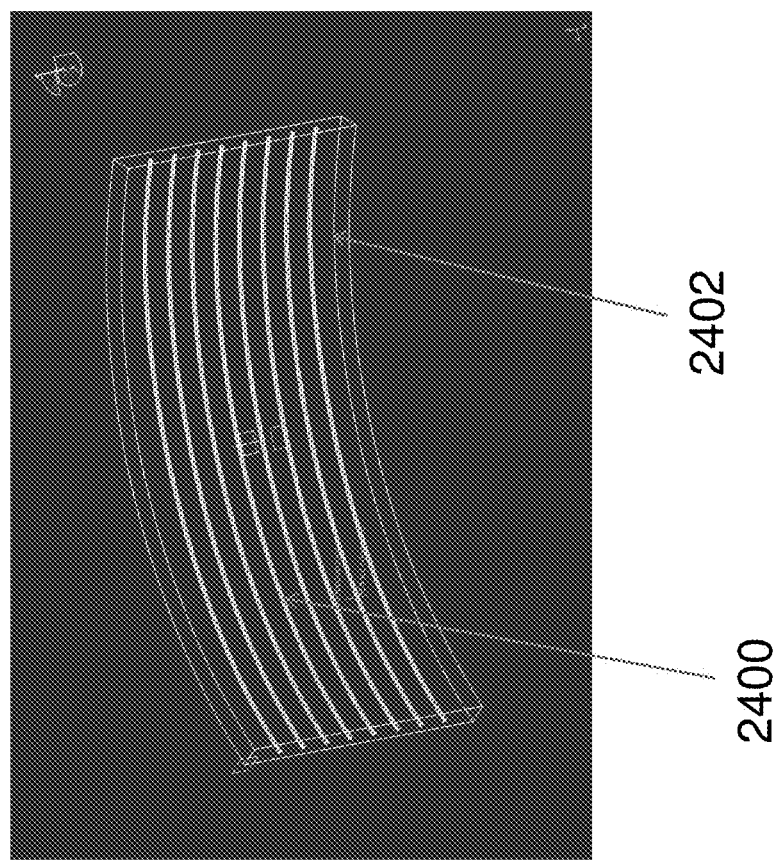
FIGS. 94-97 illustrate an embodiment of a Pre-Stressed Composite Car Roof.

FIG. 94 illustrates a wire-frame view of a Pre-Stressed Composite Car Roof. As illustrated, a conduit and cable 2400 are included in the composite layup 2402 of the car roof.

Figure 95:
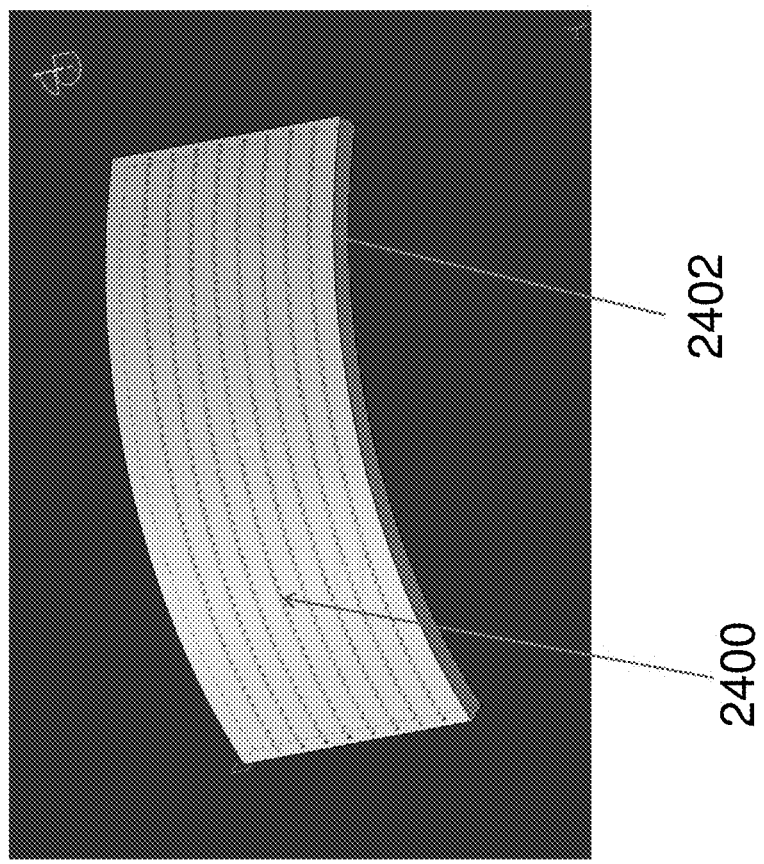

FIG. 95 illustrates a shaded view of the Pre-Stressed Composite Car Roof. In this figure, the same conduit and cable 2400 are included in the composite layup 2402 of the car roof.

Figure 96:
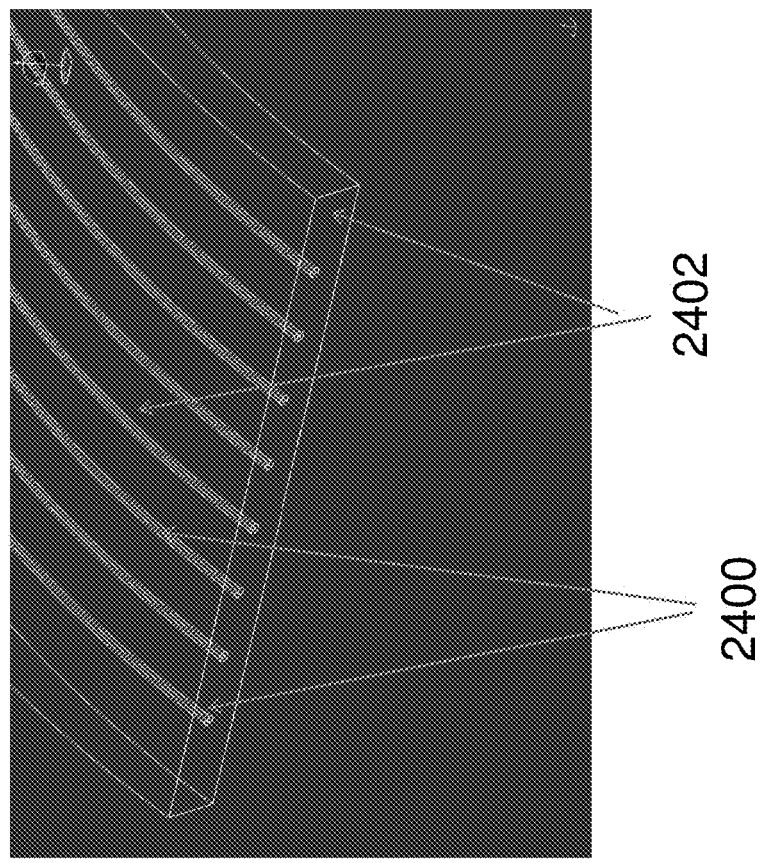

FIG. 96 illustrates a detailed wire-frame view of a Pre-Stressed Composite Car Roof. As illustrated, a conduit and cable 2400 are included in the composite layup 2402 of the car roof.

Figure 97:
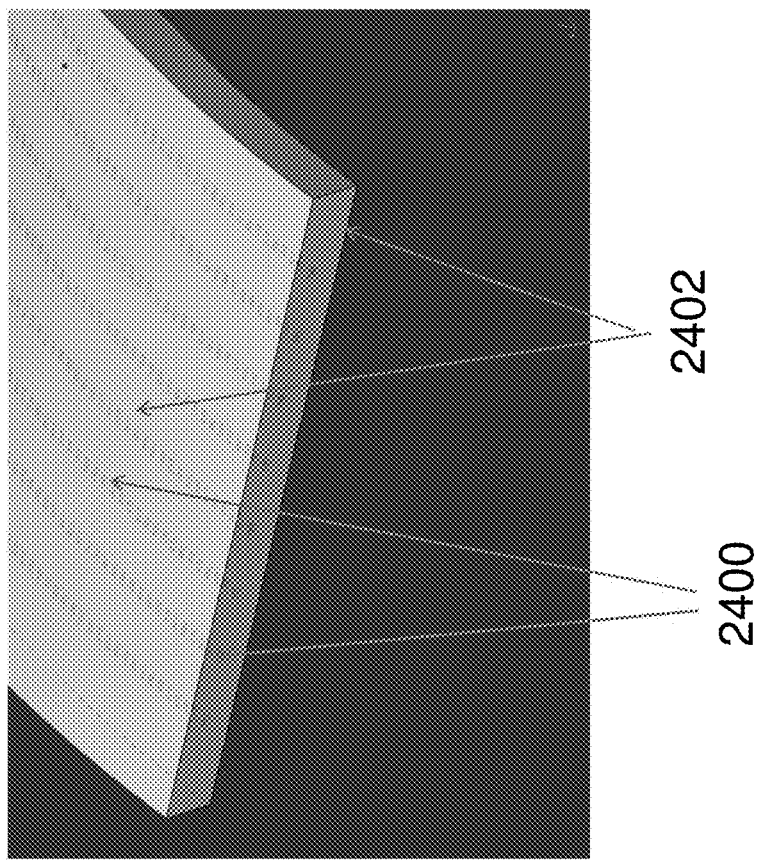

FIG. 97 illustrates a detailed shaded view of the Pre-Stressed Composite Car Roof. In this figure, the same conduit and cable 2400 are included in the composite layup 2402 of the car roof.

The Car Roof 2402 can be built in Thermoset or Thermoplastic Composite Layups. The Conduits are laid at predetermined positions after ply layups to form the Roof shape using the Prepreg or Wet Layup process. The Ply layups start on a Mandrel to form the Roof shape using the Prepreg or Wet Layup process. The Conduits can be a part of Composite layup embedded in Fiber (fabric or tape). The whole part is autoclave pressure cured. The Conduit can be metallic or glass fiber.

The Composite Car Roof can also be built using Pre-Stressed Composite Conduit embedded into metallic or composite Chopped Fiber and metallic outer Skin.

The Cable (steel) is then inserted in the Conduit and placed in the center of the conduit. A required and calculated tension is then applied to the Cable and tension is held with the help of jacks. The Conduit is then filled by injecting a special Resin with hardener and it is allowed to set until the Cable is locked in the Resin. The Part is then released from jacks after cure, leaving permanent anchors to maintain the cable tension at both ends of conduit.

The Pre-Stressed Composite part then achieves very high strength because of the cable tension in the part. The applied cable tension has induced compression in the surrounding areas of the Cable where tension in the part normally will occur with the application of external applied loads. Hence with the applied Cable tension, compression is created in Pre-Stressed Composite part to take more tension for the applied load.

Figure 98:
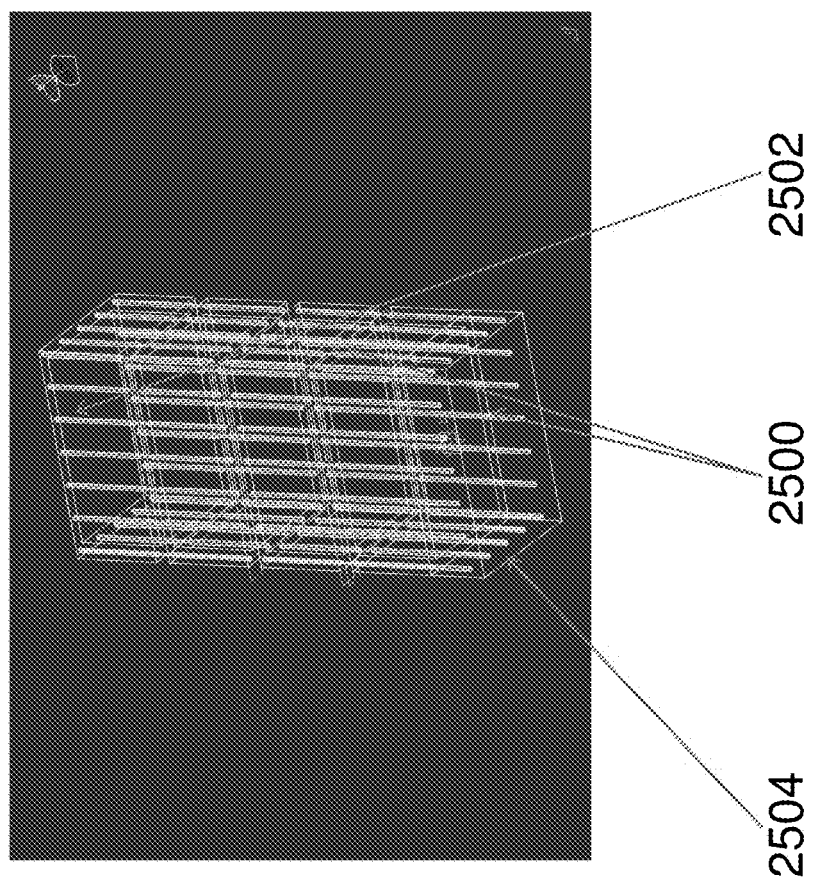
FIGS. 98-101 illustrate an embodiment of a Pre-Stressed Concrete Building using Cantilever Construction.

FIG. 98 illustrates a wire-frame view of a Pre-Stressed concrete building using cantilever construction. As illustrated, a conduit and cable 2500 are included in the pre-cast concrete blocks 2502 and concrete base 2504 of the concrete building using cantilever construction.

Figure 99:
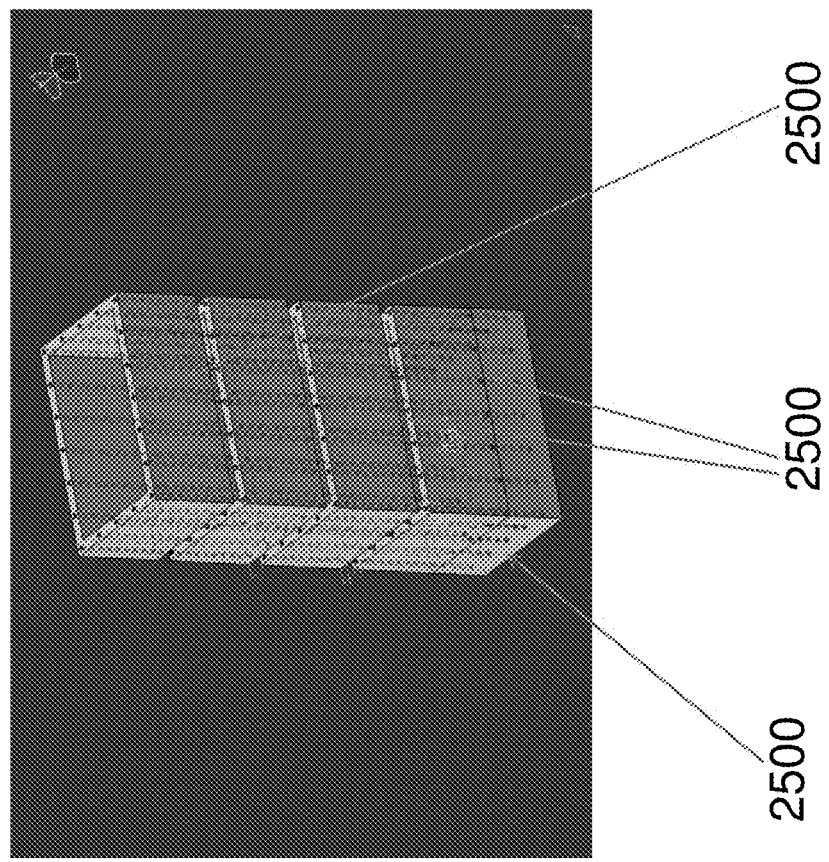

FIG. 99 illustrates a shaded view of the Pre-Stressed concrete building using cantilever construction. In this figure, the same concrete block 2502 and concrete base 2504 of the concrete building using cantilever construction are illustrated.

Figure 100:
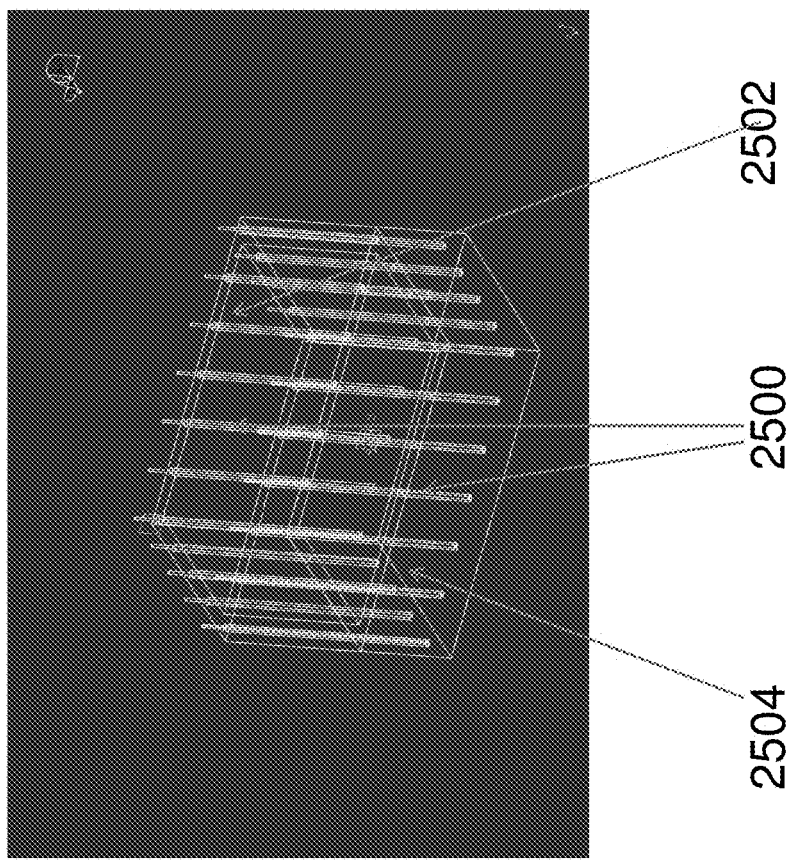

FIG. 100 illustrates a detailed wire-frame view of a Pre-Stressed concrete building block using cantilever construction. As illustrated, a conduit and cable 2500 are included in the pre-cast concrete block 2502 and concrete base 2504 of the concrete building using cantilever construction.

Figure 101:
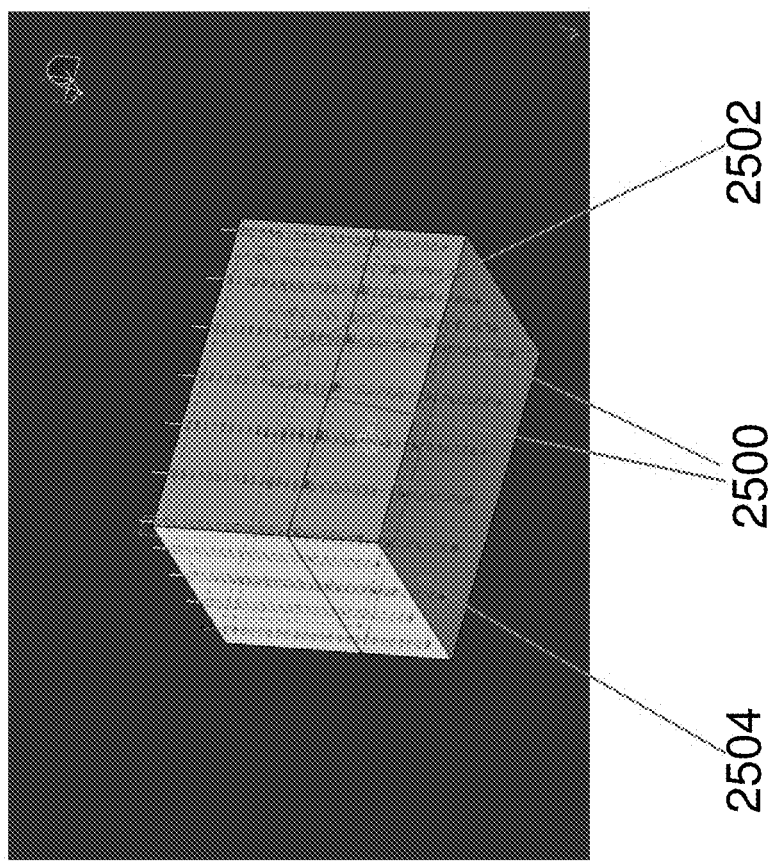

FIG. 101 illustrates a detailed shaded view of the Pre-Stressed concrete building block using cantilever construction. In this figure, the same cable 2500 is included in the pre-cast concrete block 2502 and concrete base 2504 of the concrete building using cantilever construction.

The Pre-Stressed Concrete Building 2502 can be constructed with Cantilever Construction method as used in Bridges. When normal Concrete Building is planned it has to be built In-Situ using fresh concrete. There is also a limit for length of beam span and number of floors. This way the building becomes very heavy on foundation.

The building can be built using In-Situ Concrete or Precast Concrete Block, using Cantilever Construction method. The Building starts with a Concrete foundation and Pre-Stressed Steel Cables are anchored in the foundation.

For In-Situ Concrete Building, the pre-stressing cable anchored in concrete foundation, has to be stretched for the portion added and In-situ concrete is allowed to set. So the loads are taken by the Steel Cable and the dimensions of the building will be small.

For Precast Concrete Building the Cable anchored in concrete foundation, goes through the already provided Holes in the Precast Block and the pre-Stressing Cable has to be Stretched to support the added Precast Block.

The Pre-Stressing changes for each Block or In-Situ Portion of the Building added and at each addition the Cables are anchored at top. When all floors are built then the Cables at top are sealed and anchored permanently.

This way the whole Building is built without any scaffolding and using very slim dimensions because the loads are taken by Pre-Stressed Steel Cables. The Cantilever Construction method Building will be the lightest building built in the Building Industry.

Although this Invention has been described with reference to an illustrative embodiment, this description is not intended to limit the scope of the invention. Various modifications and combinations of the illustrative embodiments as well as other embodiments of the invention will be apparent to persons skilled in the art upon reference to the description.

All possible methods of fabricating composite parts, in Thermoset, Thermoplastic or Filament Winding, with all possible Composite material Fibers and Resins are included in this Patent if the part is Pre-Stressed with Metallic Cables. All possible applications of Pre-Stressed Composites in all industries including aerospace and automobile are also included in this Patent. An important part of patent is Pre-Stressing Composites with Metallic Cables. It is therefore intended that the appended claims accomplish any such modifications or embodiments.

The invention claimed is:

1. A method of building a pre-stressed composite part, comprising:
   fabricating a pre-stressed composite part with a prepreg ply layup on a tool or a mandrel to impart shape;
   laying conduits made from at least one of metallic and glass fiber at desired locations and to be embedded within the ply layup;
   covering the prepeg ply layup with the conduits in a nylon bag and sealing it, then applying consolidating pressure during autoclave pressure curing;
   inserting a steel cable into each of the conduits center and held by jacks;
   then filling the conduit with a resin with hardener and allowing the resin to set until the cable is locked in the resin with the applied tension in the cable; and
   then applying a calculated tension to the cable;
   then removing the jacks and leaving permanent anchors at both ends of conduit;
   wherein the applied cable tension creates compression in the part to take more tension for the loads and hence cable tension gives extra strength to the part.

2. The method of claim 1 wherein the pre-stressed composite part is for an airplane.

3. The method of claim 1 wherein the pre-stressed composite part is for a helicopter.

4. The method of claim 1 wherein the pre-stressed composite part is for a windmill fan.

5. The method of claim 1 wherein the pre-stressed composite part is for a missile stage.

6. The method of claim 1 wherein the pre-stressed composite part is for an automobile.

7. The method of claim 1 wherein the pre-stressed composite part is for a boat.

8. The method of claim 1 wherein the pre-stressed composite part is for a space shuttle.

* * * * *